US012671847B2

(12) United States Patent (10) Patent No.: US 12,671,847 B2
Kuo et al. (45) Date of Patent: Jun. 30, 2026

(54) CROSS-COMPONENT SAMPLE ADAPTIVE OFFSET

(71) Applicant: BEIJING DAJIA INTERNET INFORMATION TECHNOLOGY CO., LTD., Beijing (CN)

(72) Inventors: Che-Wei Kuo, Beijing (CN); Xiaoyu Xiu, San Diego, CA (US); Wei Chen, San Diego, CA (US); Xianglin Wang, San Diego, CA (US); Yi-Wen Chen, San Diego, CA (US); Hong-Jheng Jhu, Beijing (CN); Ning Yan, Hangzhou (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/658,178

(22) Filed: May 8, 2024

(65) Prior Publication Data

US 2024/0298037 A1 Sep. 5, 2024

Related U.S. Application Data

(63) Continuation of application No. PCT/US2022/049269, filed on Nov. 8, 2022.

(Continued)

(51) Int. Cl.
*H04N 19/82* (2014.01)
*H04N 19/117* (2014.01)
(Continued)

(52) U.S. Cl.
CPC ........... *H04N 19/82* (2014.11); *H04N 19/117* (2014.11); *H04N 19/147* (2014.11); *H04N 19/176* (2014.11)

(58) Field of Classification Search
CPC .... H04N 19/82; H04N 19/117; H04N 19/147; H04N 19/176
See application file for complete search history.

(56) References Cited

U.S. PATENT DOCUMENTS

| | | | | |
|---|---|---|---|---|
| 2015/0010052 A1* | 1/2015 | Mody | ................. | H04N 19/117 375/240.02 |
| 2015/0215617 A1* | 7/2015 | Leontaris | ............. | H04N 19/147 375/240.03 |

(Continued)

FOREIGN PATENT DOCUMENTS

| | | |
|---|---|---|
| WO | WO 2018/026148 A1 | 2/2018 |
| WO | WO 2019/168347 A1 | 9/2019 |

OTHER PUBLICATIONS

International Search Report and Written Opinion dated Mar. 17, 2023, issued in counterpart PCT application No. PCT/US22/49269. (9 pages).

(Continued)

*Primary Examiner* — Peet Dhillon
(74) *Attorney, Agent, or Firm* — Oblon, McClelland, Maier & Neustadt, L.L.P.

(57) ABSTRACT

A method for Cross-Component Sample Adaptive Offset (CCSAO) process is provided. The method comprises: determining a first rate-distortion (RD) cost for a block using a first classifier, wherein the first classifier having a first category number in a first value range, and wherein the first RD cost is the least among RD costs associated with classifiers having a category number in the first value range; determining a second RD cost for the block using a second classifier, wherein the second classifier having a second category number in a second value range, and wherein the second RD cost is the least among RD costs associated with classifiers having a category number in the second value range; and applying the first classifier as a classifier for the (Continued)

CCSAO process in response to determining the first RD cost is less than the second RD cost.

15 Claims, 48 Drawing Sheets

Related U.S. Application Data

(60) Provisional application No. 63/277,110, filed on Nov. 8, 2021.

(51) Int. Cl.
  H04N 19/147 (2014.01)
  H04N 19/176 (2014.01)

(56) References Cited

U.S. PATENT DOCUMENTS

| | | | | |
|---|---|---|---|---|
| 2018/0227585 | A1* | 8/2018 | Wang | H04N 19/136 |
| 2020/0366918 | A1 | 11/2020 | Erfurt et al. | |
| 2022/0191551 | A1* | 6/2022 | Zhao | H04N 19/14 |
| 2023/0031886 | A1* | 2/2023 | Chen | H04N 19/117 |
| 2024/0236315 | A1* | 7/2024 | Choi | H04N 19/132 |

OTHER PUBLICATIONS

Kuo Che-Wei et al., "Cross-component Sample Adaptive Offset", 2022 Data Compression Conference (DCC), IEEE, Mar. 22, 2022, pp. 359-368, XP034143770.

C-W Kuo (Kwai) et al., "AHG12: Cross-component Sample Adaptive Offset", 22. JVET Meeting; Apr. 20, 2021-Apr. 28, 2021; Teleconference; (The Joint Video Exploration Team of ISO/IEC JTC1/SC29/WG11 and ITU-T SG.16), No. JVET-V0153 ; m56671, Apr. 22, 2021, XP030294395.

C-W Kuo (Kwai) et al., "EE2-5.1: Cross-component Sample Adaptive Offset", 23. JVET Meeting; Jul. 7, 2021-Jul. 16, 2021; Teleconference; (The Joint Video Exploration Team of ISO/IEC JTC1/SC29/WG11 and ITU-T SG.16), No. JVET-W0066 ; m57178, Jul. 1, 2021, XP030295926.

* cited by examiner

SAMPLE EDGEIDX CATEGORIES IN SAO EDGE CLASSES

| EdgeIdx | Condition | Meaning |
|---|---|---|
| 0 | Cases not listed below | Monotonic area |
| 1 | $p < n_0$ and $p < n_1$ | Local min |
| 2 | $p < n_0$ and $p == n_1$ or $p < n_1$ and $p == n_0$ | Edge |
| 3 | $p > n_0$ and $p == n_1$ or $p > n_1$ and $p == n_0$ | Edge |
| 4 | $p > n_0$ and $p > n_1$ | Local max |

FIG.7

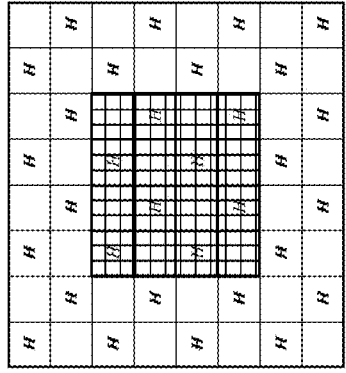
FIG.9B
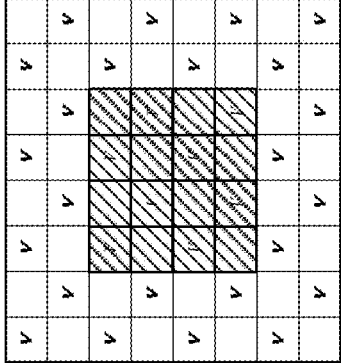
FIG.9A
FIG.9D
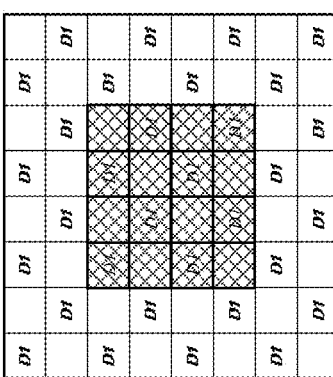
FIG.9C

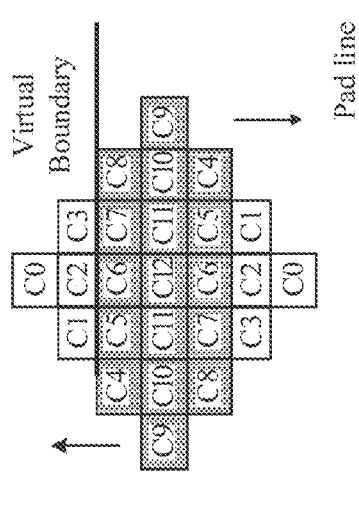
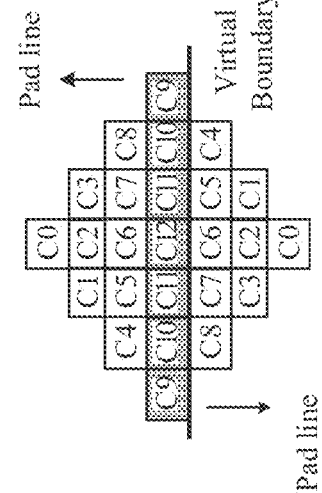
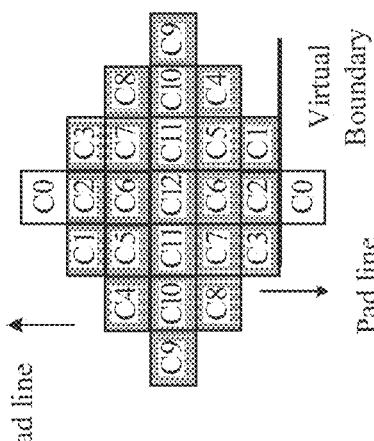
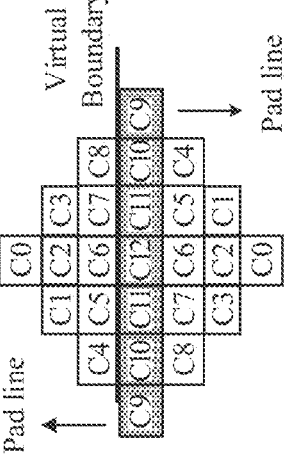
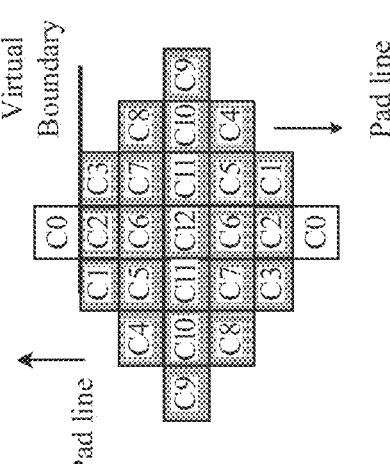
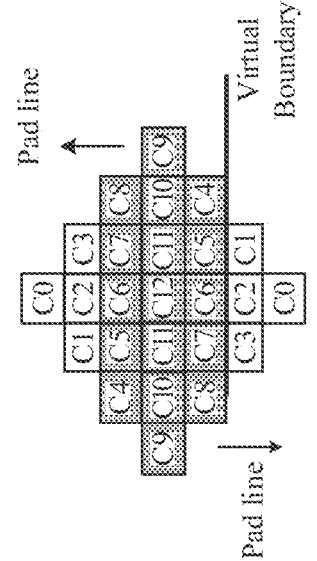
FIG.12

FIG.17

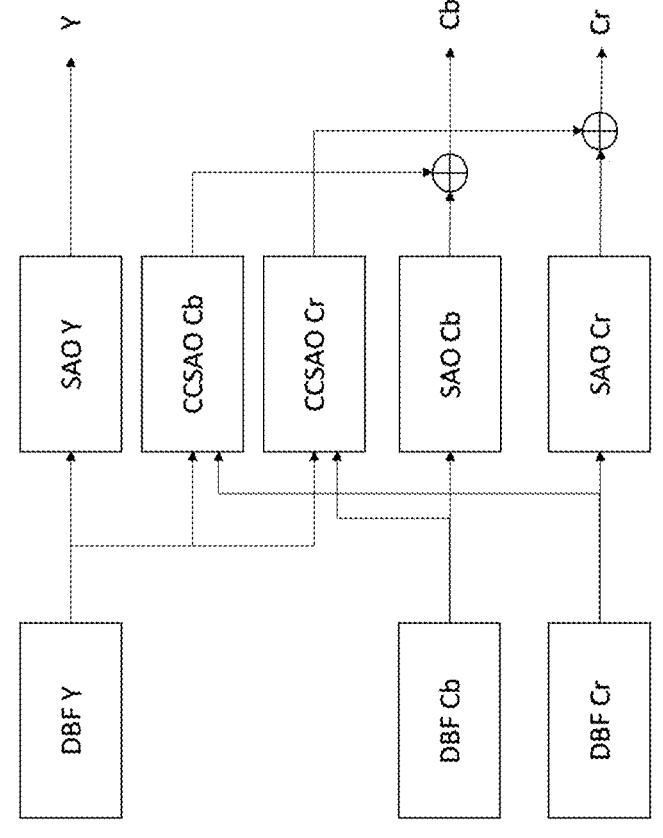
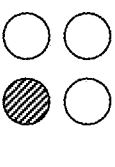
Current and neighboring
chroma samples
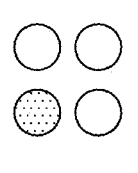
Collocated and neighboring
chroma samples
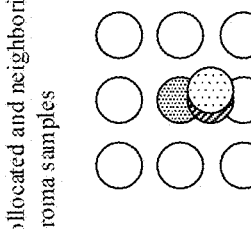
Collocated and neighboring
luma samples
blue    red    yellow
FIG.19

Yp=(Y0+Y7+1)>>2 blue

Yp=(Y4+2*Y0+Y5
+Y6+2*Y7+Y8+4)>>3 blue $$Yp=(Y0+Y7+1)>>2$$

blue $$Yn=(Y0-Y7+1)>>2$$

blue

Figure 25:
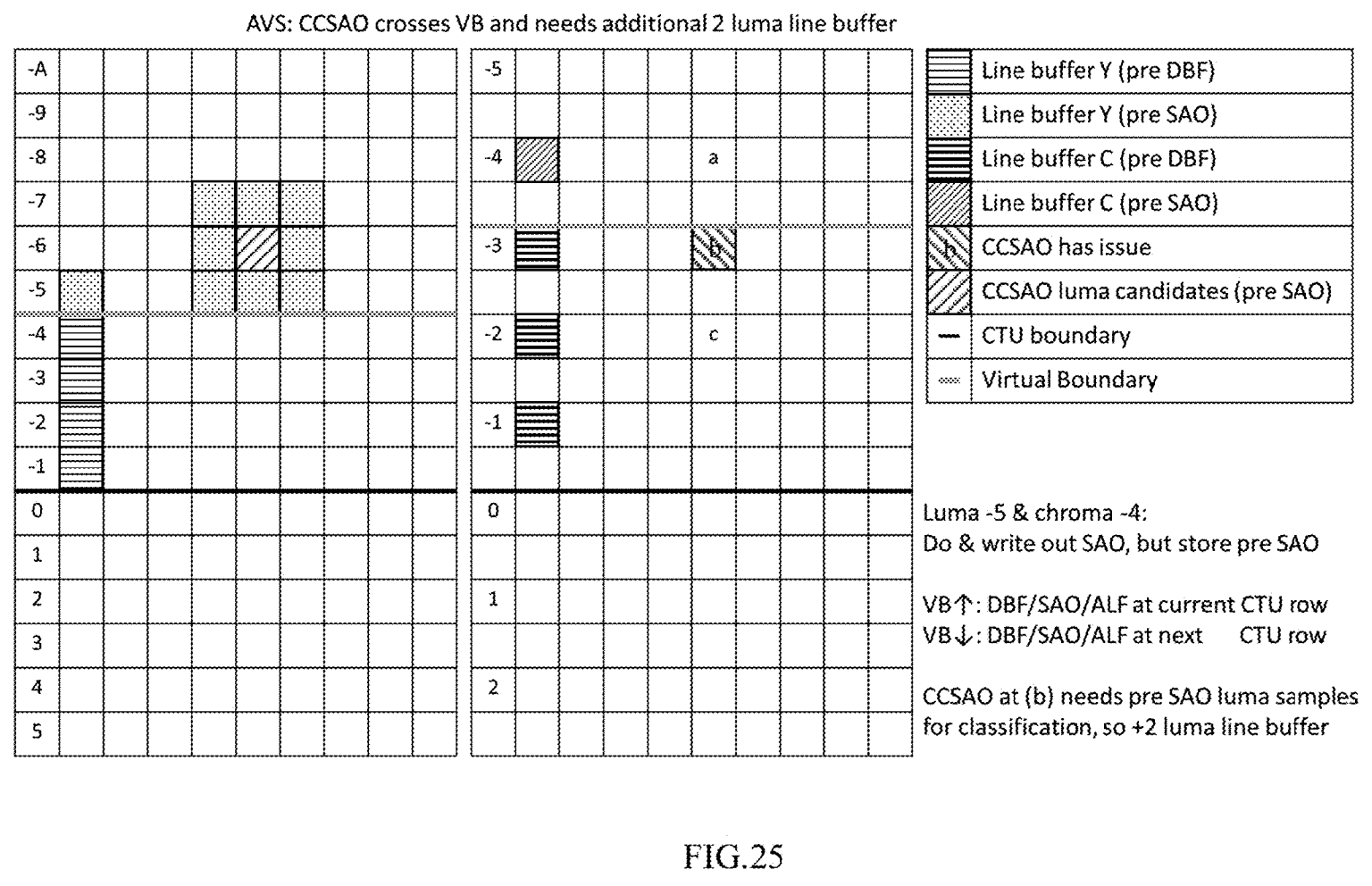

| | Line buffer Y (pre DBF) |
| --- | --- |
| | Line buffer Y (pre SAO) |
| | Line buffer C (pre DBF) |
| | Line buffer C (pre SAO) |
| | CCSAO has issue |
| | CCSAO luma candidates (pre SAO) |
| — | CTU boundary |
| ⋯ | Virtual Boundary |

Luma -5 & chroma -4:
Do & write out SAO, but store pre SAO

VB↑: DBF/SAO/ALF at current CTU row
VB↓: DBF/SAO/ALF at next    CTU row

CCSAO at (b) needs pre SAO luma samples
for classification, so +2 luma line buffer AVS: CCSAO crosses VB and needs additional 2 luma line buffer

Figure 26A:
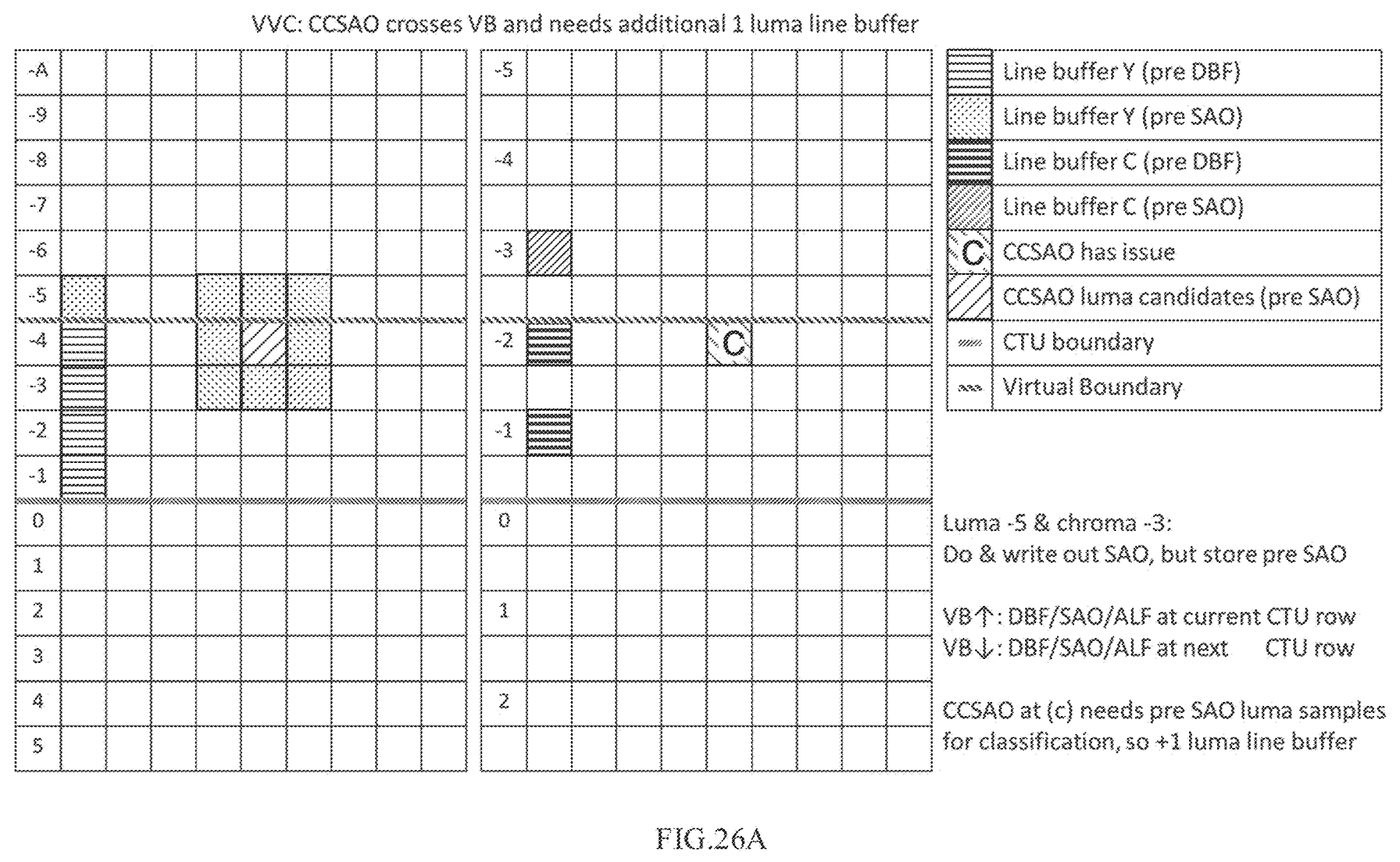

Line buffer Y (pre DBF)

Line buffer Y (pre SAO)

Line buffer C (pre DBF)

Line buffer C (pre SAO)

CCSAO has issue

CCSAO luma candidates (pre SAO)

CTU boundary

Virtual Boundary

Luma -5 & chroma -3:
Do & write out SAO, but store pre SAO

VB↑: DBF/SAO/ALF at current CTU row
VB↓: DBF/SAO/ALF at next   CTU row

CCSAO at (c) needs pre SAO luma samples
for classification, so +1 luma line buffer VVC: CCSAO crosses VB and needs additional 1 luma line buffer VVC: CCSAO may cross VB and need additional chroma line buffer

Figure 26B:
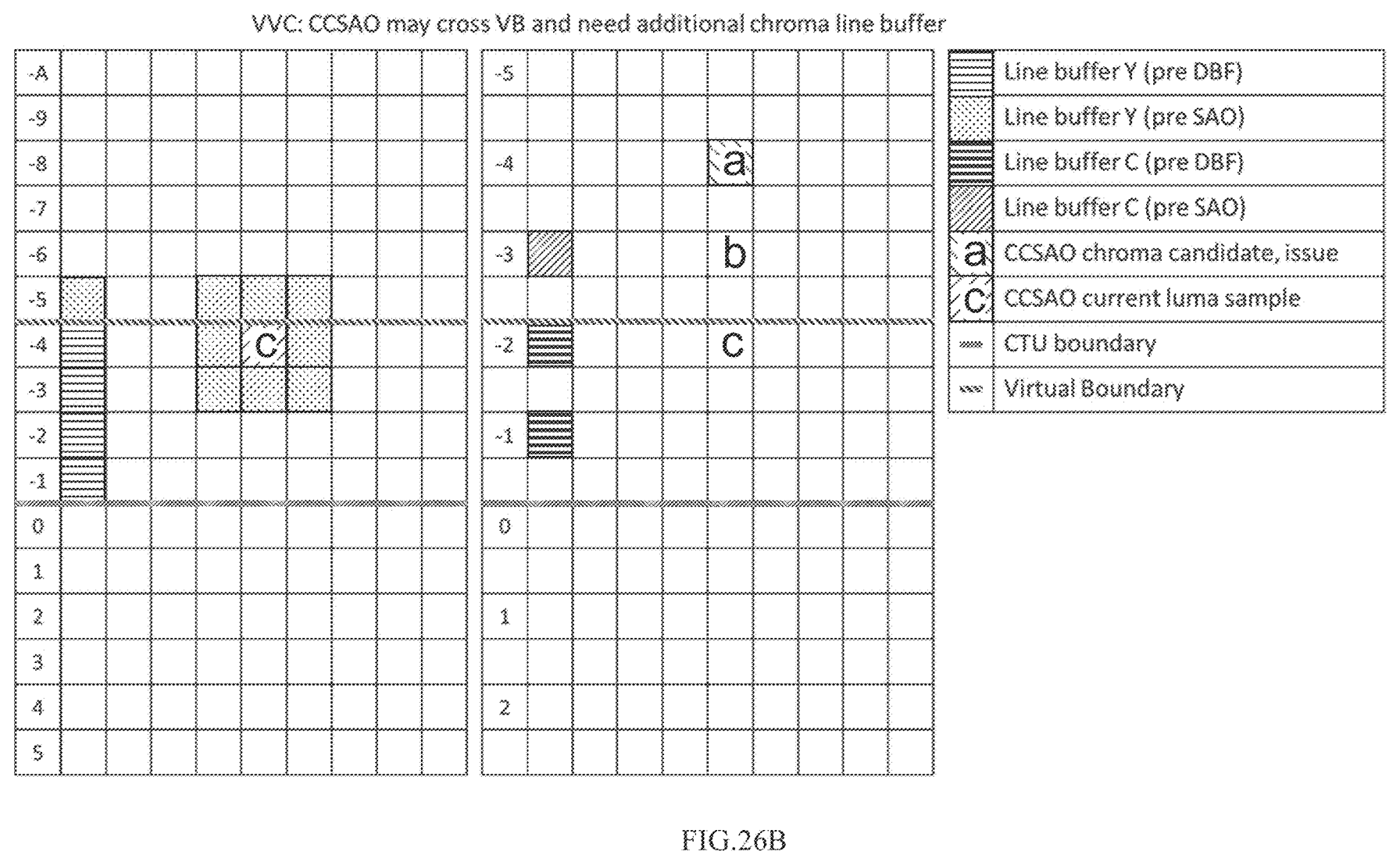

| | | |
|---|---|---|
| Line buffer Y (pre DBF) | | |
| Line buffer Y (pre SAO) | | |
| Line buffer C (pre DBF) | | |
| Line buffer C (pre SAO) | | |
| CCSAO chroma candidate, issue | a | |
| CCSAO current luma sample | c | |
| CTU boundary | = | |
| Virtual Boundary | ~ | | a b c

VVC Sol4: If one side is outside VB, double-sided symmetric padding for both sides
(a)
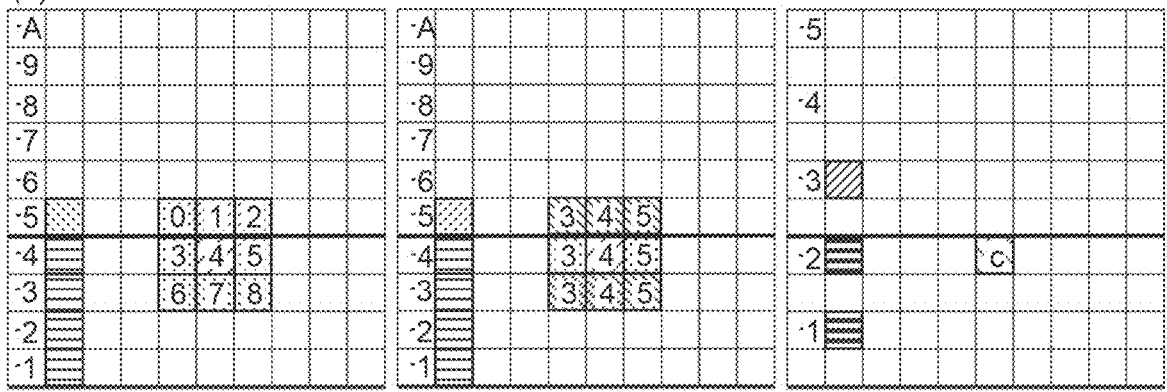
VVC Sol4: If one side is outside VB, double-sided symmetric padding for both sides
(b)
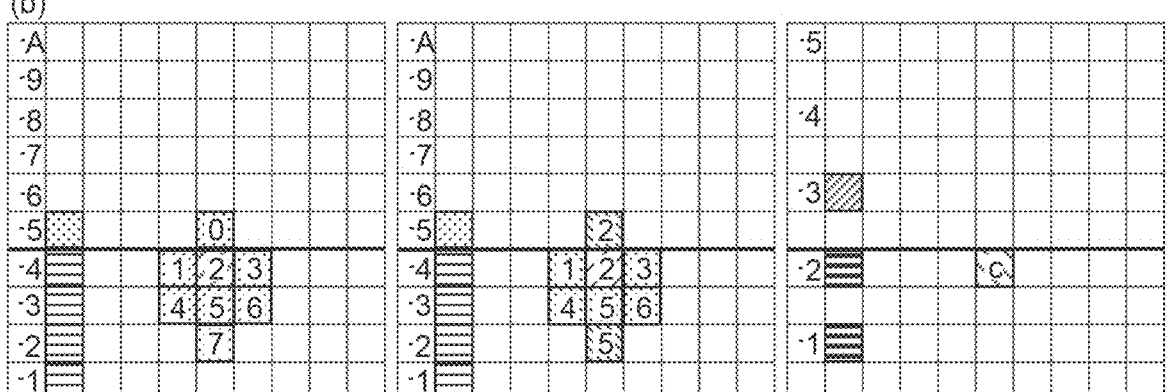
FIG.31

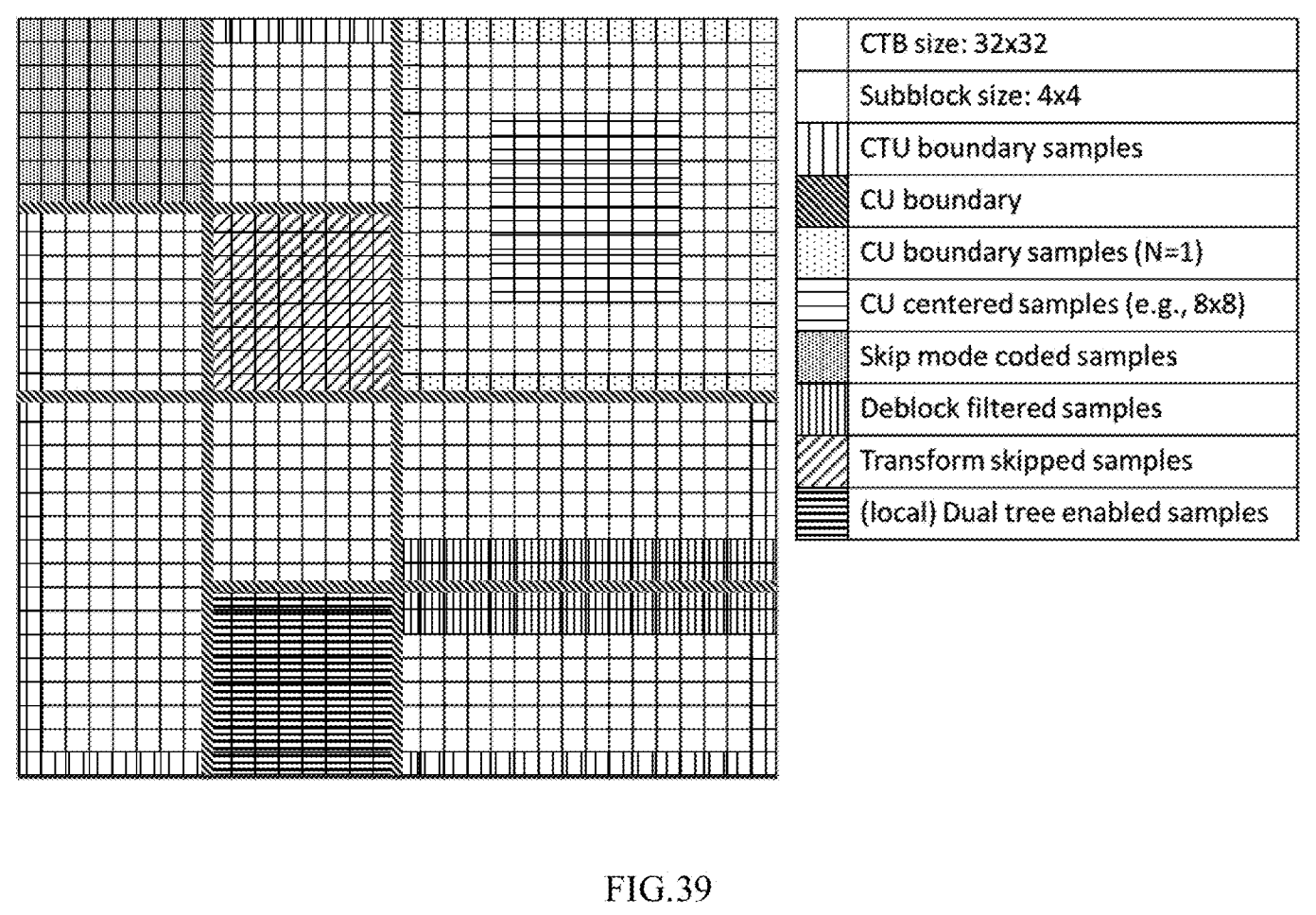

CTB size: 32x32
Subblock size: 4x4
CTU boundary samples
CU boundary
CU boundary samples (N=1)
CU centered samples (e.g., 8x8)
Skip mode coded samples
Deblock filtered samples
Transform skipped samples
(local) Dual tree enabled samples

FIG.39

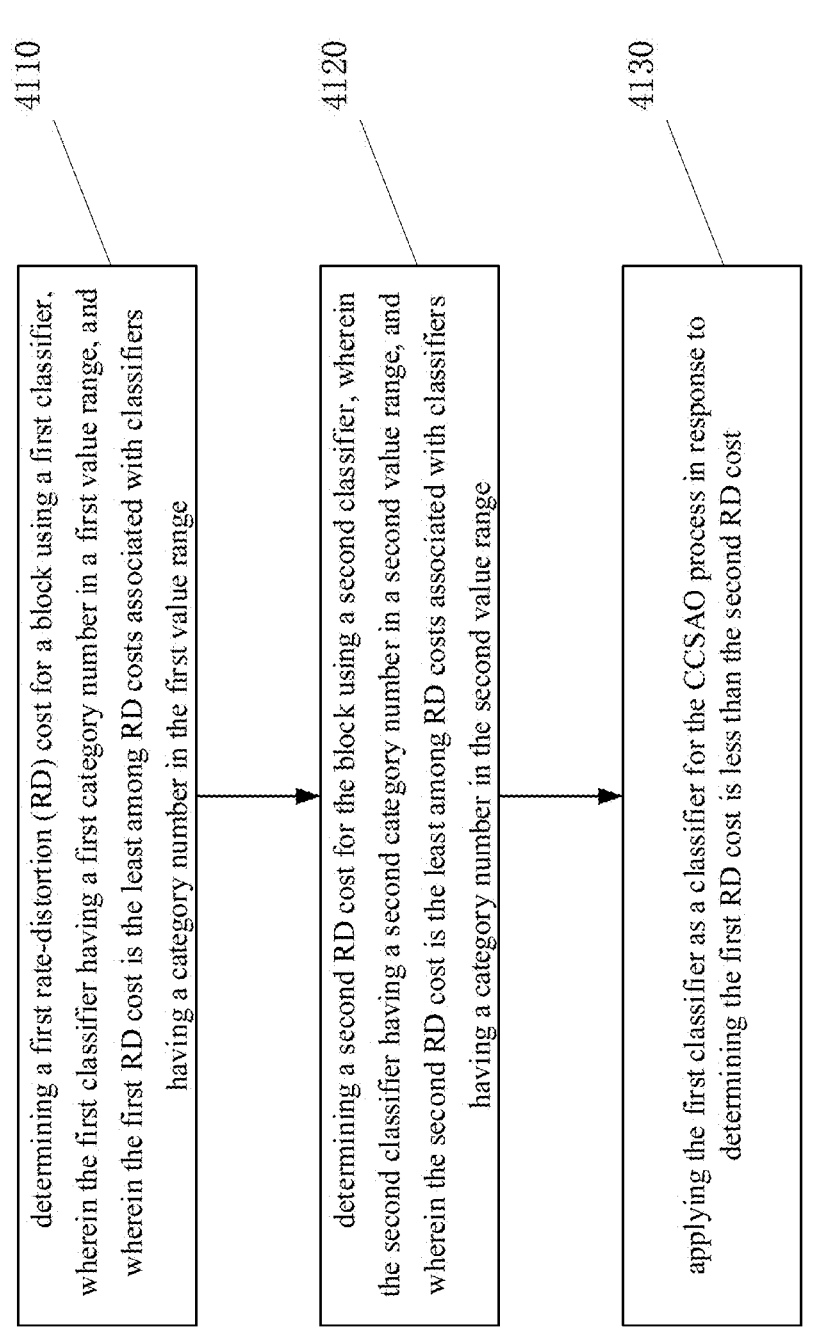

determining a first rate-distortion (RD) cost for a block using a first classifier, wherein the first classifier having a first category number in a first value range, and wherein the first RD cost is the least among RD costs associated with classifiers having a category number in the first value range

4110 determining a second RD cost for the block using a second classifier, wherein the second classifier having a second category number in a second value range, and wherein the second RD cost is the least among RD costs associated with classifiers having a category number in the second value range

4120 applying the first classifier as a classifier for the CCSAO process in response to determining the first RD cost is less than the second RD cost

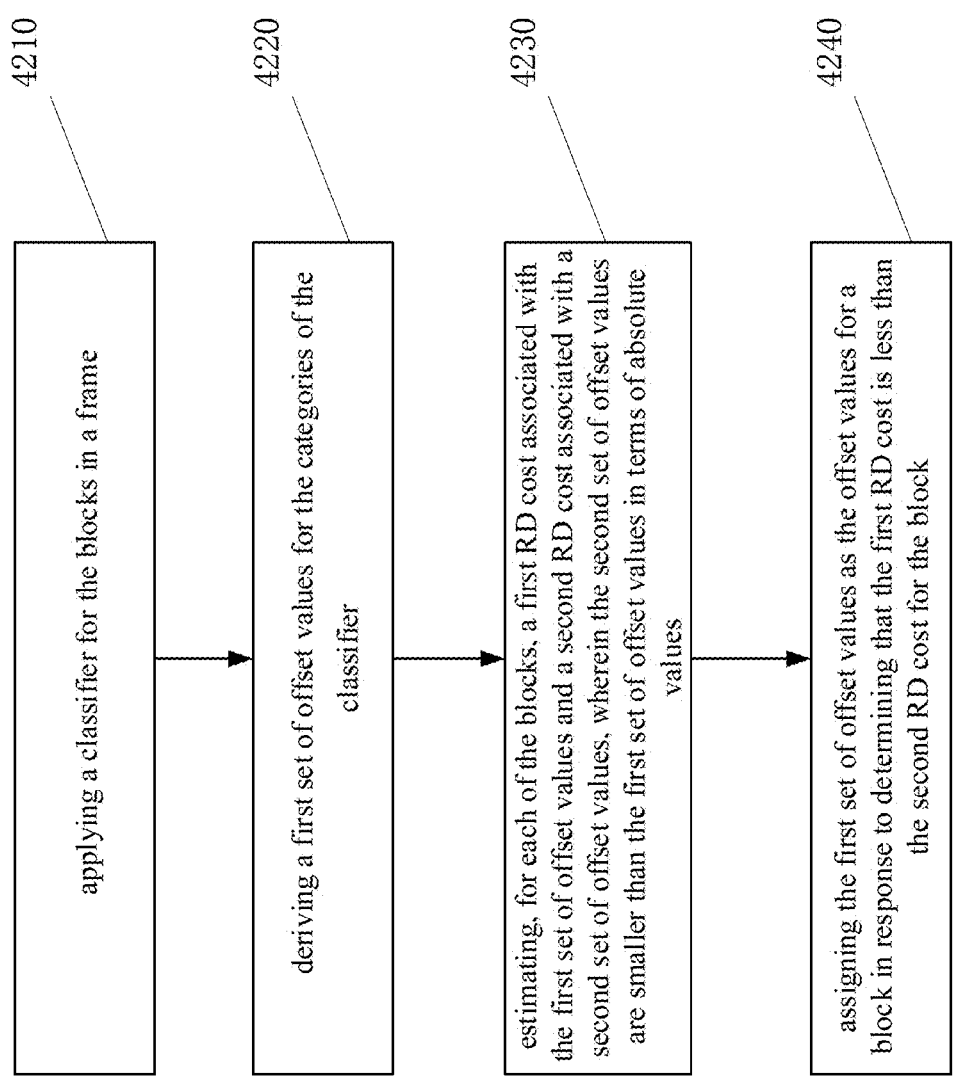

4210 applying a classifier for the blocks in a frame

4220 deriving a first set of offset values for the categories of the classifier

4230 estimating, for each of the blocks, a first RD cost associated with the first set of offset values and a second RD cost associated with a second set of offset values, wherein the second set of offset values are smaller than the first set of offset values in terms of absolute values

4240 assigning the first set of offset values as the offset values for a block in response to determining that the first RD cost is less than the second RD cost for the block

FIG.42

CROSS-COMPONENT SAMPLE ADAPTIVE OFFSET

CROSS-REFERENCE TO RELATED APPLICATION

This application is a continuation application of PCT Application No. PCT/US2022/049269, filed on Nov. 8, 2022, which is based upon and claims priority to Provisional Application No. 63/277,110 filed on Nov. 8, 2021, the entire contents of which are incorporated herein by reference for all purposes.

TECHNICAL FIELD

This disclosure is related to methods and apparatus on improving the coding efficiency of both luma and chroma components. More specifically, a loop filter called Cross-component Sample Adaptive Offset (CCSAO) is proposed to explore cross-component relationship between luma and chroma components.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Embodiments of the present disclosure provide method and apparatus for Cross-Component Sample Adaptive Offset (CCSAO) process.

In a first aspect of the present disclosure, a method for Cross-Component Sample Adaptive Offset (CCSAO) process is provided. The method comprises: determining a first rate-distortion (RD) cost for a block using a first classifier, wherein the first classifier having a first category number in a first value range, and wherein the first RD cost is the least among RD costs associated with classifiers having a category number in the first value range; determining a second RD cost for the block using a second classifier, wherein the second classifier having a second category number in a second value range, and wherein the second RD cost is the least among RD costs associated with classifiers having a category number in the second value range; and applying the first classifier as a classifier for the CCSAO process in response to determining the first RD cost is less than the second RD cost.

In a second aspect of the present disclosure, a method for Cross-Component Sample Adaptive Offset (CCSAO) process is provided. The method comprises: applying a classifier for the blocks in a frame; deriving a first set of offset values for the categories of the classifier; estimating, for each of the blocks, a first RD cost associated with the first set of offset values and a second RD cost associated with a second set of offset values, wherein the second set of offset values are smaller than the first set of offset values in terms of absolute values; assigning the first set of offset values as the offset values for a block in response to determining that the first RD cost is less than the second RD cost for the block.

In a third aspect of the present disclosure, a method for Cross-Component Sample Adaptive Offset (CCSAO) process is provided. The method comprises: applying a first classifier for the blocks in a frame; sorting the blocks with CCSAO enabled in ascending or descending order according to the associated distortion or RD cost; excluding a portion of sorted blocks for which the associated distortion or RD cost is higher than the associated distortion or RD cost for the other portion of blocks; training the excluded blocks with a second classifier; and applying the second classifier for the excluded blocks.

In a fourth aspect of the present disclosure, an apparatus or Cross-Component Sample Adaptive Offset (CCSAO) process is provided. The apparatus comprises: a memory; and at least one processor coupled to the memory and configured to perform the method according to any of the methods of the present disclosure.

In a fifth aspect of the present disclosure, a computer readable storage medium is provided. The computer readable storage medium has stored therein a bitstream comprising encoded video information generated by the methods of the present disclosure.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 7 illustrates the naming convention for samples surrounding the center sample $I_c$ in accordance with some implementations of the present disclosure.

FIGS. 9A, 9B, 9C and 9D illustrate the subsampled Laplacian calculation in accordance with some implementations of the present disclosure, wherein FIG. 9A shows subsampled positions for vertical gradient; FIG. 9B shows subsampled positions for horizontal gradient; FIG. 9C shows subsampled positions for diagonal gradient; and FIG. 9D shows subsampled positions for diagonal gradient.

FIG. 10A and FIG. 10B illustrates an embodiment in accordance with some implementations of the present disclosure, wherein FIG. 10A shows the placement of CC-ALF with respect to other loop filters, while FIG. 10B shows the diamond shaped filter.

FIG. 12 illustrates an embodiment in accordance with some implementations of the present disclosure, which shows the modified ALF filtering for luma component at virtual boundaries.

FIGS. 13A, 13B, 13C, 13D and 13F illustrate the proposed CCSAO in accordance with some implementations of the present disclosure, wherein FIG. 13A shows CCSAO applied on chroma samples with DBF Y as input; FIG. 13B shows CCSAO applied on luma and chroma samples with DBF Y/Cb/Cr as input; FIG. 13C shows CCSAO can work independently, and CCSAO can be cascaded after (1) DBF Y/Cb/Cr, (2) reconstructed image Y/Cb/Cr before DBF, (3) after SAO Y/Cb/Cr, or (4) after ALF Y/Cb/Cr; FIG. 13D shows recursively applied CCSAO; FIG. 13F shows CCSAO replaces SAO and applies in parallel with BIF.

FIGS. 15A, 15B and 15C illustrate the embodiments in accordance with some implementations of the present disclosure, wherein FIG. 15A shows the location of CCSAO can be after SAO, i.e., the location of CCALF in VVC; FIG. 15B shows CCSAO can work independently without CCALF, and the SAO Y/Cb/Cr can be replaced by ESAO, for example, in AVS3; and FIG. 15C shows CCSAO can serve as a post reconstruction filter, i.e., using reconstructed sample as input for classification, compensating luma/chroma samples before entering neighboring intra prediction.

FIG. 17 illustrates an embodiment in accordance with some implementations of the present disclosure, which shows using different luma sample position for C0 classification can be another classifier, for example, using the neighboring Y7 but not Y0 for C0 classification.

FIG. 19 illustrates an embodiment in accordance with some implementations of the present disclosure, which shows besides luma, the other cross-component collocated (yellow) and neighboring (white) chroma samples can be also fed into CCSAO classification.

FIG. 25 illustrates an embodiment in accordance with some implementations of the present disclosure, which shows in AVS, 9 luma candidates CCSAO may increase 2 additional luma line buffers.

FIG. 26A and FIG. 26B illustrate the embodiments in accordance with some implementations of the present disclosure, wherein FIG. 26A shows in VVC, 9 luma candidates CCSAO may increase 1 additional luma line buffer and FIG. 26B shows if collocated or neighboring chroma samples are used to classify the current luma samples, the selected chroma candidate may across VB and need additional chroma line buffer.

FIG. 28A shows 4 lines vertical virtual boundary with Y7 is selected luma position and FIG. 28B shows y lines horizontal virtual boundary with Y5 is selected luma position.

FIG. 31 illustrates an embodiment in accordance with some implementations of the present disclosure, which shows line buffer Sol 4: if one side is outside VB, double-sided symmetric padding for both sides.

FIG. 32A shows repetitive padding. If the original Y7 is chosen to be the classifier, the Y4 luma sample value is used for classification, instead of the original Y7 luma sample value. FIG. 32B shows mirror padding. If Y7 is chosen to be the classifier, the Y1 luma sample value is used for classification, instead of the original Y7 luma sample value.

FIG. 33A shows using only 6 luma candidates for classification. FIG. 33B shows using only 4 luma candidates for classification.

FIG. 35A shows vertical partition 4 regions; FIG. 35B shows square partition 4 regions; and FIG. 35C shows square partition 16 regions with Hilbert scan. FIG. 35C also shows different CCSAO applied region can share the same region on/off control and CCSAO parameters. For example, in FIG. 35C, region 0~2 shares the same parameters and region 3~15 shares the same parameters. FIG. 35C further shows the region on/off control flag and CCSAO parameters can be signaled in a Hilbert scan order.

FIG. 36A shows vertical partition N region (depend on signaled picture set_num) and 3 CCSAO offset sets are used in this POC (set_num=3), so vertical partition into 3 regions; FIG. 36B shows horizontal partition N region (depend on signaled picture set_num), where set_num=4, horizontal partition 4 regions; and FIG. 36C shows raster partition 3 regions, while each region can have its own region all on flag to save per CTB on/off control bits.

FIG. 37A shows POC 0: square partition 4 regions; FIG. 37B shows POC 1: CTB level switch classifier; and FIG. 37C shows POC 2: vertical partition 4 regions. FIG. 37A and FIG. 37C show default fixed region classifier, while FIG. 37B is signaled in mask/CTB level, where 0 means CCSAO off for this CTB, 1~4 means set index.

FIG. 38A shows only use QT split from CTB level;

FIG. 38B shows BT/QT/TT split from CTB level; and FIG. 38C shows BT/QT/TT split from frame level.

FIG. 39 illustrates an embodiment in accordance with some implementations of the present disclosure, which shows the CCSAO classifiers can take current or cross component coding information into account. Different coding modes/parameters/sample position can form different classifiers. Different coding information can be combined to form a joint classifier. Different area can use different classifiers.

FIG. 41 illustrates an exemplary flowchart of a method for Cross-Component Sample Adaptive Offset (CCSAO) process according to one or more aspects of the present disclosure.

FIG. 42 illustrates another exemplary flowchart of a method for Cross-Component Sample Adaptive Offset (CCSAO) process according to one or more aspects of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization, one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Figure 1:
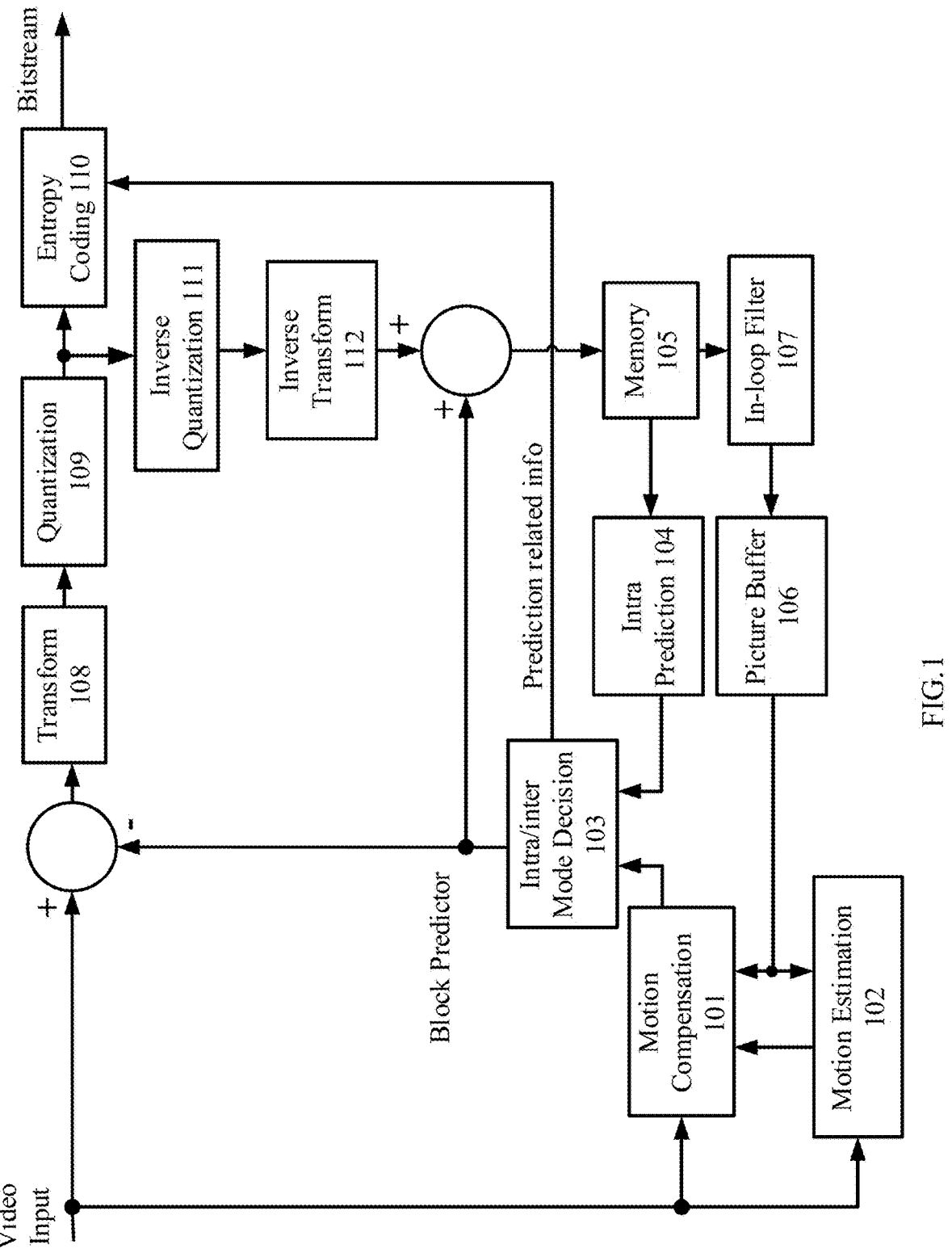
FIG. 1 is a block diagram illustrating a generic block-based hybrid video encoding system in accordance with some implementations of the present disclosure.
Figures 2A, 2B, 2C, 2D, 2E:
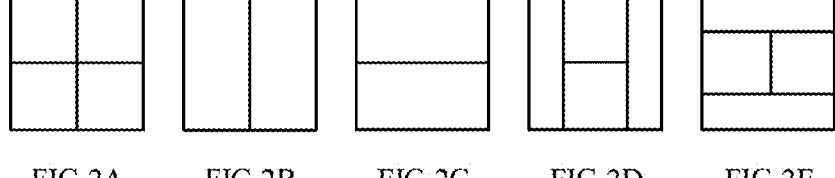
FIGS. 2A, 2B, 2C, 2D, and 2E illustrate block partitions in accordance with some implementations of the present disclosure.

Like HEVC, the VVC is built upon the block-based hybrid video coding framework. FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding trec block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate colour planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, on CTU is firstly partitioned by a quad-tree structure. Then, each quad-tree leaf node can be further partitioned by a binary and ternary tree structure. As shown in FIG. 2A to FIG. 2E, there are five splitting types: quaternary partitioning (as illustrated in FIG. 2A), vertical binary partitioning (as illustrated in FIG. 2B), horizontal binary partitioning (as illustrated in FIG. 2C), vertical extended quaternary partitioning (as illustrated in FIG. 2D), and horizontal extended quaternary partitioning (as illustrated in FIG. 2E). In FIG. 2, spatial prediction and/or temporal prediction may be performed (e.g., via motion compensation 101, motion estimation 102, intra/inter mode decision 103, intra prediction 104). Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store (e.g., memory 105, picture buffer 106) the temporal prediction signal comes. After spatial and/or temporal prediction, the mode decision block (e.g., intra/inter mode decision 103) in the encoder chooses the best prediction mode, for example based on the rate-distortion optimization method. The prediction block is then subtracted from the current video block; and the prediction residual is de-correlated using transform and quantized (e.g., via transform 108, quantization 109). The quantized residual coefficients are inverse quantized and inverse transformed to form the reconstructed residual (e.g., via inverse quantization 111, inverse transform 112), which is then added back to the prediction block to form the reconstructed signal of the CU. Further in-loop filtering (e.g., in-loop filter 107), such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit (e.g., entropy coding 110) to be further compressed and packed to form the bit-stream.

Figure 3:
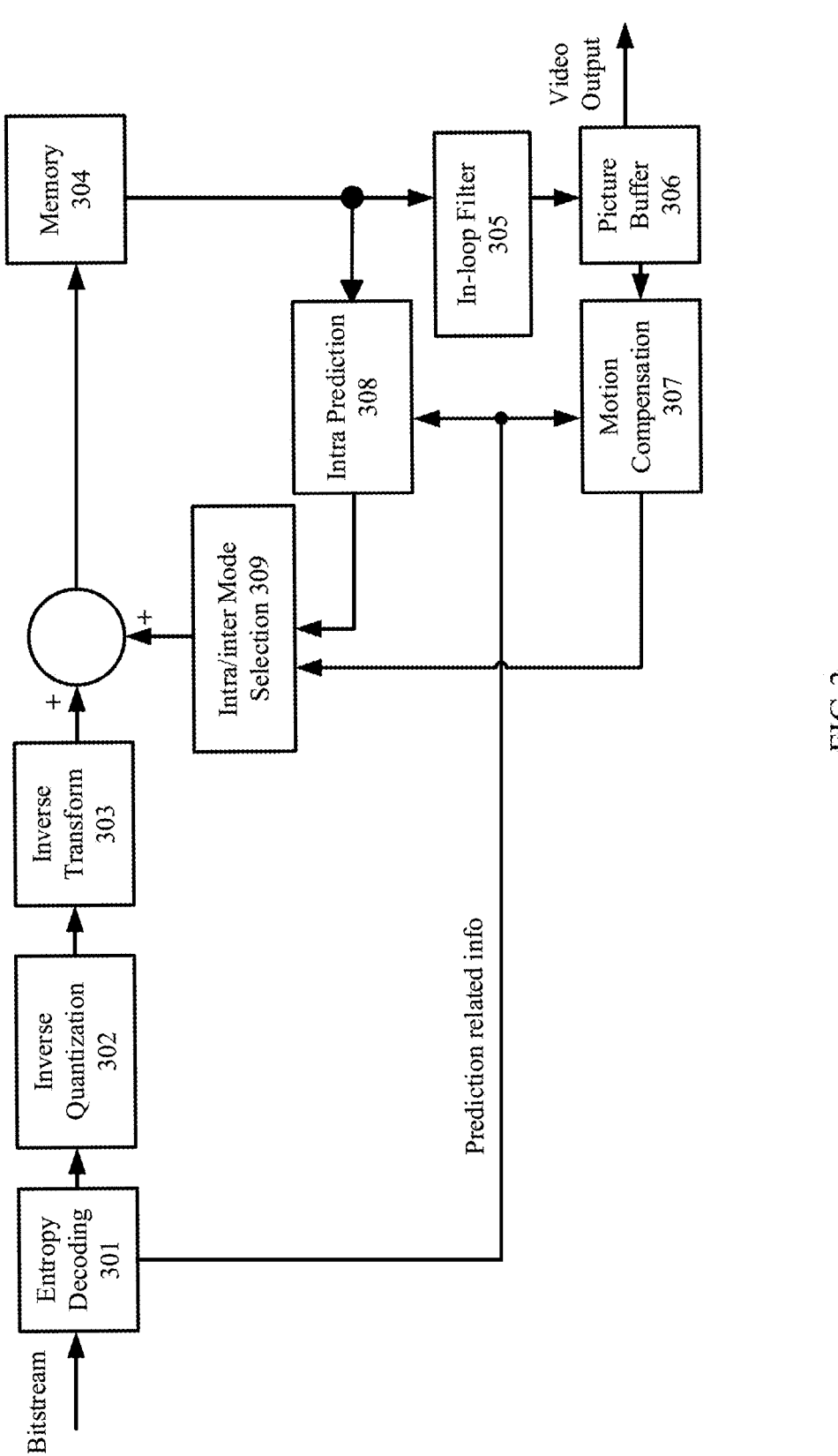
FIG. 3 is a block diagram illustrating a block-based video decoder in accordance with some implementations of the present disclosure.

FIG. 3 gives a general block diagram of a block-based video decoder. The video bit-stream is first entropy decoded at entropy decoding unit (e.g., entropy decoding 301). The coding mode and prediction information are sent to either the spatial prediction unit (if intra coded) (e.g., intra prediction 308) or the temporal prediction unit (if inter coded) (e.g., motion compensation 307) to form the prediction block. The residual transform coefficients are sent to inverse quantization unit (e.g., inverse quantization 302) and inverse transform unit (e.g., inverse transform 303) to reconstruct the residual block. The prediction block and the residual block are then added together (e.g., through intra/inter mode selection 309 and/or stored in memory 304). The reconstructed block may further go through in-loop filtering before it is stored in reference picture store (e.g., picture buffer 306). The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC), matrix-based intra prediction, and 4-tap intra interpolation.

Figure 4:
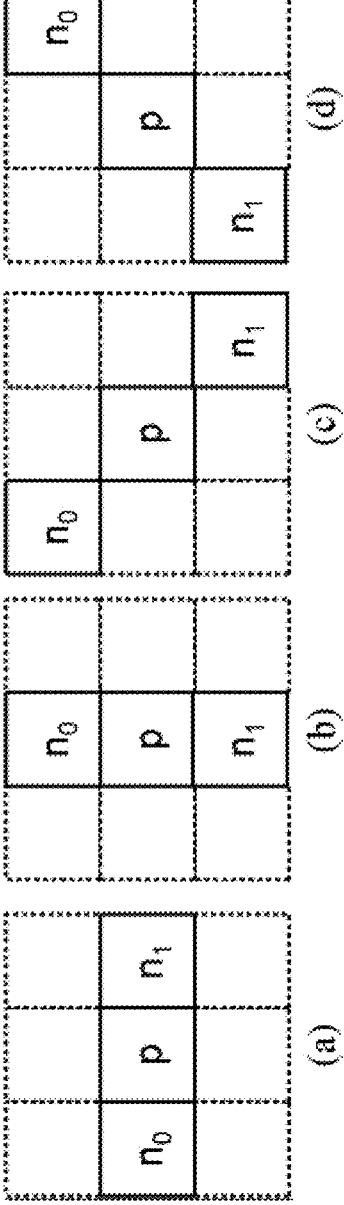
FIG. 4 illustrates four gradient patterns used in SAO in accordance with some implementations of the present disclosure.

SAO is a process that modifies the decoded samples by conditionally adding an offset value to each sample after the application of the deblocking filter, based on values in look-up tables transmitted by the encoder. SAO filtering is performed on a region basis, based on a filtering type selected per CTB by a syntax element sao-type-idx. A value of 0 for sao-type-idx indicates that the SAO filter is not applied to the CTB, and the values 1 and 2 signal the use of the band offset and edge offset filtering types, respectively. In the band offset mode specified by sao-type-idx equal to 1, the selected offset value directly depends on the sample amplitude. In this mode, the full sample amplitude range is uniformly split into 32 segments called bands, and the sample values belonging to four of these bands (which are consecutive within the 32 bands) are modified by adding transmitted values denoted as band offsets, which can be positive or negative. The main reason for using four consecutive bands is that in the smooth areas where banding artifacts can appear, the sample amplitudes in a CTB tend to be concentrated in only few of the bands. In addition, the design choice of using four offsets is unified with the edge offset mode of operation which also uses four offset values. In the edge offset mode specified by sao-type-idx equal to 2, a syntax element sao-eo-class with values from 0 to 3 signals whether a horizontal, vertical or one of two diagonal gradient directions is used for the edge offset classification in the CTB. FIG. 4 depicts the four gradient patterns used for the respective sao-eo-class in this mode. Each sample in the CTB is classified into one of five EdgeIdx categories by comparing the sample value p located at some position with the values n0 and n1 of two samples located at neighboring positions as shown in FIG. 4. This classification is done for each sample based on decoded sample values, so no additional signaling is required for the EdgeIdx classification. Depending on the EdgeIdx category at the sample position, for EdgeIdx categories from 1 to 4, an offset value from a transmitted look-up table is added to the sample value. The offset values are always positive for categories 1 and 2 and negative for categories 3 and 4—thus the filter generally has a smoothing effect in the edge offset mode.

Thus, for SAO types 1 and 2, a total of four amplitude offset values are transmitted to the decoder for each CTB. For type 1, the sign is also encoded. The offset values and related syntax elements such as sao-type-idx and sao-eo-class are determined by the encoder—typically using criteria that optimize rate-distortion performance. The SAO parameters can be indicated to be inherited from the left or above CTB using a merge flag to make the signaling efficient. In summary, SAO is a nonlinear filtering operation which allows additional refinement of the reconstructed signal, and it can enhance the signal representation in both smooth areas and around edges.

Near the finalization stage of VVC, Pre-SAO was proposed in JVET-Q0434. Though it was not adopted in VVC, its coding performance with low complexity is still promising in the future video coding standard development. Note in JVET-Q0434, Pre-SAO is only applied on luma component samples using luma samples for classification.

Figure 5:
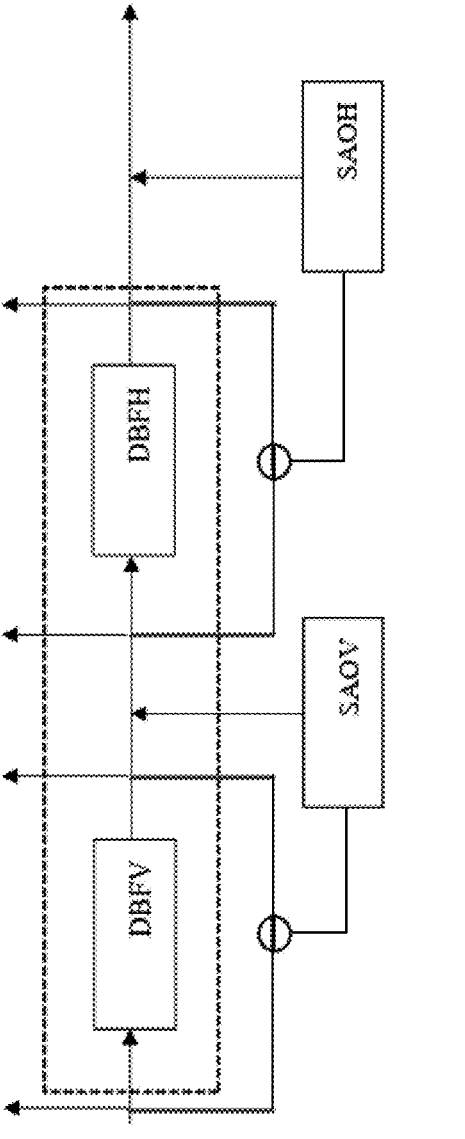
FIG. 5 is a decoder block diagram in accordance with some implementations of the present disclosure, wherein the decoder block diagram shows deblocking filter DBF (consists of DBFV and DBH) combined with SAO filters SAOV and SAOH.

The contribution proposes a tool called Pre-Sample Adaptive Offset (Pre-SAO). Pre-SAO operates by applying two SAO-like filtering operations called SAOV and SAOH and they are applied jointly with the deblocking filter (DBF) before applying the existing (legacy) SAO, as illustrated in FIG. 5. The first SAO-like filter SAOV operates as applying SAO to the input picture $Y_2$ after the deblocking filter for the vertical edges (DBFV) is applied—see FIG. 5. The output picture $Y_3$ is calculated as $$Y_3(i) = \text{Clip1}\big(Y_2(i) + d_1 \cdot (f(i) > T \text{ ? } 1\text{:}0) - d_2 \cdot (f(i) < -T \text{ ? } 1\text{:}0)\big), \quad \text{(Eq. 1)}$$

where T is a predetermined positive constant and $d_1$ and $d_2$ are offset coefficients associated with two classes based on the sample-wise difference between $Y_1$ (i) and $Y_2$ (i) given by $$f(i) = Y_1(i) - Y_2(i). \quad \text{(Eq. 2)}$$

The first class for $d_1$ is given as taking all sample locations i such that f(i)>T while the second class for $d_2$ is given by f(i)<−T. The offset coefficients $d_1$ and $d_2$ are calculated at the encoder so that the mean square error between output picture $Y_3$ of SAOV and the original picture X is minimized, in the same way as in the existing SAO process. After SAOV is applied, the second SAO-like filter SAOH operates as applying SAO to $Y_4$, after SAOV has been applied, with a classification based on the sample-wise difference between $Y_3(i)$ and $Y_4(i)$, the output picture of the deblocking filter for the horizontal edges (DBFH)—see FIG. 5. The same procedure as SAOV is applied for SAOH with $Y_3(i)-Y_4(i)$ instead of $Y_1(i)-Y_2(i)$ for its classification. The two offset coefficients, a predetermined threshold value T and an enabling flag for each of SAOH and SAOV are signaled at the slice level. SAOH and SAOV are applied for luma and the two chroma components independently.

Note that both SAOV and SAOH operate only on the picture samples affected by the respective deblocking (DBFV or DBFH). Hence, unlike with the existing SAO process, only a subset of all samples in the given spatial region (picture, or CTU in case of legacy SAO) are being processed by the Pre-SAO, which keeps the resulting increase in decoder-side mean operations per picture sample low (two or three comparisons and two additions per sample in the worst-case scenario according to preliminary estimates). It should also be noted that Pre-SAO only needs samples used by the deblocking filter without storing additional samples at the decoder.

Figure 6:
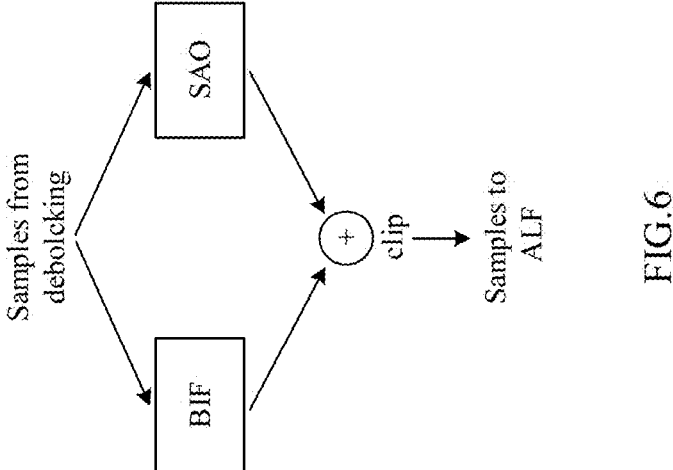
FIG. 6 illustrates an embodiment in accordance with some implementations of the present disclosure, in which both the BIF and SAO uses samples from the deblocking stage as input and create offsets respectively. The offsets are added to the input sample and clipped.

After VVC version 1 is finalized, bilateral filter is proposed for compression efficiency exploration beyond VVC and is studied if it has potential to be part of the next generation standard. The proposed filter is carried out in the sample adaptive offset (SAO) loop-filter stage, as shown in FIG. 6. Both the proposed bilateral filter (BIF) and SAO are using samples from deblocking as input. Each filter creates an offset per sample, and these are added to the input sample and then clipped, before proceeding to ALF.

In detail, the output sample $I_{OUT}$ is obtained as $$I_{OUT} = \text{clip3}(I_C + \Delta I_{BIF} + \Delta I_{SAO}), \quad \text{(Eq. 3)}$$

where $I_C$ is the input sample from deblocking, $\Delta I_{BIF}$ is the offset from the bilateral filter and $\Delta I_{SAO}$ is the offset from SAO.

The proposed implementation provides the possibility for the encoder to enable or disable filtering at the CTU and slice level. The encoder takes a decision by evaluating the RDO cost.

The following syntax elements are introduced in the PPS:
7.3.2.5 Picture Parameter Set RBSP Syntax

|  | Descriptor |
| --- | --- |
| pic_parameter_set_rbsp( ) { | |
| ... | |
|   pps_bilateral_filter_enabled_flag | u(1) |
|   if( pps_bilateral_filter_enabled_flag) { | |
|     bilateral_filter_strength | u(2) |
|     bilateral_filter_qp_offset | se(v) |
|   } | |

The semantic is as follows:
pps_bilateral_filter_enabled_flag equal to 0 specifies that the bilateral loop filter is disabled for slices referring to the PPS.

pps_bilateral_filter_flag equal to 1 specifies that the bilateral loop filter is enabled for slices referring to the PPS.

bilateral_filter_strength specifies a bilateral loop filter strength value used in the bilateral transform block filter process. The value of bilateral_filter_strength shall be in the range of 0 to 2, inclusive.

bilateral_filter_qp_offset specifies an offset used in the derivation of the bilateral filter look-up table, LUT(x), for slices referring to the PPS. bilateral_filter_qp_offset shall be in the range of −12 to +12, inclusive.

The following syntax elements, adapted from JVET-P0078, are introduced:

7.3.7 Slice Header Syntax

| | Descriptor |
|---|---|
| slice_header( ) { | |
| ... | |
|   if( pps_bilateral_filter_enabled_flag ) { | |
|     slice_bilateral_filter_all_ctb_enabled_flag | u(1) |
|     if( !slice_bilateral_filter_all_ctb_enabled_flag ) | |
|       slice_bilateral_filter_enabled_flag | u(1) |
|   } | |

7.3.11.2 Coding Tree Unit Syntax

| | Descriptor |
|---|---|
| coding_tree_unit( ) { | |
| ... | |
|   if( !slice_bilateral_filter_all_ctb_enabled_flag && | |
|   slice_bilateral_filter_enabled_flag ) | |
|     bilateral_filter_ctb_flag[ xCtb >> | u(1) |
|     CtbLog2SizeY ][ yCtb >> CtbLog2SizeY ] | |

The semantic is as follows:

slice_bilateral_filter_all_ctb_enabled_flag equal to 1 specifies that the bilateral filter is enabled and is applied to all CTBs in the current slice. When slice_bilateral_filter_all_ctb_enabled_flag is not present, it is inferred to be equal to 0. slice_bilateral_filter_enabled_flag equal to 1 specifies that the bilateral filter is enabled and may be applied to CTBs of the current slice. When slice_bilateral_filter_enabled_flag is not present, it is inferred to be equal to slice_bilateral_filter_all_ctb_enabled_flag.

bilateral_filter_ctb_flag[xCtb>>CtbLog2SizeY] [yCtb>>CtbLog2SizeY] equal to 1 specifies that the bilateral filter is applied to the luma coding tree block of the coding tree unit at luma location (xCtb, yCtb). bilateral_filter_ctb_flag [cIdx][xCtb>>CtbLog2SizeY][yCtb>> CtbLog2Size Y] equal to 0 specifies that the bilateral filter is not applied to the luma coding tree block of the coding tree unit at luma location (xCtb, yCtb). When bilateral_filter_ctb_flag is not present, it is inferred to be equal (slice_bilateral_filter_all_ctb_enabled_flag & slice_bilateral_filter_enabled_flag).

For CTUs that are filtered, the filtering process proceeds as follows.

At the picture border, where samples are unavailable, the bilateral filter uses extension (sample repetition) to fill in unavailable samples. For virtual boundaries, the behavior is the same as for SAO, i.e., no filtering occurs. When crossing horizontal CTU borders, the bilateral filter can access the same samples as SAO is accessing. As an example, if the center sample $I_C$ (see FIG. 7) is located on the top line of a CTU, $I_{NW}$, $I_A$ and $I_{NE}$ are read from the CTU above, just like SAO does, but $I_{AA}$ is padded, so no extra line buffer is needed compared to JVET-P0073.

Figure 7:
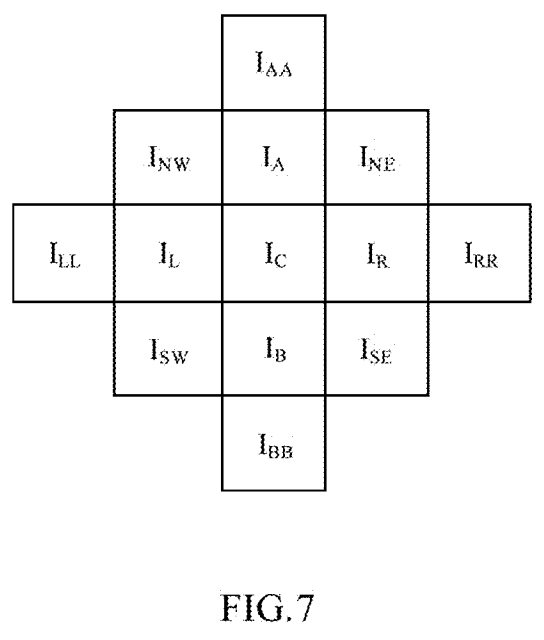

The samples surrounding the center sample $I_C$ are denoted according to FIG. 7, where A, B, L and R stands for above, below, left and right and where NW, NE, SW, SE stands for north-west etc. Likewise, AA stands for above-above, BB for below-below etc. This diamond shape is different from JVET-P0073 which used a square filter support, not using $I_{AA}$, $I_{BB}$, $I_{LL}$, Or $I_{RR}$.

Each surrounding sample $I_A$, $I_R$ etc will contribute with a corresponding modifier value $\mu_{\Delta I_A}$, $\mu_{\Delta I_R}$, etc. These are calculated the following way: Starting with the contribution from the sample to the right, $I_R$, the difference is calculated as $$\Delta I_R = (|I_R - I_C| + 4) \gg 3, \qquad \text{(Eq. 4)}$$

where |·| denotes absolute value. For data that is not 10-bit, $\Delta I_R = (|I_R - I_C| + 2^{n-6}) \gg (n-7)$ is used instead, where n=8 for 8-bit data etc. The resulting value is now clipped so that it is smaller than 16:

$$sI_R = \min(15, \Delta I_R). \qquad \text{(Eq. 5)}$$

The modifier value is now calculated as $$\mu_{\Delta I_R} = \begin{cases} LUT_{ROW}[sI_R], & \text{if } I_R - I_C \geq 0, \\ -LUT_{ROW}[sI_R] & \text{otherwise} \end{cases} \qquad \text{(Eq. 6)}$$

where $LUT_{ROW}[\,]$ is an array of 16 values determined by the value of qpb=clip(0, 25, QP+bilateral_filter_qp_offset−17):

{0, 0, 0, 0, 0, 0, 0, 0, 0, 0, 0, 0, 0, 0, 0, 0,}, if qpb=0

{0, 1, 1, 1, 1, 0, 0, 0, 0, 0, 0, 0, 0, 0, 0, 0,}, if qpb=1

{0, 2, 2, 2, 1, 1, 0, 1, 0, 0, 0, 0, 0, 0, 0, 0,}, if qpb=2

{0, 2, 2, 2, 2, 1, 1, 1, 1, 1, 1, 1, 0, 1, 1, −1,}, if qpb=3

{0, 3, 3, 3, 2, 2, 1, 2, 1, 1, 1, 1, 0, 1, 1, −1,}, if qpb=4

{0, 4, 4, 4, 3, 2, 1, 2, 1, 1, 1, 1, 0, 1, 1, −1,}, if qpb=5

{0, 5, 5, 5, 4, 3, 2, 2, 2, 2, 1, 0, 1, 1, −1,}, if qpb=6

{0, 6, 7, 7, 5, 3, 3, 3, 2, 2, 1, 1, 1, 1, −1,}, if qpb=7

{0, 6, 8, 8, 5, 4, 3, 3, 3, 3, 2, 1, 2, 2, −2,}, if qpb=8

{0, 7, 10, 10, 6, 4, 4, 4, 4, 3, 3, 2, 2, 2, 2, −2,}, if qpb=9

{0, 8, 11, 11, 7, 5, 5, 4, 5, 4, 4, 2, 2, 2, 2, −2,}, if qpb=10

{0, 8, 12, 13, 10, 8, 8, 6, 6, 6, 5, 3, 3, 3, 3, −2,}, if qpb=11

{0, 8, 13, 14, 13, 12, 11, 8, 8, 7, 7, 5, 5, 4, 4, −2,}, if qpb=12

{0, 9, 14, 16, 16, 15, 14, 11, 9, 9, 8, 6, 6, 5, 6, −3,}, if qpb=13

{0, 9, 15, 17, 19, 19, 17, 13, 11, 10, 10, 8, 8, 6, 7, −3,}, if qpb=14

{0, 9, 16, 19, 22, 22, 20, 15, 12, 12, 11, 9, 9, 7, 8, −3,}, if qpb=15

{0, 10, 17, 21, 24, 25, 24, 20, 18, 17, 15, 12, 11, 9, 9, −3,}, if qpb=16

{0, 10, 18, 23, 26, 28, 28, 25, 23, 22, 18, 14, 13, 11, 11, −3,}, if qpb=17

{0, 11, 19, 24, 29, 30, 32, 30, 29, 26, 22, 17, 15, 13, 12, −3,}, if qpb=18

{0, 11, 20, 26, 31, 33, 36, 35, 34, 31, 25, 19, 17, 15, 14, −3,}, if qpb=19

{0, 12, 21, 28, 33, 36, 40, 40, 40, 36, 29, 22, 19, 17, 15, −3,}, if qpb=20

{0, 13, 21, 29, 34, 37, 41, 41, 41, 38, 32, 23, 20, 17, 15, −3,}, if qpb=21

{0, 14, 22, 30, 35, 38, 42, 42, 42, 39, 34, 24, 20, 17, 15, −3,}, if qpb=22

{0, 15, 22, 31, 35, 39, 42, 42, 43, 41, 37, 25, 21, 17, 15, −3,}, if qpb=23

{0, 16, 23, 32, 36, 40, 43, 43, 44, 42, 39, 26, 21, 17, 15, −3,}, if qpb=24

{0, 17, 23, 33, 37, 41, 44, 44, 45, 44, 42, 27, 22, 17, 15, −3,}, if qpb=25

This is different from JVET-P0073 where 5 such tables were used, and the same table was reused for several qp-values.

As described in JVET-N0493 section 3.1.3, these values can be stored using six bits per entry resulting in 26*16*6/8=312 bytes or 300 bytes if excluding the first row which is all zeros.

The modifier values for $\mu_{\Delta I_L}$, $\mu_{\Delta I_A}$ and $\mu_{\Delta I_B}$ are calculated from $I_L$, $I_A$ and $I_B$ in the same way. For diagonal samples $I_{NW}$, $I_{NE}$, $I_{SE}$, $I_{SW}$, and the samples two steps away $I_{AA}$, $I_{BB}$, $I_{RR}$ and $I_{LL}$, the calculation also follows Equations 4 and 5, but uses a value shifted by 1. Using the diagonal sample $I_{SE}$ as an example, $\mu_{\Delta I_{SE}}$ is calculated as $$\mu_{\Delta I_{SE}} = \begin{cases} LUT_{ROW}[sI_{SE}] \gg 1, & \text{if } I_{SE} - I_C \geq 0, \\ -(LUT_{ROW}[sI_{SE}] \gg 1) & \text{otherwise} \end{cases} \qquad \text{(Eq. 7)}$$

and the other diagonal samples and two-steps-away samples are calculated likewise. The modifier values are summed together as $$m_{sum} = \mu_{\Delta I_A} + \mu_{\Delta I_B} + \mu_{\Delta I_L} + \mu_{\Delta I_R} + \mu_{\Delta I_{NW}} + \qquad \text{(Eq. 8)}$$
$$\mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}.$$

Note that $\mu_{\Delta I_R}$ equals $-\mu_{\Delta I_A}$ for the previous sample. Likewise, $\mu_{\Delta I_A}$ equals $-\mu_{\Delta I_B}$ for the sample above, and similar symmetries can be found also for the diagonal- and two-steps-away modifier values. This means that in a hardware implementation, it is sufficient to calculate the six values $\mu_{\Delta I_R}$, $\mu_{\Delta I_B}$, $\mu_{\Delta I_{SW}}$, $\mu_{\Delta I_{SE}}$, $\mu_{\Delta I_{RR}}$ and $\mu_{\Delta I_{BB}}$ and the remaining six values can be obtained from previously calculated values.

The $m_{sum}$ value is now multiplied either by c=1, 2 or 3, which can be done using a single adder and logical AND gates in the following way:

$$c_v = k_1 \& (m_{sum} \ll 1) + k_2 \& m_{sum}, \qquad \text{(Eq. 9)}$$

where & denotes logical AND and $k_1$ is the most significant bit of the multiplier c and $k_2$ is the least significant bit. The value to multiply with is obtained using the minimum block dimension D=min(width, height) as shown in Table 1:

TABLE 1

| | Obtaining the c parameter from the minimum size D = min(width, height) of the block. | | |
| --- | --- | --- | --- |
| Block type | D ≤ 4 | 4 < D < 16 | D ≥ 16 |
| Intra | 3 | 2 | 1 |
| Inter | 2 | 2 | 1 |

Finally, the bilateral filter offset $\Delta I_{BIF}$ is calculated. For full strength filtering, $\Delta I_{BIF}$ is calculated as $$\Delta I_{BIF} = (c_v + 16) \gg 5, \qquad \text{(Eq. 10)}$$

whereas for half-strength filtering, $\Delta I_{BIF}$ is instead calculated as $$\Delta I_{BIF} = (c_v + 32) \gg 6. \qquad \text{(Eq. 11)}$$

A general formula for n-bit data is to use $$r_{add} = 2^{14-n-bilateral\_filter\_strength} \qquad \text{(Eq. 12)}$$
$$r_{shift} = 15 - n - \text{bilateal\_filter\_strength}$$
$$\Delta I_{BIF} = (c_v + r_{add}) \gg r_{shift},$$

where bilateral_filter_strength can be 0 or 1 and is signalled in the pps.

In VVC, an Adaptive Loop Filter (ALF) with block-based filter adaption is applied. For the luma component, one among 25 filters is selected for each 4×4 block, based on the direction and activity of local gradients.

Figure 8:
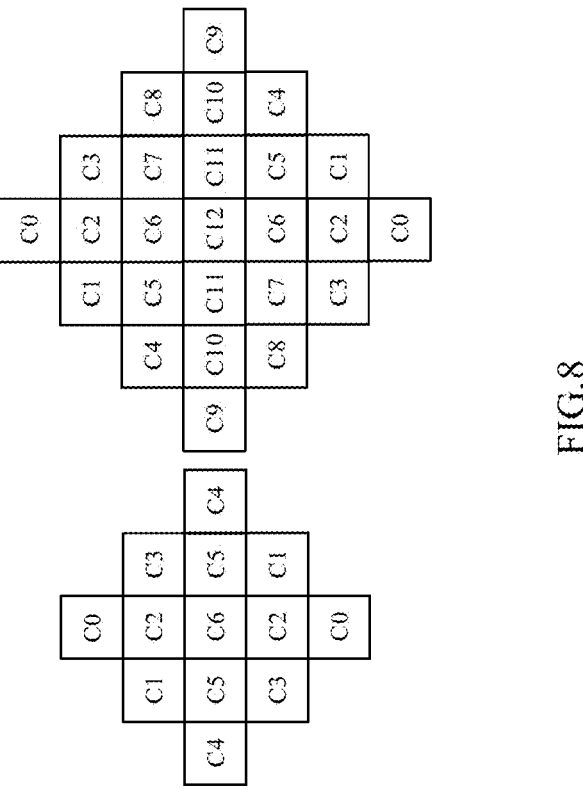
FIG. 8 illustrates the ALF filter shapes (chroma: 5×5 diamond, luma: 7×7 diamond) in accordance with some implementations of the present disclosure.

Two diamond filter shapes (as shown in FIG. 8) are used. The 7×7 diamond shape is applied for luma component and the 5×5 diamond shape is applied for chroma components.

For luma component, each 4×4 block is categorized into one out of 25 classes. The classification index C is derived based on its directionality D and a quantized value of activity Â, as follows:

$$C = 5D + \hat{A} \qquad \text{(Eq. 13)}$$

To calculate D and Â, gradients of the horizontal, vertical and two diagonal directions are first calculated using 1-D Laplacian:

$$g_v = \sum_{k=i-2}^{i+3} \sum_{l=j-2}^{j+3} V_{k,l}, \qquad \text{(Eq. 14)}$$
$$V_{k,l} = |2R(k, l) - R(k, l-1) - R(k, l+1)|$$
$$g_h = \sum_{k=i-2}^{i+3} \sum_{l=j-2}^{j+3} H_{k,l}, \qquad \text{(Eq. 15)}$$
$$H_{k,l} = |2R(k, l) - R(k-1, l) - R(k+1, l)|$$
$$g_{d1} = \sum_{k=i-2}^{i+3} \sum_{l=j-3}^{j+3} D1_{k,l}, \qquad \text{(Eq. 16)}$$
$$D1_{k,l} = |2R(k, l) - R(k-1, l-1) - R(k+1, l+1)|$$
$$g_{d2} = \sum_{k=i-2}^{i+3} \sum_{j=j-2}^{j+3} D2_{k,l}, \qquad \text{(Eq. 17)}$$
$$D2_{k,l} = |2R(k, l) - R(k-1, l+1) - R(k+1, l-1)|$$

where indices i and j refer to the coordinates of the upper left sample within the 4×4 block and R(i, j) indicates a reconstructed sample at coordinate (i, j).

To reduce the complexity of block classification, the subsampled 1-D Laplacian calculation is applied. As shown in FIG. 9, the same subsampled positions are used for gradient calculation of all directions.

Then D maximum and minimum values of the gradients of horizontal and vertical directions are set as:

$$g_{h,v}^{max} = \max(g_h, g_v), \; g_{h,v}^{min} = \min(g_h, g_v) \qquad \text{(Eq. 18)}$$

The maximum and minimum values of the gradient of two diagonal directions are set as:

$$g_{d0,d1}^{max} = \max(g_{d0}, g_{d1}), \; g_{d0,d1}^{min} = \min(g_{d0}, g_{d1}) \qquad \text{(Eq. 19)}$$

To derive the value of the directionality D, these values are compared against each other and with two thresholds $t_1$ and $t_2$ in the following steps:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max} / g_{h,v}^{min} > g_{d0,d1}^{max} / g_{d0,d1}^{min},$$

continue from Step 3; otherwise continue from Step 4.

Step 3. If $$g_{h,v}^{max} > t_2 \cdot g_{h,v}^{min}, D$$

is set to 2; otherwise D is set to 1.

Step 4. If $$g_{d0,d1}^{max} > t_2 \cdot g_{d0,d1}^{min}, D$$

is set to 4; otherwise D is set to 3.

The activity value A is calculated as:

$$A = \sum_{k=i-2}^{i+3} \sum_{l=j-2}^{j+3} (V_{k,l} + H_{k,l}) \qquad \text{(Eq. 20)}$$

A is further quantized to the range of 0 to 4, inclusively, and the quantized value is denoted as Â. For chroma components in a picture, no classification method is applied.

Before filtering each 4×4 luma block, geometric transformations such as rotation or diagonal and vertical flipping are applied to the filter coefficients f(k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k, l) = f(l, k), \qquad \text{(Eq. 21)}$$
$$c_D(k, l) = c(l, k),$$
$$\text{Vertical flip: } f_V(k, l) = f(k, K-l-1), \qquad \text{(Eq. 22)}$$
$$c_V(k, l) = c(k, K-l-1)$$
$$\text{Rotation: } f_R(k, l) = f(K-l-1, k), \qquad \text{(Eq. 23)}$$
$$c_R(k, l) = c(K-l-1, k)$$

where K is the size of the filter and $0 \le k$, $l \le K-1$ are coefficients coordinates, such that location (0,0) is at the upper left corner and location (K−1, K−1) is at the lower right corner. The transformations are applied to the filter coefficients f(k, l) and to the clipping values c(k, l) depending on gradient values calculated for that block. The relationship between the transformation and the four gradients of the four directions are summarized in the following Table 2.

TABLE 2

| Mapping of the gradient calculated for one block and the transformations | |
|---|---|
| Gradient values | Transformation |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

At decoder side, when ALF is enabled for a CTB, each sample R(i, j) within the CU is filtered, resulting in sample value R'(i, j) as shown below, $$\qquad \text{(Eq. 24)}$$
$$R'(i, j) = R(i, j) +$$
$$\left( \left( \sum_{k \ne 0} \sum_{l \ne 0} f(k, l) \times K(R(i+k, j+l) - R(i, j), c(k, l)) + 64 \right) \gg 7 \right)$$

where f(k,l) denotes the decoded filter coefficients, K(x,y) is the clipping function and c(k,l) denotes the decoded clipping parameters. The variable k and I vary between $$-\frac{L}{2} \text{ and } \frac{L}{2}$$

where L denotes the filter length. The clipping function K(x,y)=min(y, max(−y,x)) which corresponds to the function Clip3 (−y, y, x). The clipping operation introduces non-linearity to make ALF more efficient by reducing the impact of neighbor sample values that are too different with the current sample value.

Figures 10A, 10B:
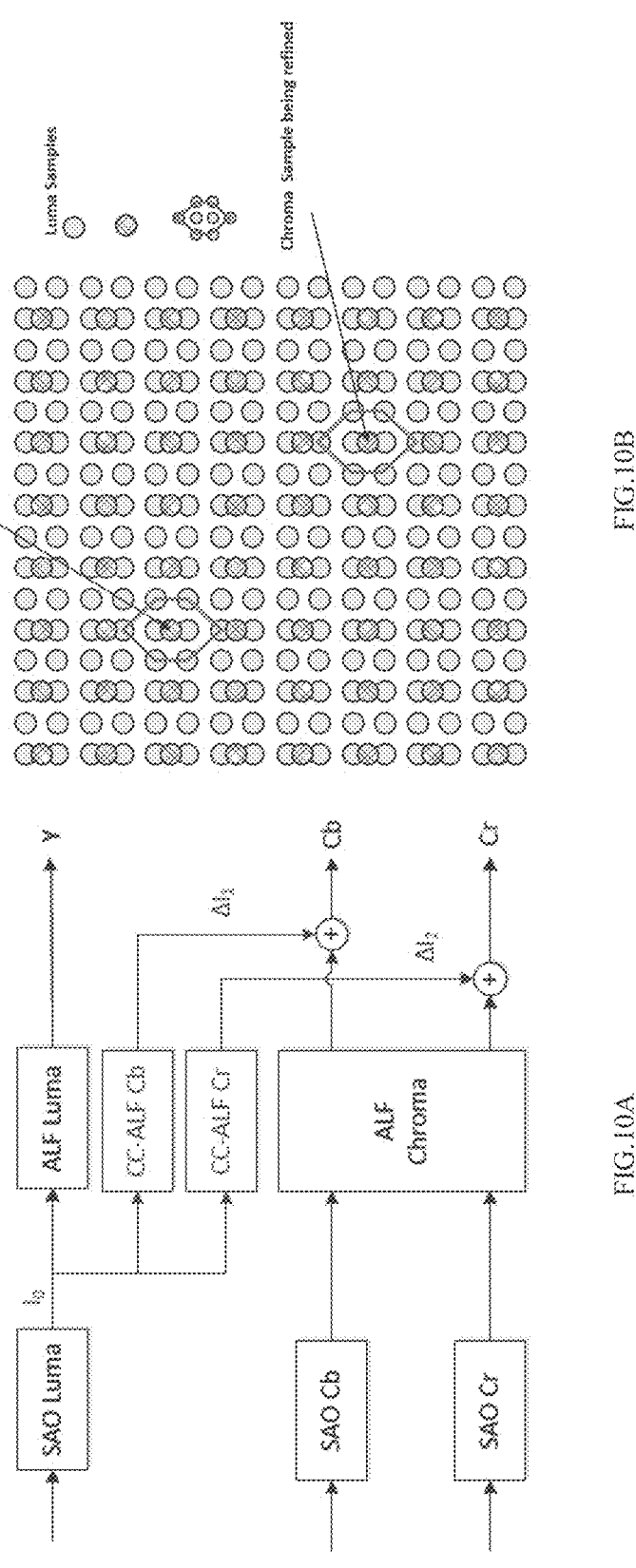

CC-ALF uses luma sample values to refine each chroma component by applying an adaptive, linear filter to the luma channel and then using the output of this filtering operation for chroma refinement. FIG. 10A provides a system level diagram of the CC-ALF process with respect to the SAO, luma ALF and chroma ALF processes.

Filtering in CC-ALF is accomplished by applying a linear, diamond shaped filter (FIG. 10B) to the luma channel. One filter is used for each chroma channel, and the operation is expressed as $$\Delta I_i(x, y) = \sum_{(x_0, y_0) \in S_i} I_0(x_Y + x_0, y_Y + y_0) c_i(x_0, y_0) \qquad \text{(Eq. 25)}$$

where $(x, y)$ is chroma component i location being refined $(x_y, y_y)$ is the luma location based on $(x, y)$, $S_i$ is filter support area in luma component, $c_i(x_0, y_0)$ represents the filter coefficients.

As shown in FIG. 10B, the luma filter support is the region collocated with the current chroma sample after accounting for the spatial scaling factor between the luma and chroma planes.

In the VVC reference software, CC-ALF filter coefficients are computed by minimizing the mean square error of each chroma channels with respect to the original chroma content. To achieve this, the VTM algorithm uses a coefficient derivation process similar to the one used for chroma ALF. Specifically, a correlation matrix is derived, and the coefficients are computed using a Cholesky decomposition solver in an attempt to minimize a mean square error metric. In designing the filters, a maximum of 8 CC-ALF filters can be designed and transmitted per picture. The resulting filters are then indicated for each of the two chroma channels on a CTU basis.

Additional characteristics of CC-ALF include:

The design uses a 3×4 diamond shape with 8 taps.

Seven filter coefficients are transmitted in the APS.

Each of the transmitted coefficients has a 6-bit dynamic range and is restricted to power-of-2 values.

The eighth filter coefficient is derived at the decoder such that the sum of the filter coefficients is equal to 0.

An APS may be referenced in the slice header.

CC-ALF filter selection is controlled at CTU-level for each chroma component.

Boundary padding for the horizontal virtual boundaries uses the same memory access pattern as luma ALF.

As an additional feature, the reference encoder can be configured to enable some basic subjective tuning through the configuration file. When enabled, the VTM attenuates the application of CC-ALF in regions that are coded with high QP and are either near mid-grey or contain a large amount of luma high frequencies. Algorithmically, this is accomplished by disabling the application of CC-ALF in CTUs where any of the following conditions are true:

The slice QP value minus 1 is less than or equal to the base QP value.

The number of chroma samples for which the local contrast is greater than $(1<<(\text{bitDepth}-2))-1$ exceeds the CTU height, where the local contrast is the difference between the maximum and minimum luma sample values within the filter support region.

More than a quarter of chroma samples are in the range between $(1<<(\text{bitDepth}-1))-16$ and $(1<<(\text{bitDepth}-1))+16$.

The motivation for this functionality is to provide some assurance that CC-ALF does not amplify artifacts introduced earlier in the decoding path (this is largely due the fact that the VTM currently does not explicitly optimize for chroma subjective quality). It is anticipated that alternative encoder implementations would either not use this functionality or incorporate alternative strategies suitable for their encoding characteristics.

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a table of clipping values for both luma and chroma components. These clipping values are dependent of the internal bitdepth. More precisely, the clipping values are obtained by the following formula:

$$\text{AlfClip} = \{\text{round}(2^{B-\alpha*n}) \text{ for } n \in [0 \ldots N-1]\} \qquad \text{(Eq. 26)}$$

where B equal to the internal bitdepth, $\alpha$ is a pre-defined constant value equal to 2.35, and N equal to 4 which is the number of allowed clipping values in VVC. The AlfClip is then rounded to the nearest value with the format of power of 2.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

In VVC, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 11, with N equal to 4 for the luma component and 2 for the chroma component.

Figure 11:
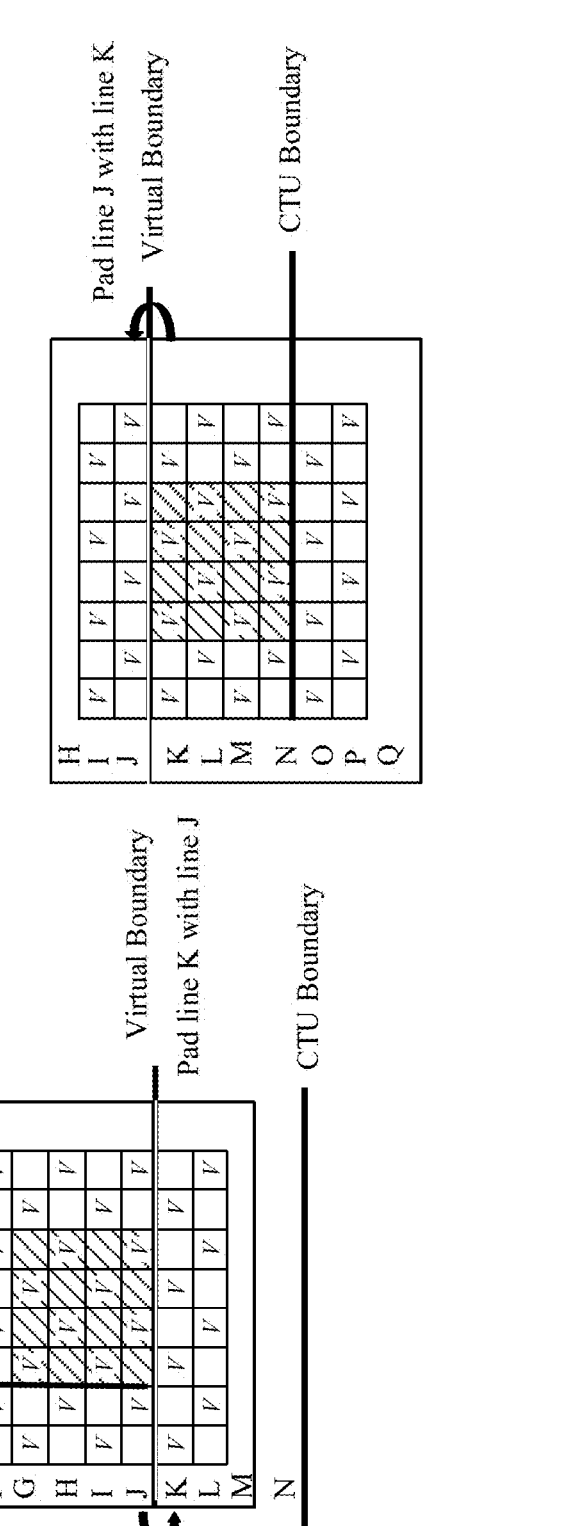
FIG. 11 illustrates an embodiment in accordance with some implementations of the present disclosure, which shows the modified block classification at virtual boundaries.

Modified block classification is applied for the luma component as depicted in FIG. 11. For the 1D Laplacian gradient calculation of the 4×4 block above the virtual boundary, only the samples above the virtual boundary are used. Similarly for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, symmetric padding operation at the virtual boundaries are used for both luma and chroma components. As shown in FIG. 12, when the sample being filtered is located below the virtual boundary, the neighboring samples that are located above the virtual boundary are padded. Meanwhile, the corresponding samples at the other sides are also padded, symmetrically.

Different to the symmetric padding method used at horizontal CTU boundaries, simple padding process is applied for slice, tile and subpicture boundaries when filter across the boundaries is disabled. The simple padding process is also applied at picture boundary. The padded samples are used for both classification and filtering process. To compensate for the extreme padding when filtering samples just above or below the virtual boundary the filter strength is reduced for those cases for both luma and chroma by increasing the right shift in equation 24 by 3.

For the existing SAO design in the HEVC, VVC, AVS2 and AVS3 standards, the luma Y, chroma Cb and chroma Cr sample offset values are decided independently. That is, for example, the current chroma sample offset is decided by only current and neighboring chroma sample values, without taking collocated or neighboring luma samples into consideration. However, luma samples preserve more original picture detail information than chroma samples, and they can benefit the decision of the current chroma sample offset. Furthermore, since chroma samples usually lost high frequency details after color conversion from RGB to YCbCr, or after quantization and deblocking filter, introducing luma samples with high frequency detail preserved for chroma offset decision can benefit chroma sample reconstruction. Hence, further gain can be expected by exploring cross-component correlation. Note the correlation here not only includes cross-component sample values but includes picture/coding information such as prediction/residual coding modes, transform types, quantization/deblcoking/SAO/ALF parameters from cross-components.

Another example is for SAO, the luma sample offsets are decided only by luma samples, however, for example, a luma sample with the same BO classification can be further classified by its collocated and neighboring chroma samples, thus may lead to a more effective classification. SAO classification can be taken as a shortcut to compensate the sample difference between the original picture and the reconstructed picture, so an effective classification is desired.

One focus of the disclosure is to improve the coding efficiency of luma and chroma components, with similar design spirit of SAO but introducing cross-component information. SAO is used in the HEVC, VVC, AVS2 and AVS3 standards. To facilitate the description of the disclosure, the existing SAO technology in the abovementioned standards is briefly reviewed. Then, the proposed methods with examples are provided.

Please note that though the existing SAO design in the HEVC, VVC, AVS2, and AVS3 standards is used as the basic SAO method in the following description, to a person skilled in the art of video coding, the proposed cross-component method described in the disclosure can also be applied to other loop filter designs or other coding tools with similar design spirits. For example, in the AVS3 standard, SAO is replaced by a coding tool called Enhanced Sample Adaptive Offset (ESAO), however, the proposed CCSAO can also be applied in parallel with ESAO. Another example where CCSAO can be applied in parallel is Constrained Directional Enhancement Filter (CDEF) in the AV1 standard.

Figure 13A:
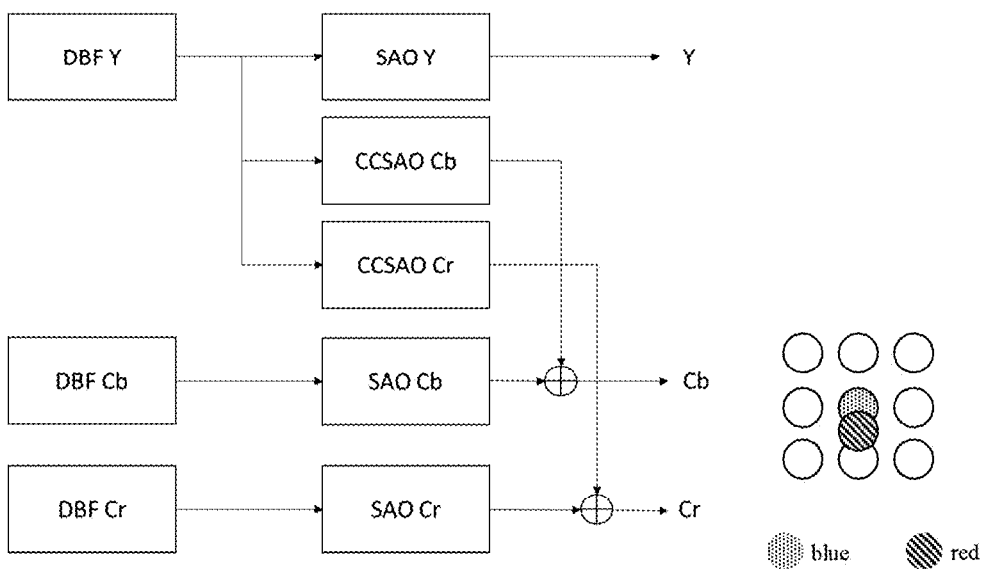
Figure 13B:
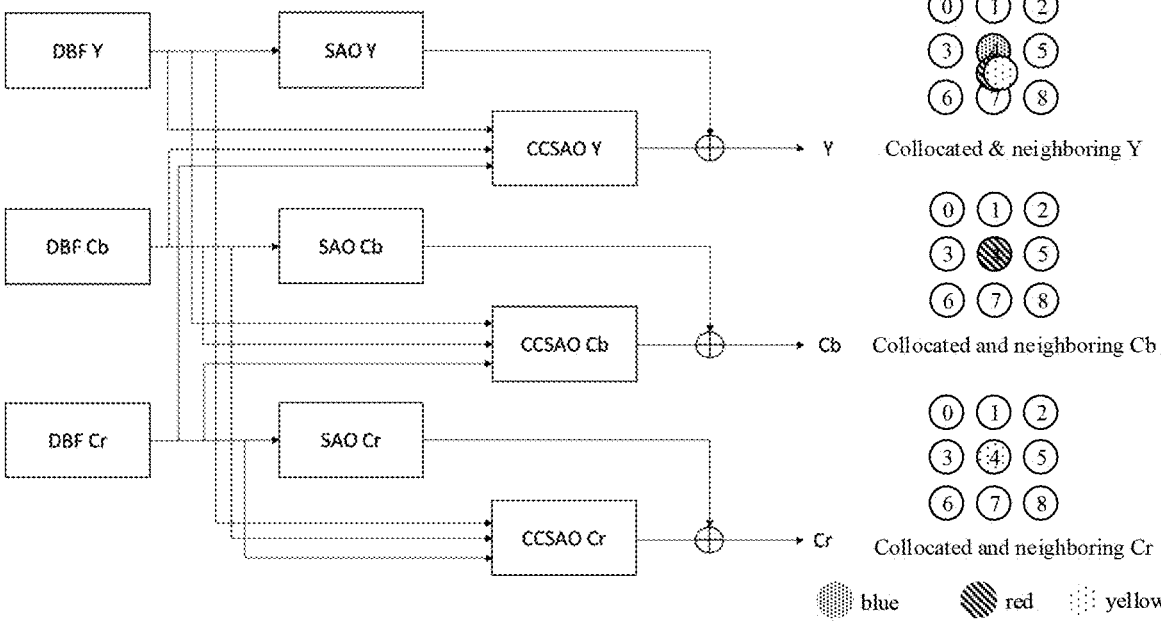
Figure 13C:
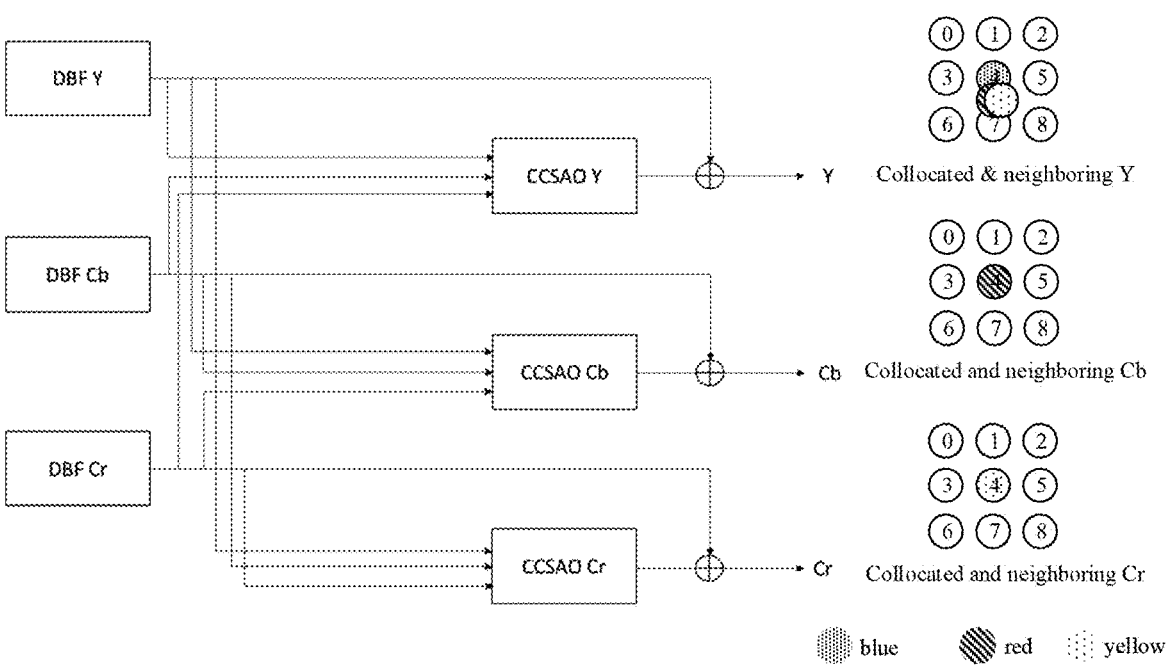
Figure 13D:
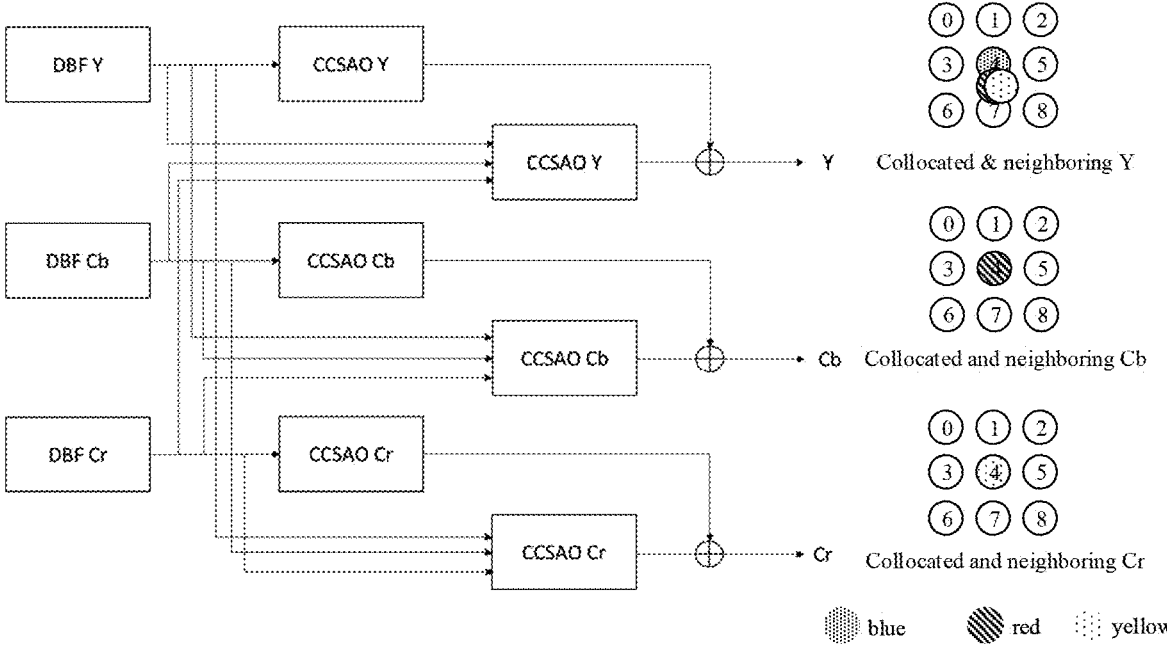
Figure 13E:
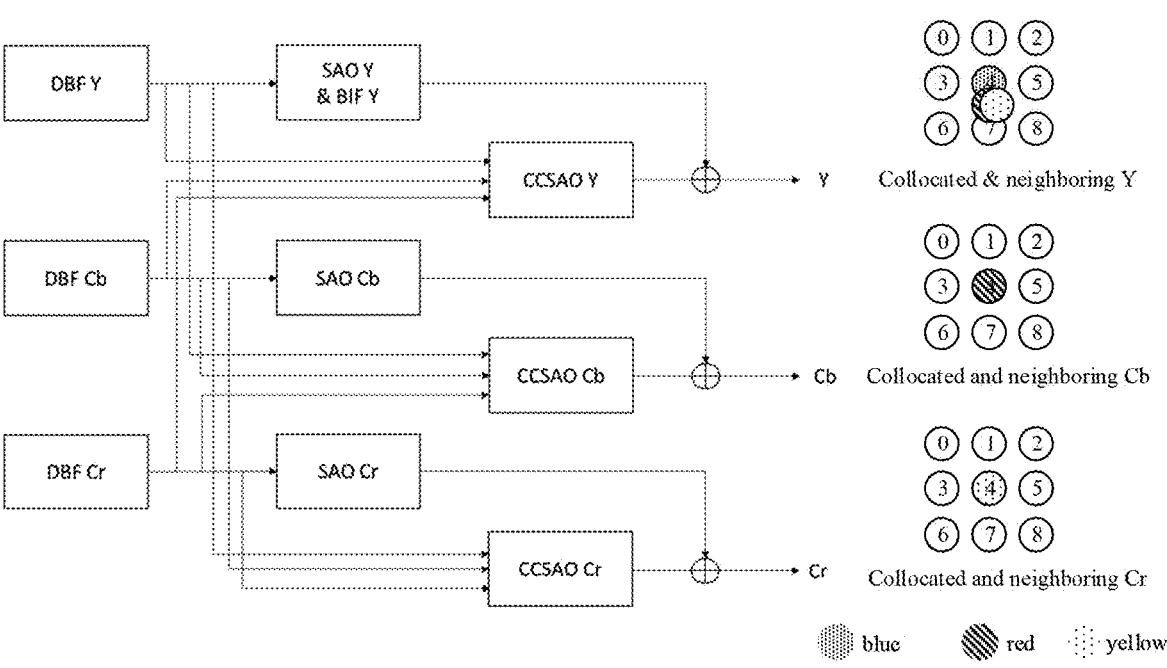
FIG. 13E shows CCSAO applied in parallel with SAO and BIF.
Figure 13F:
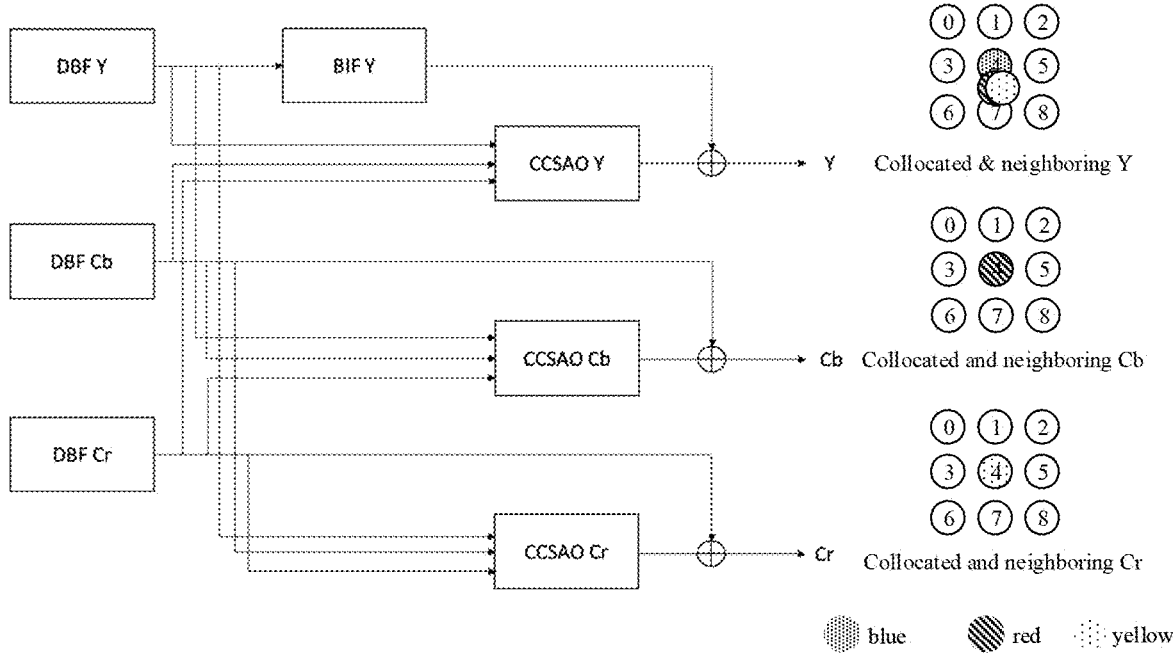

FIG. 13A to FIG. 13F show the diagrams of the proposed method. As illustrated in FIG. 13A, the luma samples after luma deblocking filter (DBF Y) is used to determine additional offsets for chroma Cb and Cr after SAO Cb and SAO Cr. For example, the current chroma sample (red) is first classified using collocated (blue) and neighboring (white) luma samples, and the CCSAO offset of the corresponding class is added to the current chroma sample. As illustrated in FIG. 13B, CCSAO applies on luma and chroma samples, and uses DBF Y/Cb/Cr as input. As illustrated in FIG. 13C, CCSAO can work independently. As illustrated in FIG. 13D, CCSAO can be applied recursively (2 or N times) with same or different offsets in the same codec stage or repeated in the different stages. As illustrated in FIG. 13E, CCSAO can be applied in parallel with SAO and BIF. As illustrated in FIG. 13F, CCSAO replaces SAO and applies in parallel with BIF. To conclude, (1) for classifying the current luma sample, information of current and neighboring luma samples. collocated and neighboring chroma samples (Cb and Cr), can be used;

(2) for classifying the current chroma sample (Cb or Cr), information of collocated and neighboring luma samples, collocated and neighboring cross-chroma samples, and current and neighboring chroma samples can be used.

Figure 14:
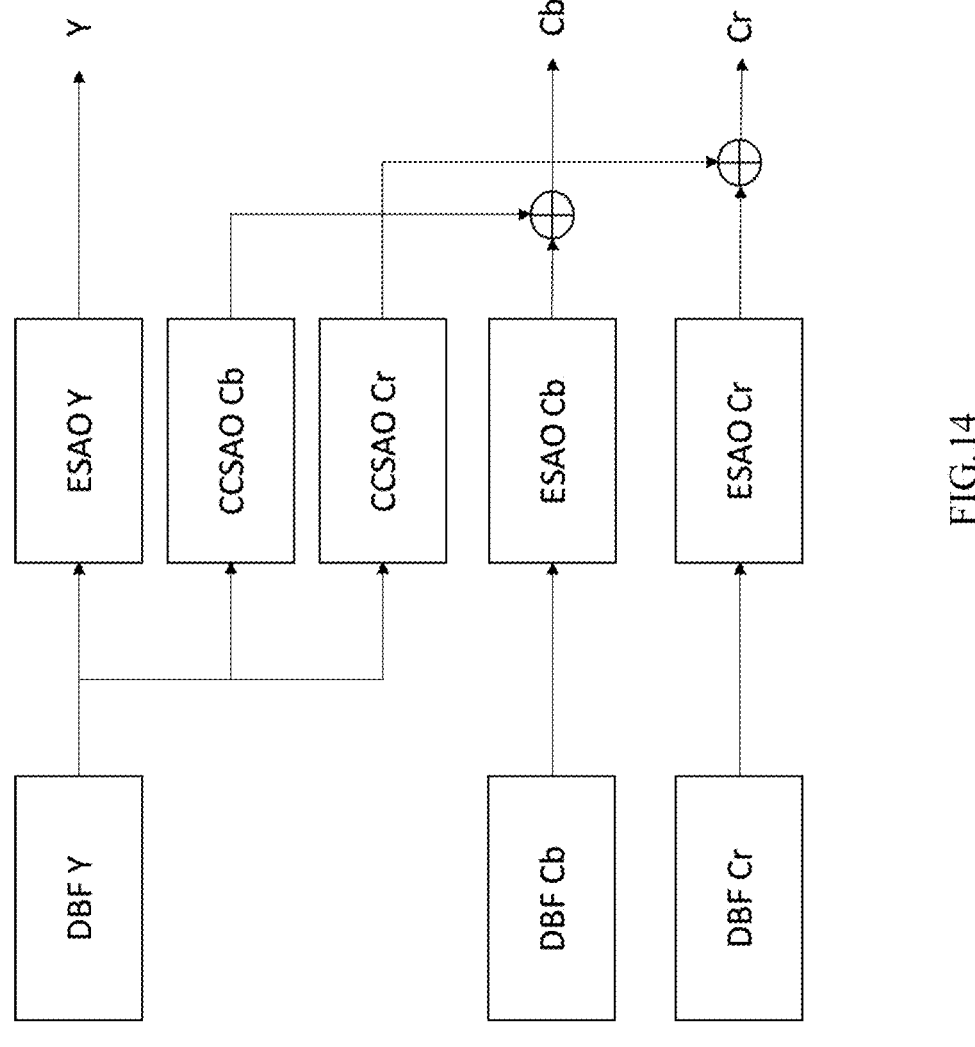
FIG. 14 illustrates an embodiment in accordance with some implementations of the present disclosure, which shows CCSAO can also be applied in parallel with other coding tools, such as ESAO in the AVS standard, CDEF in the AV1 standard, or Neural Network Loop Filter (NNLF).
Figure 15A:
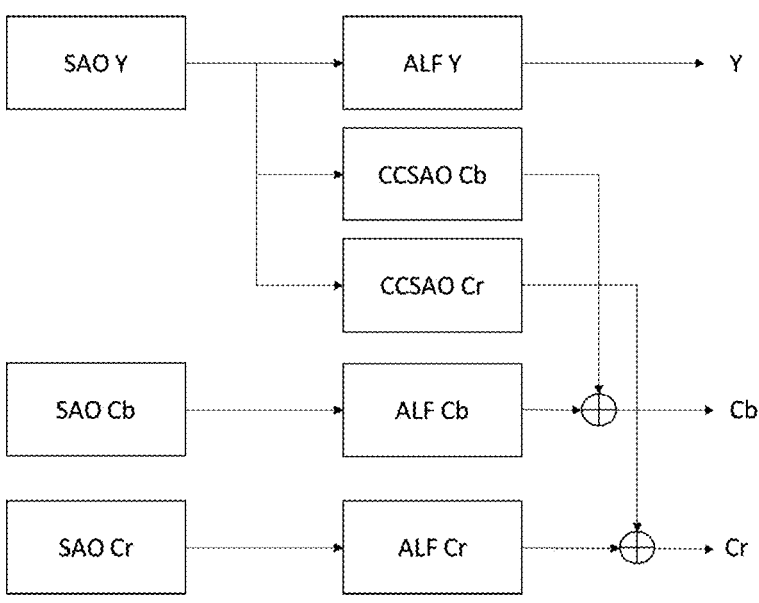
Figure 15B:
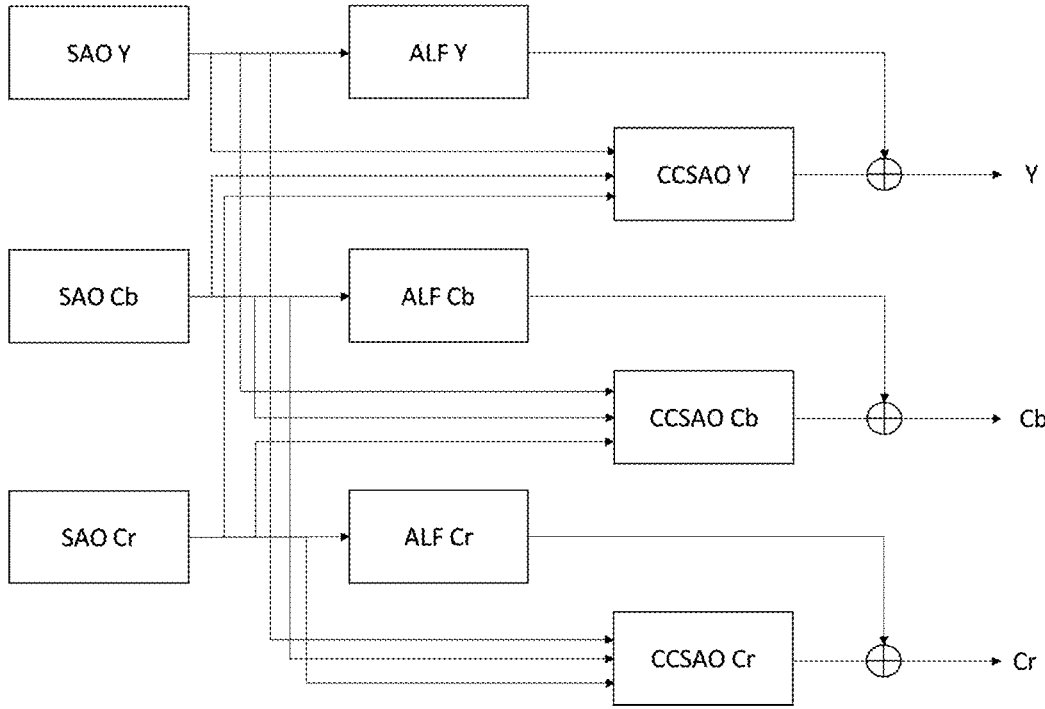
Figure 15C:
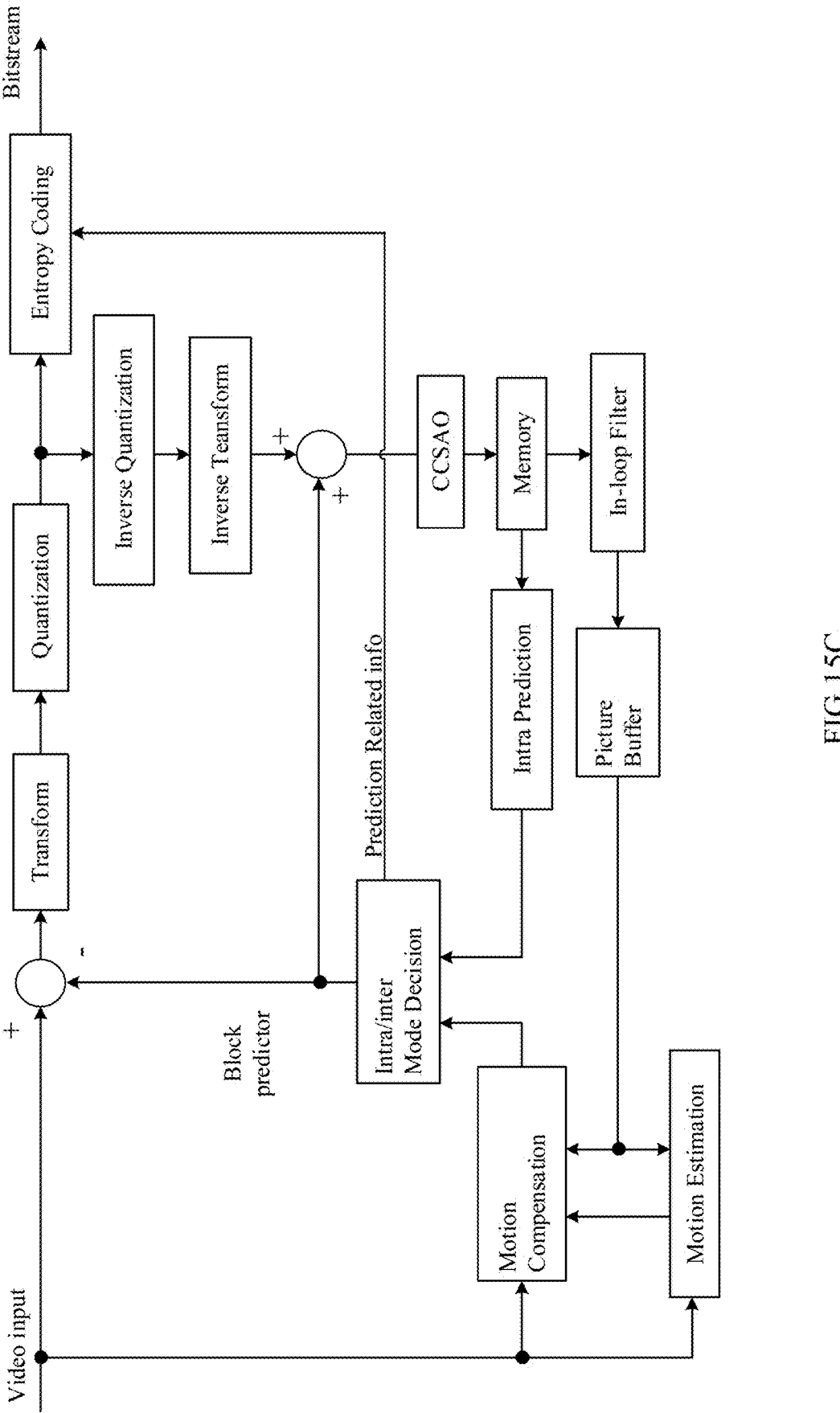
Figure 16:
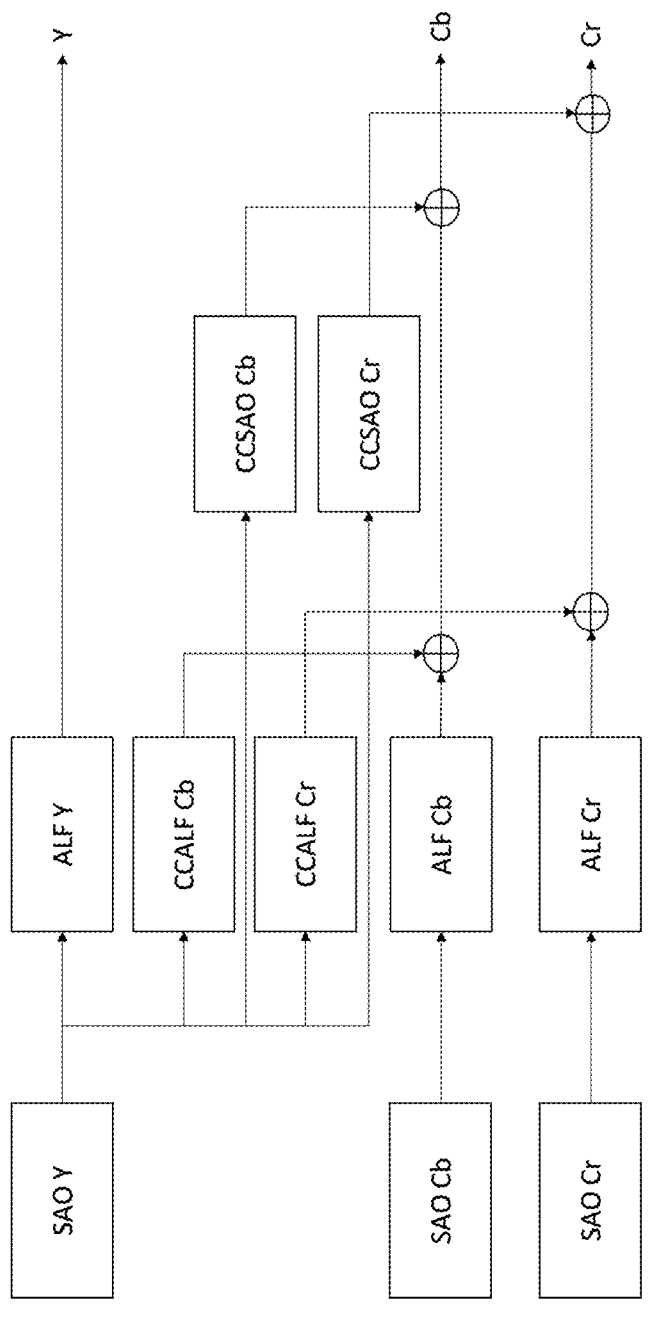
FIG. 16 illustrates an embodiment in accordance with some implementations of the present disclosure, which shows CCSAO can also be applied in parallel with CCALF, and the location of CCALF and CCSAO can be switched.

FIG. 14 shows that CCSAO can also be applied in parallel with other coding tools. For example, ESAO in the AVS standard, or CDEF in the AV1 standard. FIG. 15A shows the location of CCSAO can be after SAO, i.e., the location of CCALF in the VVC standard. FIG. 15B shows CCSAO can work independently without CCALF. FIG. 16 shows CCSAO can also be applied in parallel with CCALF. In FIG. 16, the location of CCALF and CCSAO can be switched. Note in FIG. 13A to FIG. 16, or other place in this disclosure, the SAO Y/Cb/Cr blocks can be replaced by ESAO Y/Cb/Cr (in AVS3) or CDEF (in AV1). Note Y/Cb/Cr also can be denoted as Y/U/V in video coding area.

Note if the video is RGB format, the proposed CCSAO can also be applied by simply mapping YUV notation to GBR in the below paragraphs, for example.

Note the figures in this disclosure can be combined with all examples mentioned in this disclosure.

FIG. 13A to FIG. 13F and FIG. 19 show the input of CCSAO classification. FIG. 13A to FIG. 13F and FIG. 19 also show that all collocated and neighboring luma/chroma samples can be fed into CCSAO classification. Please note that the classifiers mentioned in this disclosure not only can serve cross-component classification (for example, using luma to classify chroma or vice versa) but also can serve single component classification (for example, using luma to classify luma or using chroma to classify chroma), as the newly proposed classifier in this disclosure may also benefit the original SAO classification.

A classifier example (C0) is using the collocated luma or chroma sample value (Y0 in FIG. 13A) (Y4/U4/V4 in FIG. 13B to FIG. 13C) for classification. Let band_num be the number of equally divided bands of luma or chroma dynamic range, bit_depth is the sequence bitdepth, an example of the class index for the current chroma sample is $$\text{Class } (C0) = (Y0 * \text{band\_num}) >> \text{bit\_depth} \qquad \text{(Eq. 27)}$$

The classification can take rounding into account:

$$\text{Class } (C0) = ((Y0 * \text{band\_num}) + (1 \ll \text{bit\_depth})) >> \text{bit\_depth} \quad \text{(Eq. 28)}$$

Some band_num and bit_depth examples are listed as below in Table 3.

TABLE 3

| band_num | | 16 |
|---|---|---|
| bit_depth | | 10 |
| Class | | Y0 |
| 0 | 0 | 63 |
| 1 | 64 | 127 |
| 2 | 128 | 191 |
| 3 | 192 | 255 |
| 4 | 256 | 319 |
| 5 | 320 | 383 |
| 6 | 384 | 447 |
| 7 | 448 | 511 |
| 8 | 512 | 575 |
| 9 | 576 | 639 |
| 10 | 640 | 703 |
| 11 | 704 | 767 |
| 12 | 768 | 831 |
| 13 | 832 | 895 |
| 14 | 896 | 959 |
| 15 | 960 | 1023 |
| band_num | | 7 |
| bit_depth | | 10 |
| Class | | Y0 |
| 0 | 0 | 145 |
| 1 | 146 | 292 |
| 2 | 293 | 438 |
| 3 | 439 | 584 |
| 4 | 585 | 730 |
| 5 | 731 | 877 |
| 6 | 878 | 1023 |
| band_num | | 7 |
| bit_depth | | 8 |
| Class | | Y0 |
| 0 | 0 | 36 |
| 1 | 37 | 72 |
| 2 | 73 | 109 |
| 3 | 110 | 145 |
| 4 | 146 | 182 |
| 5 | 183 | 218 |
| 6 | 219 | 255 |

Figure 17:
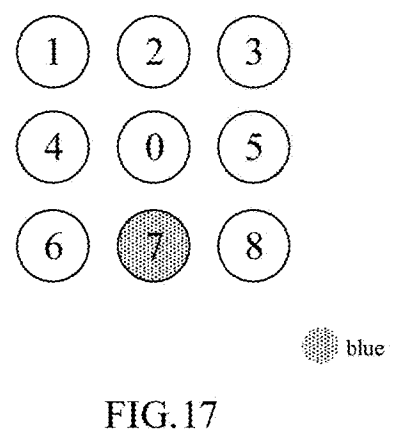

Using different luma (or chroma) sample position for C0 classification can be another classifier. For example, using the neighboring Y7 but not Y0 for C0 classification, as shown in FIG. 17. Different classifiers can be switched in SPS/APS/PPS/PH/SH/Region/CTU/CU/Subbblock/Sample levels. For example, in FIG. 17, using Y0 for POC0 but using Y7 for POC1, as shown in the following Table 4:

TABLE 4

| POC | Classifier | C0 band_num | Total classes |
|---|---|---|---|
| 0 | C0 using Y0 position | 8 | 8 |
| 1 | C0 using Y7 position | 8 | 8 |

Figures 18A, 18B, 18C, 18D, 18E, 18F, 18G:
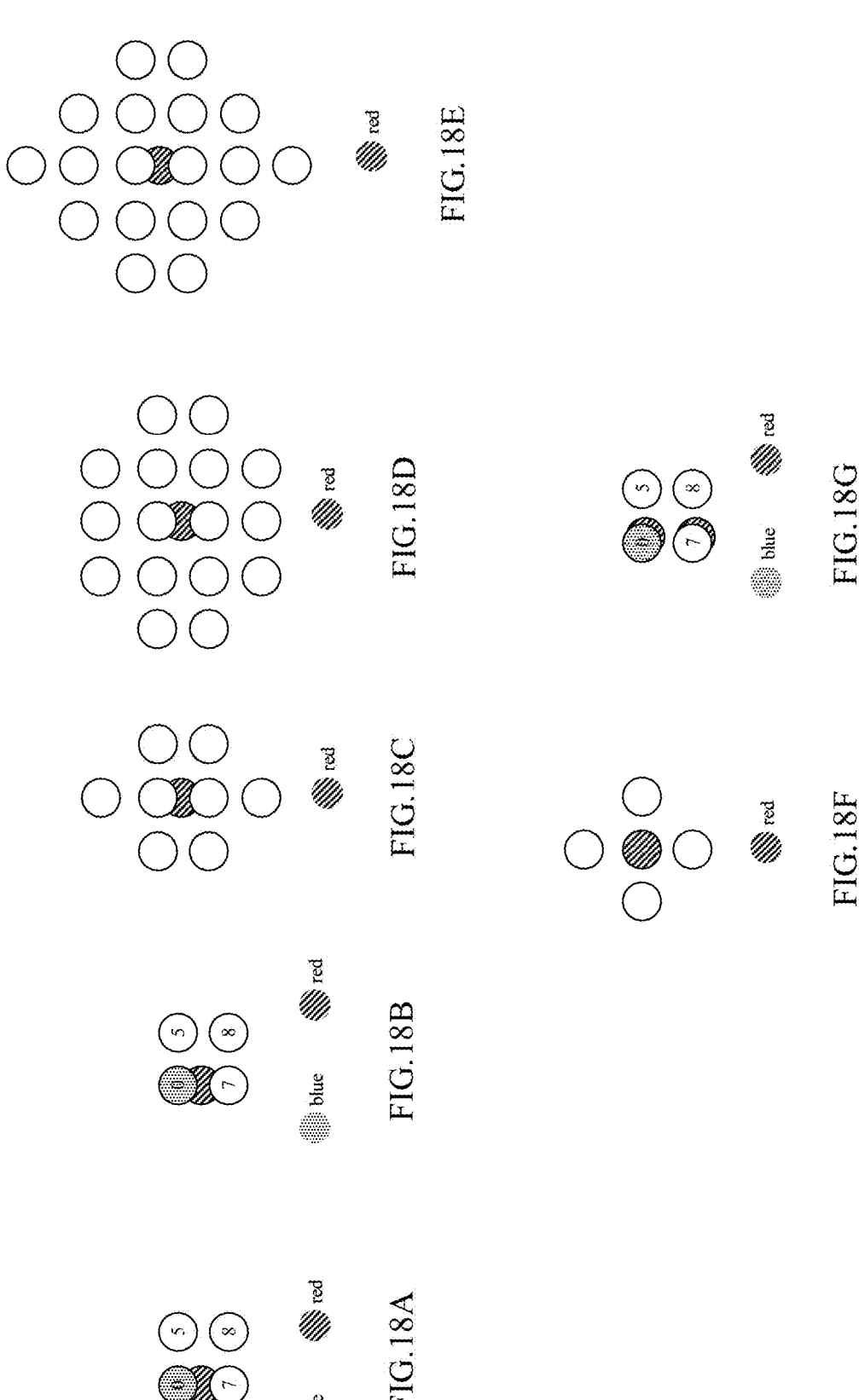
FIGS. 18A. 18B, 18C, 18D, 18E, 18F and 18G illustrate different candidate shapes in accordance with some implementations of the present disclosure.

FIG. 18A to FIG. 18G show some examples of different shape luma candidates. A constraint can be applied to the shape: total number of candidates must be power of 2, as shown in FIG. 18B to FIG. 18D. A constraint can be applied to the shape: number of luma candidates must be horizontal and vertical symmetric with the chroma sample, as shown in FIG. 18A, FIG. 18C, FIG. 18D and FIG. 18E. The power of 2 constraint and the symmetric constraint can also be applied for chroma candidates. In FIG. 13B and FIG. 13C, U/V part shows an example for symmetric constraint.

Different color format can have different classifiers "constraints". For example, YUV 420 format uses luma/chroma candidates selection in FIG. 13B and FIG. 13C (one candidate selected from 3×3 shape), but YUV 444 format uses luma/chroma candidates selection in FIG. 18F; YUV 422 format uses luma candidates selection in FIG. 18G (2 chroma samples share 4 luma candidates), and uses chroma candidates selection in FIG. 18F.

The C0 position and C0 band_num can be combined and switched in SPS/APS/PPS/PH/SH/Region/CTU/CU/Subblcok/Sample levels. Different combinations can correspond to different classifiers, as shown in the following Table 5:

TABLE 5

| POC | Classifier | C0 band_num | Total classes |
|---|---|---|---|
| 0 | C0 using Y0 position | 16 | 16 |
| 1 | C0 using Y7 position | 8 | 8 |

Figure 20B:
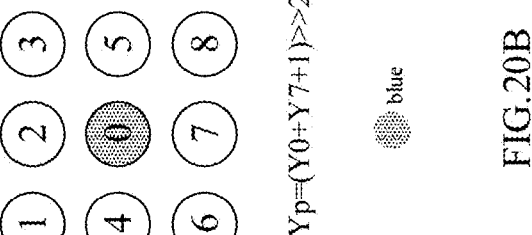
FIG. 20A and FIG. 20B illustrate the embodiments in accordance with some implementations of the present disclosure, which show the collocated luma sample value (Y0) can be replaced by a phase corrected value (Yp) by weighting neighboring luma samples.
Figure 20A:
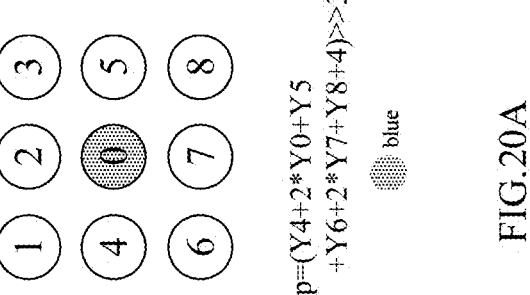

The collocated luma sample value (Y0) can be replaced by a value (Yp) by weighting collocated and neighboring luma samples. FIG. 20A and FIG. 20B shows 2 examples. Different Yp can be a different classifier. Different Yp can be applied on different chroma format. For example, the Yp of FIG. 20A is used for the YUV 420 format, the Yp of FIG. 20B is used for the YUV 422 format, and the Y0 is used for the YUV 444 format.

Another classifier example (C1) is the comparison score [−8, 8] of the collocated luma samples (Y0) and neighboring 8 luma samples, which yields 17 classes in total:

Initial Class (C1)=0, Loop over neighboring 8 luma samples (Yi, i=1 to 8)

$$\text{if} \quad Y0 > Yi \quad \text{Class} += 1$$

$$\text{else if} \quad Y0 < Yi \quad \text{Class} -= 1$$

The C1 example is equal to the following function where threshold "th" is 0:

$$ClassIdx = \quad \text{(Eq. 29)}$$

$$Index2ClassTable(f(C, P1) + f(C, P2) + \dots + f(C, P8))$$

where f(x,y)=1, if x−y>th; f(x,y)=0, if x−y=th; f(x,y)=−1, if x−y<th

Similar as C4 classifier, one or plural thresholds can be predefined (e.g., kept in a LUT) or signaled in SPS/APS/PPS/PH/SH/Region/CTU/CU/Subblock/Sample levels to help classify (quantize) the difference.

A variation (C1') is only counting comparison score [0, 8], and this yields 8 classes. (C1, C1') is a classifier group and a PH/SH level flag can be signaled to switch between C1 and C1':

Initial Class (C1')=0,Loop over neighboring 8 luma samples (Yi, i=1 to 8)    (Eq. 30)

$$\text{if} \quad Y0 > Yi \quad \text{Class} += 1$$

A variation (C1s) is selectively using neighboring N out of M neighboring samples to count the comparison score. An M-bit bitmask can be signaled at SPS/APS/PPS/PH/SH/Region/CTU/CU/Subblock/Sample levels to indicate which neighboring samples are selected to count the comparison score. Using FIG. 13B as an example for a luma classifier:

8 neighboring luma samples are candidates, and a 8-bit bitmask (01111110) is signaled at PH, indicating Y1 to Y6 (6 samples) are selected, so the comparison score is in [−6, 6], which yields 13 offsets. The selective classifier C1s gives encoder more choices to trade-off between offsets signaling overhead and classification granularity.

Similar to C1s, a variation (C1's) is only counting comparison score [0, +N], the previous bitmask 01111110 example gives comparison score is in [0, 6], which yields 7 offsets.

Different classifiers can be combined to yield a general classifier. For example, the following Table 6 shows examples for different pictures:

TABLE 6

| POC | Classifier | C0 band_num | Total classes |
|---|---|---|---|
| 0 | combine C0 and C1 | 16 | 16*17 |
| 1 | combine C0 and C1' | 16 | 16*9 |
| 2 | combine C0 and C1 | 7 | 7*17 |

Figures 21A, 21B:
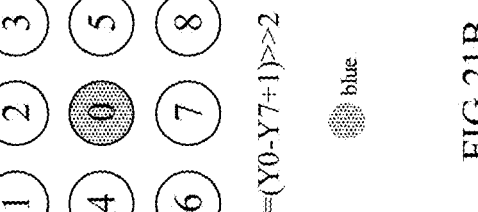
FIG. 21A and FIG. 21B illustrate the embodiments in accordance with some implementations of the present disclosure, which show the collocated luma sample value (Y0) can be replaced by a phase corrected value (Yp) by weighting neighboring luma samples.

Another classifier example (C2) is using the difference (Yn) of collocated and neighboring luma samples. FIG. 21A and FIG. 21B show an example of Yn, of which dynamic range is [−1024, 1023] when bitdepth is 10. Let C2 band_num be the be the number of equally divided bands of Yn dynamic range:

$$\text{Class } (C2) = (Yn + (1 << \text{bit\_depth}) * \text{band\_num}) >> \quad \text{(Eq. 31)}$$

$$(\text{bit\_depth} + 1)$$

C0 and C2 can be combined to yield a general classifier, as shown in the following Table 7 for example:

TABLE 7

| POC | Classifier | C0 band_num | C2 band_num | Total classes |
|---|---|---|---|---|
| 0 | combine C0 and C2 | 16 | 16 | 16*17 |
| 1 | combine C0 and C2 | 8 | 7 | 8*7 |

Another classifier example (C3) is using a bitmask for classification. A 10-bit bitmask is signaled in SPS/APS/PPS/PH/SH/Region/CTU/CU/Subblock/Sample levels to indicate the classifier. For example, bitmask 11 1100 0000 means for a given 10-bit luma sample value, only MSB 4 bits are used for classification, and this yields 16 classes in total. Another example bitmask 10 0100 0001 means only 3 bits are used for classification, and this yields 8 classes in total. The bitmask length (N) can be fixed or switched in SPS/APS/PPS/PH/SH/Region/CTU/CU/Subblock/Sample levels. For example, for a 10-bit sequence, a 4-bit bitmask 1110 signaled in PH in a picture, MSB 3 bits b9, b8, b7 are used for classification. Another example is 4-bit bitmask 0011 on LSB. b0, b1 are used for classification. The bitmask classifier can apply on luma or chroma classification. Whether to use MSB or LSB for bitmask N be can fixed or switched in SPS/APS/PPS/PH/SH/Region/CTU/CU/Subblock/Sample levels.

The luma position and C3 bitmask can be combined and switched in SPS/APS/PPS/PH/SH/Region/CTU/CU/Subblock/Sample levels. Different combinations can be different classifiers.

A "max number of 1s" of the bitmask restriction can be applied to restrict the corresponding number of offsets. For example, restricting "max number of 1s" of the bitmask to 4 in SPS, and this yields the max offsets in the sequence to be 16. The bitmask in different POC can be different, but the "max number of 1s" shall not exceed 4 (total classes shall not exceed 16). The "max number of 1s" value can be signaled and switched in SPS/APS/PPS/PH/SH/Region/CTU/CU/Subblock/Sample levels, as shown in the following Table 8:

TABLE 8

| POC | Classifier | C3 10-bit bitmask | Total classes |
|---|---|---|---|
| 0 | C3 using Y0 position | 11 1100 0000 | 16 |
| | | luma sample value | Class index |
| | | 00 0000 1111 | 0 (0000) |
| | | 10 1011 0011 | 9 (1010) |
| | | 11 1100 1001 | 15 (1111) |
| 1 | C3 using Y4 position | 10 0100 0001 | 8 |
| | | luma sample value | Class index |
| | | 00 0000 1111 | 1 (001) |
| | | 10 1011 0011 | 5 (101) |
| | | 11 1100 1001 | 7 (111) |

As shown in FIG. 19, the other cross-component chroma samples can be also fed into CCSAO classification. The classifier of cross-component chroma samples can be the same as luma cross-component classifier or have its own classifier mentioned in this disclosure. The two classifiers can be combined to form a joint classifier to classify the current chroma sample. For example, a joint classifier combining cross-component luma and chroma samples, yields total 16 classes, as shown in the following Table 9:

TABLE 9

| POC | Classifier | classes | Total classes |
|---|---|---|---|
| 0 | Combine: | | |
| | C3 using Y4 position bitmask: 10 0100 0001 | 8 | |
| | C0 using cross chroma C0 band_num: 2 | 2 | |
| | collocated position | | |
| | | | 16 |

All abovementioned classifiers (C0, C1, C1', C2, C3) can be combined, as shown in the following Table 10 for example:

TABLE 10

| POC | Classifier | | | Total classes |
|---|---|---|---|---|
| 0 | combine C0, C1 and C2 | C0 band_num: 4 | C2 band_num: 4 | 4*17*4 |
| 1 | combine C0, C1' and C2 | C0 band_num: 6 | C2 band_num: 4 | 6*9*4 |
| 2 | combine C1 and C3 | C3 number of 1s: 4 | | 16*17 |

Another classifier example (C4) is using the difference of CCSAO input and to-be-compensated sample value for classification. For example, if CCSAO is applied in the ALF stage, the difference of the current component pre-ALF and post-ALF sample values are used for classification. One or plural thresholds can be predefined (e.g., kept in a LUT) or signaled in SPS/APS/PPS/PH/SH/Region/CTU/CU/Sub-block/Sample levels to help classify (quantize) the difference. The C4 classifier can be combined with C0 Y/U/V bandNum to form a joint classifier (POC1 example), as shown in the following Table 11:

TABLE 11

| POC | Classifier | diff threshold | bandNum | Total classes |
|---|---|---|---|---|
| 0 | C4 with diff<-Th? <0? <Th? Else | Th = 3 | | 4 |
| 1 | combine C4/C0 using Y0 | Th = 3 | 16 | 48 |
| 2 | C4 with diff<Th1? <Th2? Else | Th1 = −4, Th2 = 5 | | 3 |
| 3 | C4 with diff<-Th? <Th? Else | Th = 1 | | 3 |

Another classifier example (C5) is using "coding information" to help subblock classification since different coding mode may introduce different distortion statistics in the reconstruction image. A CCSAO sample is classified by its sample previous coding information and the combination can form a classifier, as shown in the following Table 12 for example:

Note one special subset case of C7 is only using 1/1/1 collocated or neighboring Y/U/V samples to derive the intermediate sample S, which can be also taken as a special case of C6 (color transform by using 3 components). The S can be further fed into C0/C3 bandNum classifier:

$$classIdx = bandS = (S * bandNumS) >> BitDepth; \quad \text{(Eq. 33)}$$

Note the same as C0/C3 bandNum classifier, the C7 can also be combined with other classifier to form a joint classifier. Note C7 is not the same as the later example which jointly uses collocated and neighboring Y/U/V samples for classification (3 component joint bandNum classification for each Y/U/V component).

One constraint can be applied: sum of $c_{ij}$=1 to reduce $c_{ij}$ signaling overhead and limit the value of S within the bitdepth range. For example, force $c_{00}$=(1-sum of other $c_{ij}$). Which $c_{ij}$ ($c_{00}$ in this example) is forced (derived by other coeffs) can be predefined or signaled in SPS/APS/PPS/PH/SH/Region/CTU/CU/Subblock/Sample levels.

Another classifier example (C8) is using cross-component/current component spatial activity information as a

TABLE 12

| POC | Comp | Set | pred info | transform info | quant info | residual coding info | LMCS info | DBF info | SAO info | ALF info | Offsets num |
|---|---|---|---|---|---|---|---|---|---|---|---|
| 0 | Y | 0 | 3: inter/ intra/else | 2: LFNST? | 2: dep quant? | 2: all res 0? | 2: LMCS applied? | 2: is long tap DBF used? | 2: is BO? | 2: is temporal (APS) selected? | 384 |
| | | 1 | 2: Skip? | 2: MTS? | 2:dep quant odd? | 3: all res > 2/3/ow | 3: man slope > 0.5/0.7? | 3: inter/ intra bdry/ow | 3: EO/BO/ ow | 4: transpose idx | 1728 |
| | U | 0 | 2: intra inhereit luma? | 2: (local) dual tree? | 3: CU QP > 37/27? | 3: JCCR sign = −1/1/ow | 2: is CRS applied? | 3: DBF H/V/ow? | 5: 4 EC types/ow | 2: is CCALF applied? | 1080 |
| | V | 0 | 2: CCLM? | 2: CTB > 32x32? | 2: slice QP < 27? | 2: CCP used? | 2: is CRS applied? | 2: tC value!=0? | 2: BO start from band 0? | 2: any 1 coeff = 0? | 256 |

FIG. 39 shows another example of C5.

Another classifier example (C6) is using the YUV color transformed value for classification. For example, to classify the current Y component, 1/1/1 collocated or neighboring Y/U/V samples are selected to be color transformed to RGB, and using C3 bandNum quantize R value to be the current Y component classifier.

Another classifier example (C7) can be taken as a generalized version of C0/C3 and C6. To derive the current component C0/C3 bandNum classification, all 3 color components' collocated and neighboring samples are used. For example, to classify the current U sample, collocated and neighboring Y/V, current and neighboring U samples are used as shown in FIG. 13B, which can be formulated as $$S = \sum_{i=Y,U,V} \sum_{j=0}^{N-1} c_{ij} R_{ij} \quad \text{(Eq. 32)}$$

where S is the intermediate sample ready to be used for C0/C3 bandNum classification, $R_{ij}$ is the i-th component j-th collocated/neighboring samples, and $c_{ij}$ is the weighting coefficient which can be predefined or signaled in SPS/APS/PPS/PH/SH/Region/CTU/CU/Subblock/Sample levels.

classifier. Similar to the ALF block activity classifier, one sample located at (k,l) can get sample activity by (1) calculate the N direction gradients (laplacian or forward/backward);

(2) sum up N direction gradients to get activity A;

(3) quantize (or map) A to get class index Â.

For example, using 2 direction laplacian gradient to get A and a predefined map $\{Q_n\}$ to get Â:

$$g_v = V_{k,l} = |2R(k, l) - R(k, l - 1) - R(k, l + 1)| \quad \text{(Eq. 34)}$$

$$g_h = H_{k,l} = |2R(k, l) - R(k - 1, l) - R(k + 1, l)| \quad \text{(Eq. 35)}$$

$$A = (V_{k,l} + H_{k,l}) >> (BD - 6) \quad \text{(Eq. 36)}$$

where (BD−6), or denoted as B, is a predefined normalization term associated with bitdepth.

A is then further mapped to the range of [0, 4]:

$$Â = Q_{min(A,15)}, \{Q_n\} = \{0, 1, 2, 2, 2, 2, 2, 3, 3, 3, 3, 3, 3, 3, 3, 4\} \quad \text{(Eq. 37)}$$

Note the B, Qn can be predefined or signaled in SPS/APS/PPS/PH/SH/Region/CTU/CU/Subblock/Sample levels.

Another classifier example (C9) is using cross-component/current component spatial gradient information as a classifier. Similar to the ALF block gradient classifier mentioned above, one sample located at (k,l) can get a sample gradient class by (1) calculate the N direction gradients (laplacian or forward/backward);

(2) calculate maximum and minimum values of the gradients of M grouped directions (M<=N);

(3) calculate directionality D by comparing N values against each other and with m thresholds $t_1$ to $t_m$;

(4) apply geometric transform according to relative gradient magnitude (optional).

For example, as the ALF block classifier but apply at sample level for sample classification, (1) calculate the 4 direction gradients (laplacian);

(2) calculate maximum and minimum values of the gradients of 2 grouped directions (H/V and D/A);

(3) calculate directionality D by comparing N values against each other and with two thresholds $t_1$ to $t_m$;

(4) apply geometric transform according to relative gradient magnitude as in Table 2.

Please note that as ALF, C8 and C9 can be combined to form a joint classifier.

Another classifier example (C10) is using cross/current component edge information for current component classification. By extending the original SAO classifier, C10 can extract the cross/current component edge information more effectively:

(1) selecting one direction to calculate 2 edge strengths, wherein one direction is formed by the current sample and 2 neighboring samples, wherein one edge strength is calculated by subtracting the current sample and one neighbor sample;

(2) quantizing each edge strength into M segments by M−1 thresholds Ti;

(3) using M*M classes to classify the current component sample.

Figures 22A, 22B:
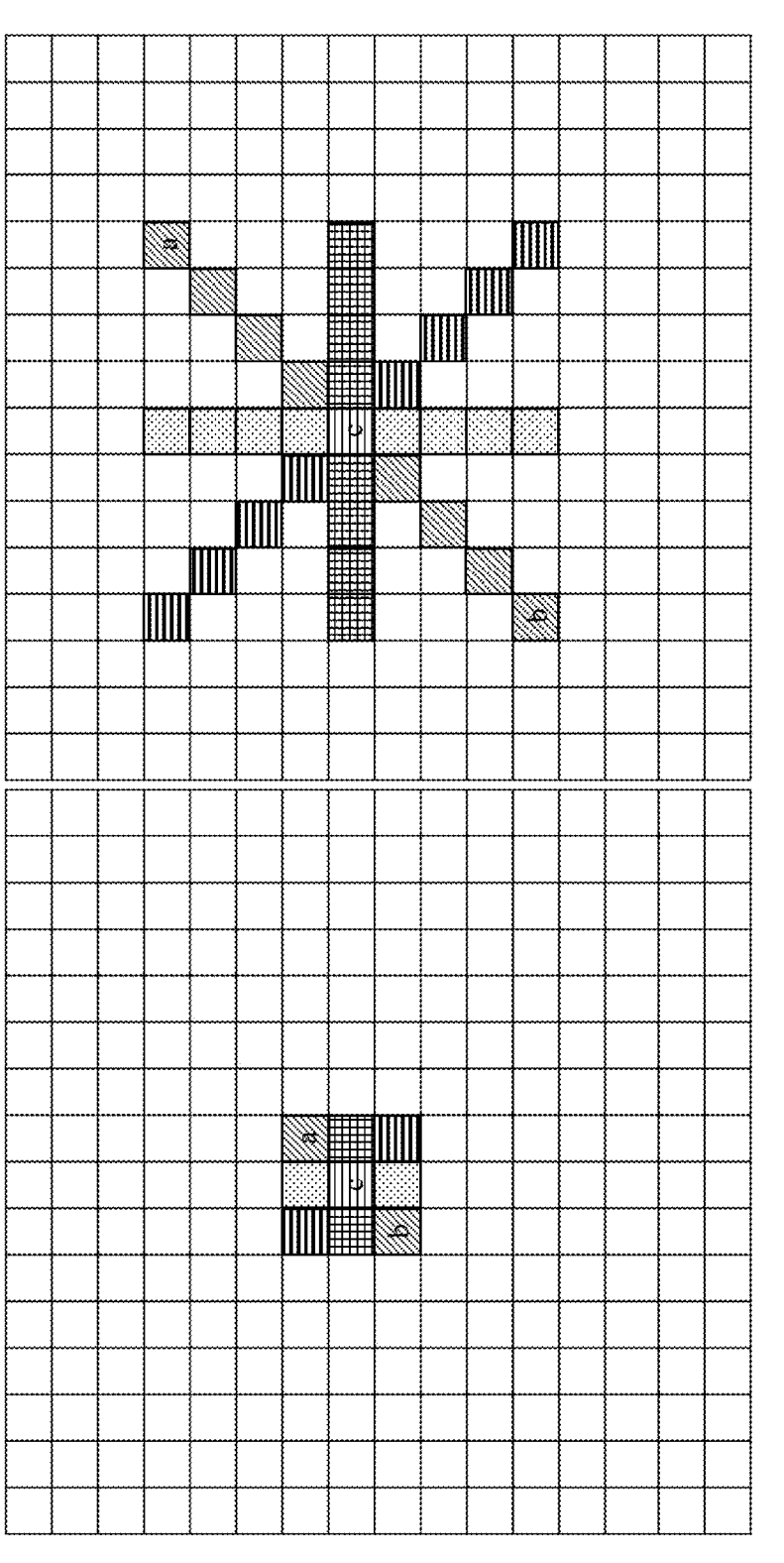
FIG. 22A and FIG. 22B illustrate the embodiments in accordance with some implementations of the present disclosure, which show example of using edge strengths to classify c, wherein one diagonal direction is selected and the differences (c-a) and (c-b) are quantized into 4 and 4 segments with threshold [−T,0,T], which forms 16 edge segments, and the position of (a, b) can be indicated by signaling 2 syntaxes edgeDir and edgeStep.

For example, as shown in FIG. 22A and FIG. 22B:

(1) one diagonal direction is selected from 4 direction candidates, the differences (c−a) and (c−b) are 2 edge strengths ranging from −1023~1023 (10b sequence);

(2) quantizing each edge strength into 4 segments by common thresholds [−T, 0, T];

(3) using 16 classes to classify the current component sample.

The direction patterns can be 0, 45, 90, 135 degrees (45 deg. per direction), or extending to 22.5 deg. per direction, or a predefined direction set, or signaled in SPS/APS/PPS/PH/SH/Region(Set)/CTU/CU/Subblock/Sample levels.

The edge strength can also be defined as (b−a), which simplifies the calculation but sacrifices precision.

The M−1 thresholds can be predefined or signaled in SPS/APS/PPS/PH/SH/Region(Set)/CTU/CU/Subblock/Sample levels.

The M−1 thresholds can be different sets for edge strength calculation, for example, different sets for (c−a), (c−b). If different sets are used, the total classes may be different. For example, [−T, 0, T] for calculating (c−a) but [−T, T] for (c−b), and total classes are 4*3.

The M−1 thresholds can use "symmetric" property to reduce signaling overhead. For example, using predefined pattern [−T, 0, T] but not [T0, T1, T2] which requires to signal 3 threshold values. Another example is [−T, T].

The threshold values can only contain power of 2 values, which not only effectively grab edge strength distribution but reduces comparison complexity (only MSB N bits need be compared).

The position of (a, b) can be indicated by signaling 2 syntaxes: (1) edgeDir indicates the selected direction, and (2) edgeStep indicates the sample distance used to calculate the edge strength, as shown in FIG. 22A and FIG. 22B.

The edgeDir/edgeStep can be predefined or signaled in SPS/APS/PPS/PH/SH/Region(Set)/CTU/CU/Subblock/Sample levels.

The edgeDir/edgeStep can be coded with FLC/TU/EGk/SVLC/UVLC codes.

Please note that C10 can be combined with bandNumY/U/V or other classifiers to form a joint classifier. For example, combining 16 edge strengths with max 4 bandNum Y bands yields 64 classes.

Other disclosed classifier examples which use only current component information for current component classification can be used as cross-component classification. For example, as in FIG. 4, using luma sample information and eo-class to derive an EdgeIdx, but to classify the current chroma sample. Other disclosed "non-cross-component" classifier is as in CN107071485A such as edge direction, pixel intensity, pixel variation, pixel variance, pixel sum-of-Laplacian, sobel operator, compass operator, high-pass filtered value, low-pass filtered value . . . etc.

Plural classifiers can be used in the same POC. The current frame is divided by several regions, and each region uses the same classifier. For example, 3 different classifiers are used in POC0, and which classifier (0, 1, or 2) is used is signaled in CTU level, as shown in the following Table 13:

TABLE 13

| POC | Classifier | C0 band_num | Region |
|-----|-----------|-------------|--------|
| 0 | C0 using Y0 position | 16 | 0 |
| 0 | C0 using Y0 position | 8 | 1 |
| 0 | C0 using Y1 position | 8 | 2 |

The max number of plural classifiers (plural classifiers can also be called alternative offset be fixed or sets) can signaled in SPS/APS/PPS/PH/SH/Region/CTU/CU/Subblock/Sample levels. For example, fixed (pre-defined) max number of plural classifiers is 4. 4 different classifiers are used in POC0, and which classifier (0, 1, or 2) is used is signaled in CTU level. Truncated-unary code can be used to indicate the classifier used for each luma or chroma CTB (0: CCSAO is not applied, 10: applied set 0, 110: applied set 1, 1110: applied set 2, 1111: applied set 3). Fixed-length code, golomb-rice code, and exponential-golomb code can also be used to indicate the classifier (offset set index) for CTB. 3 different classifiers are used in POC1, as shown in the following Table 14:

TABLE 14

| POC | Classifier | C0 band_num | Region | TU code |
|-----|-----------|-------------|--------|---------|
| 0 | C0 using Y3 position | 6 | 0 | 10 |
| 0 | C0 using Y3 position | 7 | 1 | 110 |
| 0 | C0 using Y1 position | 3 | 2 | 1110 |
| 0 | C0 using Y6 position | 6 | 3 | 1111 |
| 1 | C0 using Y0 position | 16 | 0 | 10 |
| 1 | C0 using Y0 position | 8 | 1 | 110 |
| 1 | C0 using Y1 position | 8 | 2 | 1110 |

An example of Cb and Cr CTB offset set indices is given for 1280×720 sequence POC0 (number of CTUs in a frame is 10×6 if the CTU size is 128×128). POC0 Cb uses 4 offset sets and Cr uses 1 offset set (0: CCSAO is not applied, 1: applied set 0, 2: applied set 1, 3: applied set 2, 4: applied set 3). The "type" means the position of the chosen collocated luma sample (Yi). Different offset sets can have different types, band_num and corresponding offsets:

```
ccsao_on_frame POC:0, TID:0, comp:0, on:1, lcu_ctrl:1, set_num:4, set:0, type: 3, band_num:  6
ccsao_on_frame POC:0, TID:0, comp:0, on:1, lcu_ctrl:1, set_num:4, set:1, type: 3, band_num:  7
ccsao_on_frame POC:0, TID:0, comp:0, on:1, lcu_ctrl:1, set_num:4, set:2, type: 1, band_num:  3
ccsao_on_frame POC:0, TID:0, comp:0, on:1, lcu_ctrl:1, set_num:4, set:3, type: 6, band_num:  6
ccsao_on_frame POC:0, TID:0, comp:1, on:1, lcu_ctrl:0, set_num:1, set:0, type: 8, band_num: 10
1 0 2 2 0 0 1 2 0 0   1 1 1 1 1 1 1 1 1 1
0 0 0 0 1 1 1 1 2 4   1 1 1 1 1 1 1 1 1 1
1 1 4 1 3 1 1 2 2 1   1 1 1 1 1 1 1 1 1 1
4 3 1 1 4 2 1 1 1 4   1 1 1 1 1 1 1 1 1 1
0 0 3 1 1 1 1 2 1 3   1 1 1 1 1 1 1 1 1 1
0 0 3 3 3 1 1 3 4 1   1 1 1 1 1 1 1 1 1 1
```

| | | | | | | | | | |
|---|---|---|---|---|---|---|---|---|---|
| offset[0] | U: | 6 | \| | 0 | \| | −1 | \| | 2 | \| | V: | −2 | \| |
| offset[1] | U: | 2 | \| | 1 | \| | −7 | \| | 0 | \| | V: | 0 | \| |
| offset[2] | U: | 0 | \| | −1 | \| | −6 | \| | −2 | \| | V: | 0 | \| |
| offset[3] | U: | −2 | \| | 2 | \| | 0 | \| | −1 | \| | V: | 0 | \| |
| offset[4] | U: | −3 | \| | 2 | \| | 0 | \| | −1 | \| | V: | 0 | \| |
| offset[5] | U: | −4 | \| | 1 | \| | 0 | \| | −7 | \| | V: | 1 | \| |
| offset[6] | U: | | \| | | \| | | \| | | \| | V: | 0 | \| |
| offset[7] | U: | | \| | | \| | | \| | | \| | V: | 0 | \| |
| offset[8] | U: | | \| | | \| | | \| | | \| | V: | 0 | \| |
| offset[9] | U: | | \| | | \| | | \| | | \| | V: | −4 | \| |
| offset[10] | U: | | \| | | \| | | \| | | \| | V: | | \| |
| offset[11] | U: | | \| | | \| | | \| | | \| | V: | | \| |
| offset[12] | U: | | \| | | \| | | \| | | \| | V: | | \| |
| offset[13] | U: | | \| | | \| | | \| | | \| | V: | | \| |
| offset[14] | U: | | \| | | \| | | \| | | \| | V: | | \| |
| offset[15] | U: | | \| | | \| | | \| | | \| | V: | | \| |

An example of jointly using collocated and neighboring Y/U/V samples for classification is listed (3 component joint bandNum classification for each Y/U/V component). In POC0, {2,4,1} offset sets are used for {Y,U,V} in this POC, respectively. Each offset set can be adaptively switched in SPS/APS/PPS/PH/SH/Region/CTU/CU/Subblock/Sample levels. Different offset sets can have different classifiers. For example, as candidate position (candPos) indicating in FIG. 13B and FIG. 13C, for classifying current Y4 luma sample, Y set0 selects {current Y4, collocated U4, collocated V4} as candidates, with different bandNum{Y,U,V}={16,1,2}, respectively. With {candY, candU, candV} are the sample values of selected {Y,U,V} candidates, the number of total classes is 32, and the class index derivation can be:

$$bandY = (candY * bandNumY) >> BitDepth; \quad \text{(Eq. 38)}$$

$$bandU = (candU * bandNumU) >> BitDepth; \quad \text{(Eq. 39)}$$

$$bandV = (candV * bandNumV) >> BitDepth; \quad \text{(Eq. 40)}$$

$$classIdx = \quad \text{(Eq. 41)}$$
$$bandY * bandNumU * bandNumV + bandU * bandNumV + bandV;$$

Note the classIdx derivation of a joint classifier can be represented as "or-shift" form and simplifies derivation process. For example, $$\max bandNum = \{16, 4, 4\} \quad \text{(Eq. 42)}$$

$$classIdx = (bandY << 4)|(bandU << 2)|bandV \quad \text{(Eq. 43)}$$

Another example is in POC1 component V set1 classification, candPos={neighboring Y8, neighboring U3, neighboring V0} with bandNum={4,1,2} are used, and this yields 8 classes, as shown in the following Table 15:

TABLE 15

| POC | Current Comp | offset set | Classifier: candPos(Y, U, V) with bandNum(Y, U, V) | Total classes (offset number) |
|---|---|---|---|---|
| 0 | Y | 0 | (Y4, U4, V4), (16, 1, 2) | 16*1*2 = 32 |
| | | 1 | (Y4, U0, V2), (15, 4, 1) | 15*4*1 = 60 |
| | U | 0 | (Y8, U3, V0), (1, 1, 2) | 2 |
| | | 1 | (Y4, U1, V0), (15, 2, 2) | 60 |
| | | 2 | (Y6, U6, V6), (4, 4, 1) | 16 |
| | | 3 | (Y2, U0, V5), (1, 1, 1) | 1 |
| | V | 0 | (Y2, U0, V5), (1, 1, 1) | 1 |
| 1 | Y | 0 | (Y4, U1, V0), (15, 2, 2) | 60 |
| | U | 0 | (Y6, U2, V1), (7, 1, 2) | 14 |
| | V | 0 | (Y8, U3, V0), (1, 1, 2) | 2 |
| | | 1 | (Y8, U3, V0), (4, 1, 2) | 8 |

An example of jointly using collocated and neighboring Y/U/V samples for current Y/U/V sample classification is listed (3 components joint edgeNum (C1s) and bandNum classification for each Y/U/V component). edge CandPos is the centered position used for C1s classifier, edge bitMask is the C1s neighboring samples activation indicator, edgeNum is corresponding number of C1s classes. Note in this example, C1s is only applied on Y classifier (so edgeNum equals to edgeNumY) with edge candPos is always Y4

(current/collocated sample position). However, C1s can be applied on Y/U/V classifiers with edge candPos is neighboring sample position.

With "diff" denoting Y C1s's comparison score, the classIdx derivation can be:

$$bandY = (candY * bandNumY) >> BitDepth; \qquad \text{(Eq. 44)}$$

$$bandU = (candU * bandNumU) >> BitDepth; \qquad \text{(Eq. 45)}$$

$$bandV = (candV * bandNumV) >> BitDepth; \qquad \text{(Eq. 46)}$$

$$edgeIdx = diff + (edgeNum >> 1); \qquad \text{(Eq. 47)}$$

$$bandIdx = \qquad \text{(Eq. 48)}$$

$$bandY * bandNumU * bandNumV + bandU * bandNumV + bandV;$$

$$classIdx = bandIdx * edgeNum + edgeIdx; \qquad \text{(Eq. 49)}$$

-continued $$bandV = (candV * bandNumV) >> BitDepth; \qquad \text{(Eq. 53)}$$

$$classIdx = bandY * bandNumX * bandNumU * bandNumV + \qquad \text{(Eq. 54)}$$

$$bandX * bandNumU * bandNumV + bandU * bandNumV + bandV;$$

Some decoder normative or encoder conformance constraints can be applied if using plural C0 for one single component: (1) selected C0 candidates must be mutually different (for example, candX !=candY), (2) the newly added bandNum must be less than other bandNum (for example, bandNumX<=bandNumY). By applying intuitive constraints within one single component (Y), redundant cases can be removed to save bit cost and complexity.

The max band_num (bandNumY, bandNumU, or bandNumV) can be fixed or signaled in SPS/APS/PPS/PH/SH/Region/CTU/CU/Subblock/Sample levels. For example, fixing max band_num=16 in the decoder, and for each

TABLE 16

| POC | Current Comp | Set | edge candPos (Y) | edge bitMask (Y) | edgeNum | band candPos (Y, U, V) | bandNum (Y, U, V) | Total classes | Signaled offsets | | sotred set idx |
|---|---|---|---|---|---|---|---|---|---|---|---|
| 0 | Y | 0 | (Y4) | 10000001 | 5, [−2, 2] | (Y4, U4, V4) | (16, 1, 2) | 5 * 16 * 1 * 2 = 160 | 160 offsets values: (3, 3, 2, −1, . . .) | 0 | Y |
| | | 1 | (Y4) | 00010000 | 3, [−1, 1] | (Y4, U0, V2) | (15, 4, 1) | 3 * 15 * 4 * 1 = 180 | 180 offsets values | 1 | Y |
| | | 2 | (Y4) | 01111110 | 13, [−6, 6] | (Y4, U1, V2) | (2, 1, 1) | 13 * 2 * 1 * 1 = 26 | 26 offsets values | 2 | Y |
| | U | 0 | (Y4) | 10000000 | 3, [−1, 1] | (Y8, U3, V0) | (1, 1, 2) | 3 * 1 * 1 * 1 * 2 = 6 | 6 offsets values | 0 | U |
| | | 1 | (Y4) | 00000000 | 1, [0] | (Y4, U1, V0) | (15, 2, 2) | 60 | 60 offsets values | 1 | U |
| | | 2 | (Y4) | 00000000 | 1, [0] | (Y6, U6, V6) | (4, 1, 1) | 4 | 4 offsets values: (1, 2, 0, 1) | 2 | U |
| | | 3 | (Y4) | 10000001 | 5, [−2, 2] | (Y2, U0, V5) | (1, 1, 1) | 1 | 1 offsets values | 3 | U |
| | V | 0 | (Y4) | 00000000 | 1, [0] | (Y2, U0, V5) | (1, 1, 1) | 1 | 1 offsets values | 0 | V |
| 1 | Y | 0 | reuse | reuse | reuse | reuse | reuse | 160 | signal idxY = 0, reuse params & offsets (3, 3, 2, −1, . . .) | | Y |
| | | 1 | (Y4) | 11111111 | 17, [−8, 8] | (Y4, U1, V2) | (4, 1, 1) | 17 * 4 * 1 * 1 = 68 | 68 offsets values | 3 | Y |
| | U | 0 | reuse | reuse | reuse | reuse | reuse | 4 | signal idxU = 2, reuse params & offsets (1, 2, 0, 1) | | U |
| | V | 0 | (Y4) | 00000000 | 1, [0] | (Y8, U3, V0) | (1, 1, 2) | 2 | 2 offsets values | | V |
| | | 1 | (Y4) | 00000000 | 1, [0] | (Y8, U3, V0) | (4, 1, 2) | 8 | 8 offsets values | | V |

Please note that as mentioned before, for a single component, plural C0 classifiers can be combined (different positions or weight combination, bandNum) to form a joint classifier, and this joint classifier can be combined with other components to form another joint classifier. For example, using 2 Y samples (candY/candX and bandNum Y/bandNumX), 1 U sample (candU and bandNumU), and 1 V sample (candV and bandNumV) to classify one U sample (Y/V can have the same concept).

$$bandY = (candY * bandNumY) >> BitDepth; \qquad \text{(Eq. 50)}$$

$$bandX = (candX * bandNumX) >> BitDepth; \qquad \text{(Eq. 51)}$$

$$bandU = (candU * bandNumU) >> BitDepth; \qquad \text{(Eq. 52)}$$

frame, 4 bits are signaled to indicate the C0 band_num in this frame. Some other max band_num examples are listed in the following Table 17:

TABLE 17

| band_num_min | band_num_max | band_num bit |
|---|---|---|
| 1 | 1 | 0 |
| 1 | 2 | 1 |
| 1 | 4 | 2 |
| 1 | 8 | 3 |
| 1 | 16 | 4 |
| 1 | 32 | 5 |
| 1 | 64 | 6 |
| 1 | 128 | 7 |
| 1 | 256 | 8 |

The max number of classes or offsets (combinations of jointly using multiple classifiers, for example, C1s edgeNum*C1 bandNum Y*bandNumU*bandNumV) for each set (or all set added) can be fixed or signaled in SPS/APS/PPS/PH/SH/Region/CTU/CU/Subblock/Sample levels. For example, fixing max all sets added class_ num=256*4, and an encoder conformance check or a decoder normative check can be used to check the constraint.

A restriction can be applied on C0 classification: restrict band_num (bandNumY, bandNumU, or bandNumV) to be only power of 2 values. Instead of explicitly signaling band_num, a syntax band_num_shift is signaled. Decoder can use shift operation to avoid multiplication. Different band_num_shift can be used for different component:

$$\text{Class}(C0) = (Y0 >> \text{band\_num\_shift}) >> \text{bit\_depth} \qquad \text{(Eq. 55)}$$

Another operation example is taking rounding into account to reduce error:

$$\text{Class }(C0)=((Y0+(1<<(\text{band\_num\_shift}-1)))>>\text{band\_num\_shift})>>\text{bit\_depth} \qquad \text{(Eq. 56)}$$

For example, if band_num_max (Y, U, or V) is 16, the possible band_num_shift candidates are 0, 1, 2, 3, 4, corresponding to band_num=1, 2, 4, 8, 16, as shown in the following Tables:

TABLE 18

| POC | Classifier | C0 band_num_shift | C0 band_num | Total classes |
|---|---|---|---|---|
| 0 | C0 using Y0 position | 4 | 16 | 16 |
| 1 | C0 using Y7 position | 3 | 8 | 8 |

TABLE 19

| band_num_max | valid band_num | band_num_shift candidates |
|---|---|---|
| 1 | 1 | 0 |
| 2 | 1, 2 | 0, 1 |

TABLE 19-continued

| band_num_max | valid band_num | band_num_shift candidates |
|---|---|---|
| 4 | 1, 2, 4 | 0, 1, 2 |
| 8 | 1, 2, 4, 8 | 0, 1, 2, 3 |
| 16 | 1, 2, 4, 8, 16 | 0, 1, 2, 3, 4 |
| 32 | 1, 2, 4, 8, 16, 32 | 0, 1, 2, 3, 4, 5 |
| 64 | 1, 2, 4, . . . , 32, 64 | 0, 1, 2, 3, 4, 5, 6 |
| 128 | 1, 2, 4, . . . , 64, 128 | 0, 1, 2, . . . , 6, 7 |
| 256 | 1, 2, 4, . . . , 128, 256 | 0, 1, 2, . . . , 6, 7, 8 |

The classifier of Cb and Cr can be different. The Cb and Cr offsets for all classes can be signaled separately, as shown in the following Table 20 for example:

TABLE 20

| POC | Component | Classifier | C0 band_num | Total classes | Signaled offsets |
|---|---|---|---|---|---|
| 0 | Cb | C0 | 16 | 16 | 16 |
| 0 | Cr | C0 | 5 | 5 | 5 |

The max offset value can be fixed or signaled in SPS/APS/PPS/PH/SH/Region/CTU/CU/Subblcok/Sample levels. For example, max offset is between [−15, 15]. Different component can have different max offset value.

The offset signaling can use DPCM. For example, offsets {3, 3, 2, 1, −1} can be signaled as {3, 0, −1, −1, −2}.

The classifier of Cb and Cr can be the same. The Cb and Cr offsets for all classes can be signaled jointly, as shown in the following Table 21 for example:

TABLE 21

| POC | Component | Classifier | C0 band_num | Total classes | Signaled offsets |
|---|---|---|---|---|---|
| 0 | Cb and Cr | C0 | 8 | 8 | 8 |

The classifier of Cb and Cr can be the same. The Cb and Cr offsets for all classes can be signaled jointly, with a sign flag difference, as shown in the following Table 22 for example:

TABLE 22

| POC | Component | Classifier | C0 band_num | Total classes | Signaled offsets | Signaled sign flag |
|---|---|---|---|---|---|---|
| 0 | Cb and Cr | C0 Cb offsets derived Cr offsets | 4 | 4 | 4: (3, 3, 2, −1) (3, 3, 2, −1) (−3, −3, −2, 1) | 1: (−) |

The sign flag can be signaled for each class, as shown in the following Table 23 for example:

TABLE 23

| POC | Component | Classifier | C0 band_num | Total classes | Signaled offsets | Signaled sign flag |
|---|---|---|---|---|---|---|
| 0 | Cb and Cr | C0 Cb offsets derived Cr offsets | 4 | 4 | 4: (3, 3, 2, −1) (3, 3, 2, −1) (−3, 3, 2, 1) | 1: (−, +, +, −) |

The classifier of Cb and Cr can be the same. The Cb and Cr offsets for all classes can be signaled jointly, with a weight difference. The weight (w) can be selected in a limited table, for example, $+-\frac{1}{4}$, $+-\frac{1}{2}$, 0, $+-1$, $+-2$, $+-4$ . . . etc., where $|w|$ only includes the power-of-2 values, as shown in the following Table 24:

TABLE 24

| POC | Component | Classifier | C0 band_num | Total classes | Signaled offsets | Signaled weight |
|---|---|---|---|---|---|---|
| 0 | Cb and Cr | C0 Cb offsets derived Cr offsets | 4 | 4 | 4: (3, 3, 2, −1) (3, 3, 2, −1) (−6, −6, −4, 2) | −2 |

The weights can be signaled for each class, as shown in the following Table 25 for example:

TABLE 25

| POC | Component | Classifier | C0 band_num | Total classes | Signaled offsets | Signaled weight |
|---|---|---|---|---|---|---|
| 0 | Cb and Cr | C0 Cb offsets derived Cr offsets | 4 | 4 | 4: (3, 3, 2, −1) (3, 3, 2, −1) (−6, 12, 0, 1) | 4: (−2, 4, 0, 1) |

If plural classifiers are used in the same POC, different offset sets are signaled separately or jointly.

The previously decoded offsets can be stored for use of future frames. An index can be signaled to indicate which previously decoded offsets set is used for the current frame, to reduce offsets signaling overhead. For example, POC0 offsets can be reused by POC2 with signaling offsets set idx=0, as shown in the following Table 26:

TABLE 26

| POC | Component | Classifier | C0 band_num | Total classes | Signaled offsets | stored offsets set idx |
|---|---|---|---|---|---|---|
| 0 | Cb | C0 | 4 | 4 | 4: (3, 3, 2, −1) | 0 |
| 0 | Cr | C0 | 4 | 4 | 4: (−2, 1, 0, 1) | 0 |
| 1 | Cb | C0 | 4 | 4 | 4: (0, 0, 1, −1) | 1 |
| 1 | Cr | C0 | 4 | 4 | 4: (1, 2, 0, 1) | 1 |
| 2 | Cb | C0 | 4 | 4 | signal idx = 0 and reuse offsets (3, 3, 2, −1) | |
| 2 | Cr | C0 | 4 | 4 | signal idx = 0 and reuse offsets (−2, 1, 0, 1) | |

The reuse offsets set idx for Cb and Cr can be different, as shown in the following Table 27:

TABLE 27

| POC | Component | Classifier | C0 band_num | Total classes | Signaled offsets | stored offsets set idx |
|---|---|---|---|---|---|---|
| 0 | Cb | C0 | 4 | 4 | 4: (3, 3, 2, −1) | 0 |
| 0 | Cr | C0 | 4 | 4 | 4: (−2, 1, 0, 1) | 0 |
| 1 | Cb | C0 | 4 | 4 | 4: (0, 0, 1, −1) | 1 |
| 1 | Cr | C0 | 4 | 4 | 4: (1, 2, 0, 1) | 1 |
| 2 | Cb | C0 | 4 | 4 | signal idx = 0 and reuse offsets (3, 3, 2, −1) | |
| 2 | Cr | C0 | 4 | 4 | signal idx = 1 and reuse offsets (1, 2, 0, 1) | |

The offset signaling can use additional syntax, start and length, to reduce signaling overhead. For example, band_num=256 but only offsets of band_idx=37~44 signaled. In this example, the syntax of start and length both are 8 bits fix-length coded (should match band_num bits), as shown in the following Table 28:

TABLE 28

| band_idx | offset |
|---|---|
| 1 | 0 |
| 2 | 0 |
| 3 | 0 |
| . . . | |

TABLE 28-continued

| 37 | start = 37 | offset[0] |
|---|---|---|
| 38 | | offset[1] |
| 39 | | offset[2] |
| 40 | | offset[3] |
| 41 | | offset[4] |
| 42 | | offset[5] |
| 43 | | offset[6] |
| 44 | length = 8 | offset[7] |
| . . . | | |
| 255 | | 0 |
| 256 | | 0 |

| band_num_max | band_num bits, start, length |
|---|---|
| 1 | 0 |
| 2 | 1 |
| 4 | 2 |
| 8 | 3 |
| 16 | 4 |
| 32 | 5 |
| 64 | 6 |
| 128 | 7 |
| 256 | 8 |

If CCSAO is applied to all YUV 3 components, collocated and neighboring YUV samples can be jointly used for classification, and all abovementioned offsets signaling method for Cb/Cr can be extended to Y/Cb/Cr. Note different component offset set can be stored and used separately (each component has its own stored sets) or jointly (each component share the same stored set). A separate set example is shown in the following Table 29:

TABLE 29

| POC | Current Component | offset set | Classifier: candPos (Y, U, V) with bandNum (Y, U, V) | Total classes (offsets number) | Signaled offsets | sorted offsets set idx | |
|---|---|---|---|---|---|---|---|
| 0 | Y | 0 | (Y4, U4, V4), (16, 1, 2) | 16 * 1 * 2 = 32 | 32 offsets values (3, 3, 2, 1, . . .) | 0 | Y |
| | | 1 | (Y4, U0, V2), (14, 4, 1) | 15 * 4 * 1 = 60 | 60 offsets values | 0 | Y |
| | U | 0 | (Y8, U3, V0), (1, 1, 2) | 2 | 2 offsets values | 0 | U |
| | | 1 | (Y4, U1, V0), (15, 2, 2) | 60 | 60 offsets values | 1 | U |
| | | 2 | (Y6, U6, V6), (4, 1, 1) | 4 | 4 offsets values | 2 | U |
| | | 3 | (Y2, U0, V5), (1, 1, 1) | 1 | 1 offsets values | 3 | U |
| | V | 0 | (Y2, U0, V5), (1, 1, 1) | 1 | 1 offsets values | 0 | V |
| 1 | Y | 0 | reuse Y stored offset set idx 0 | 32 | signal idx = 0 and reuse offsets (3, 3, 2, −1, . . .) | | Y |
| | U | 0 | reuse U stored offset set idx 2 | 4 | signal idx = 2 and reuse offsets (1, 2, 0, 1) | | U |
| | V | 0 | (Y8, U3, V0), (1, 1, 2) | 2 | 2 offsets values | | V |
| | | 1 | (Y8, U3, V0), (4, 1, 2) | 8 | 8 offsets values | | V |

If a sequence bitdepth is higher than 10 (or a certain bitdepth), the offset can be quantized before signaling. On decoder side, the decoded offset is dequantized before applying it, for example, for a 12-bit sequence, the decoded offsets are left shifted (dequantized) by 2:

TABLE 30

| signaled offset | dequantized and applied offset |
|---|---|
| 0 | 0 |
| 1 | 4 |
| 2 | 8 |
| 3 | 12 |
| . . . | |
| 14 | 56 |
| 15 | 60 |

$$CcSaoOffsetVal = (1 - 2 * ccsao\_offset\_sign\_flag) * \qquad \text{(Eq. 57)}$$
$$ccsao\_offset\_abs << (BitDepth - \text{Min}(10, BitDepth)))$$

Filter strength concept: the classifier offsets can be further weighted before applying to samples. The weight (w) can be selected in a limited table, for example, +−¼, +−½, 0, +−1, +−2, +−4 . . . etc., where |w| only includes the power-of-2 values. The weight index can be signaled at SPS/APS/PPS/PH/SH/Region(Set)/CTU/CU/Subblock/Sample levels. The quantized offset signaling can be taken as a subset of this weight application. If recursive CCSAO is applied as in FIG. 13D, similar weight index mechanism can be applied between the 1$^{st}$ and the 2$^{nd}$ stages, for example.

Weighting for different classifiers: plural classifiers' offsets can be applied to the same sample with a weight combination. Similar weight index mechanism can be signaled as mentioned above. The following equations show an example:

$$offset\_final = w * offset\_1 + (1 - w) * offset\_2, \text{ or} \qquad \text{(Eq. 58)}$$
$$offset\_final = w1 * offset\_1 + w2 * offset\_2 + ... \qquad \text{(Eq. 59)}$$

Instead of directly signaling CCSAO params in PH/SH, the previously used params/offsets can be stored in APS or a memory buffer for the next pictures/slices reuse. An index can be signaled in PH/SH to indicate which stored previous frame offsets are used for the current picture/slice. A new APS ID can be created to maintain the CCSAO history offsets. The following table shows one example using FIG. 13E candPos and bandNum{Y,U,V}={16,4,4}. Note candPos, bandNum, offsets signaling method can be FLC or other methods of the disclosure. sao_cc_y_class_num (or cb, cr) equals to sao_cc_y_band_num_y*sao_cc_y_band_num_u*sao_cc_y_band_num_v (or cb, cr) in this case. ph_sao_cc_y_aps_id is the param index used in this picture/slice. Note cb and cr component can follow the same signaling logic.

| | Descriptor |
|---|---|
| adaptation_parameter_set_rbsp( ) { | |
| aps_params_type | u(3) |
| aps_adaptation_parameter_set_id | u(5) |
| aps_chroma_present_flag | u(1) |
| if( aps_params_type = = ALF_APS ) | |
| alf_data( ) | |
| else if( aps_params_type = = LMCS_APS ) | |
| lmcs_data( ) | |
| else if( aps_params_type = = SCALING_APS ) | |
| scaling_list_data( ) | |
| else if( aps_params_type = = CCSAO_APS ) | |
| ccsao_data( ) | |

| | Descriptor |
|---|---|
| ccsao_data( ) { | |
| sao_cc_y_set_signal_flag | u(1) |
| if( aps_chroma_present_flag ) {              (can be without this if) | |
| sao_cc_cb_set_signal_flag | u(1) |
| sao_cc_cr_set_signal_flag | u(1) |
| } | |
| if( sao_cc_y_set_signal_flag ) { | |
| sao_cc_y_sets_signalled_minus1 | |
| for( k = 0; k < sao_cc_cb_sets_signalled_minus1 + 1; k++ ) { | |
| sao_cc_y_cand_pos_y | ue(v) |
| sao_cc_y_band_num_y | u(4) |
| sao_cc_y_band_num_u | u(2) |
| sao_cc_y_band_num_v | u(2) |
| for( j = 0; j < sao_cc_y_class_num; j++ ) { | |
| sao_cc_y_offset_abs[ k ][ j ] | |
| if( sao_cc_y_offset_abs[ k ][ j ] ) | |
| sao_cc_y_offset_sign[ k ][ j ] | |
| } | |
| } | |
| } | |
| if( sao_cc_cb_set_signal_flag ) { | |
| sao_cc_cb_sets_signalled_minus1 | |
| for( k = 0; k < sao_cc_cb_sets_signalled_minus1 + 1; k++ ) { | |
| sao_cc_cb_band_num_y | u(4) |
| sao_cc_cb_band_num_u | u(2) |
| sao_cc_cb_band_num_v | u(2) |
| for( j = 0; j < sao_cc_cb_class_num; j++ ) { | |
| sao_cc_cb_offset_abs[ k ][ j ] | |
| if( sao_cc_cb_offset_abs[ k ][ j ] ) | |
| sao_cc_cb_offset_sign[ k ][ j ] | |
| } | |
| } | |
| } | |
| if( sao_cc_cr_set_signal_flag ) { | |
| sao_cc_cr_sets_signalled_minus1 | |
| for( k = 0; k < sao_cc_cr_sets_signalled_minus1 + 1; k++ ) { | |
| sao_cc_cr_band_num_y | u(4) |
| sao_cc_cr_band_num_u | u(2) |
| sao_cc_cr_band_num_v | u(2) |
| for( j = 0; j < sao_cc_cr_class_num; j++ ) { | |
| sao_cc_cr_offset_abs[ k ][ j ] | |
| if( sao_cc_cr_offset_abs[ k ][ j ] ) | |
| sao_cc_cr_offset_sign[ k ][ j ] | |
| } | |
| } | |
| } | |
| } | | where aps_adaptation_parameter_set_id provides an identifier for the APS for reference by other syntax elements.

When aps_params_type is equal to CCSAO_APS, the value of aps_adaptation_parameter_set_id shall be in the range of 0 to 7, inclusive (for example).

ph_sao_cc_y_aps_id specifies the aps_adaptation_parameter_set_id of the CCSAO APS that the Y colour component of the slices in the current picture refers to.

When ph_sao_cc_y_aps_id is present, the following applies:

The value of sao_cc_y_set_signal_flag of the APS NAL unit having aps_params_type equal to CCSAO_APS and aps_adaptation_parameter_set_id equal to ph_sao_cc_y_aps_id shall be equal to 1.

The TemporalId of the APS NAL unit having aps_params_type equal to CCSAO_APS and aps_adaptation_parameter_set_id equal to ph_sao_cc_y_aps_id shall be less than or equal to the TemporalId of the current picture.

APS update mechanism: a max number of APS offset sets can be predefined or signaled in SPS/APS/PPS/PH/SH/Region/CTU/CU/Subblock/Sample levels. Different component can have different max number limitation. If the APS offset sets are full, the newly added offset set can replace one existed stored offset with FIFO, LIFO, LRU mechanism, or receiving an index value indicating which APS offset set should be replaced. Note if the chosen classifier consists of candPos/edge info/coding info . . . etc., the all classifier information can be taken as part of APS offset set and can be also stored in it with its offset values. The update mechanisms mentioned above can be predefined or signaled in SPS/APS/PPS/PH/SH/Region/CTU/CU/Subblock/Sample levels.

A constraint can be applied (pruning): the newly received classifier info and offsets cannot be the same as any of stored APS offset set (of the same component, or across different components).

For example, if C0 candPos/bandNum classifier is used, the max number of APS offset sets is 4 per Y/U/V, and FIFO update is used for Y/V, idx indicating updating is used for U, as shown in the following Table 31:

TABLE 31

| POC | Comp | Set | classifier description candPos (Y, U, V) | classifier description bandNum (Y, U, V) | number of offsets | sorted set idx | separate set comp | | |
|---|---|---|---|---|---|---|---|---|---|
| 0 | Y | 0 | (Y4, U4, V4) | (16, 1, 2) | 32: (3, 3, 2, −1, . . .) | 0 | Y | | |
| | | 1 | (Y4, U0, V2) | (15, 4, 1) | 60: (−1, 0, 2, 3, . . .) | 1 | | | |
| | | 2 | (Y4, U1, V2) | (2, 1, 1) | 2: (6, 8) | 2 | | | |
| | | 3 | (Y4, U1, V1) | (4, 1, 1) | 4: (5, 5, 0, −3) | 3 | | | |
| | U | 0 | (Y8, U3, V0) | (1, 1, 4) | 4: (0, 2, 0, −1) | 0 | U | | |
| | | 1 | (Y4, U1, V0) | (15, 2, 2) | 60: (4, 1, 1, 3, . . .) | 1 | | | |
| | | 2 | (Y6, U6, V6) | (4, 1, 1) | 4: (1, 2, 0, 1) | 2 | | | |
| | | 3 | (Y2, U0, V5) | (1, 1, 1) | 1: (2) | 3 | | | |
| | V | 0 | (Y2, U0, V5) | (1, 1, 1) | 1 (−1) | 0 | V | | |
| | | 1 | (Y2, U4, V4) | (8, 2, 2) | 32: (2, 2, 0, −1, . . .) | 1 | | | |
| 1 | Y | 0 | (Y4, U0, V2) | (2, 1, 1) | 2: (5, 8) | replace 0 | newly received, FIFO replace set 0 | | |
| | | 1 | (Y4, U1, V0) | (4, 1, 1) | 4: (0, 0, −2, 1) | replace 1 | newly received, FIFO replace set 1 | | |
| | | 2 | reuse idx 0 | reuse idx 0 | | | reuse updated set 0 | (Y4, U0, V2) | (2, 1, 1) |
| | | 3 | reuse idx 1 | reuse idx 1 | | | reuse updated set 1 | (Y4, U1, V0) | (4, 1, 1) |
| | U | 0 | (Y2, U0, V5) | (1, 2, 1) | 2: (−15, 0) | replace 1 | newly received, receiving an idx indicating to update set 1 | | |
| | | 1 | reuse idx 1 | reuse idx 1 | | | reuse updated set 1 | (Y2, U0, V5) | (1, 2, 1) |
| | V | 0 | (Y2, U4, V4) | (8, 1, 1) | 8: (1, 1, 0, 6, . . .) | 1 | newly received, APS not full, insert | | |
| 2 | Y | 0 | (Y4, U1, V1) | (2, 1, 1) | 2: (5, 8) | replace 2 | newly received, FIFO replace set 2 | | |
| | | 1 | (Y4, U0, V0) | (2, 1, 1) | 2: (0, −1) | replace 3 | newly received, FIFO replace set 3 | | |
| | U | 0 | reuse idx 1 | reuse idx 1 | | | reuse updated set 1 | (Y2, U0, V5) | (1, 2, 1) |
| | V | 0 | (Y2, U4, V4) | (8, 2, 2) | 32: (2, 2, 0, −1, . . .) | 0 | newly received, but already in set 1, illegal, dec assert or skip adding this set | | |

The pruning criterion can be relaxed to give a more flexible way for encoder trade-off:

(1) allowing N offsets to be different when applying pruning operation, (e.g., 4);

(2) allowing thr difference for each offset values when applying pruning operation, (e.g., +−2).

The 2 criteria can be applied at the same time or individually. Whether to apply each criterion can be predefined or switched in SPS/APS/PPS/PH/SH/Region/CTU/CU/Subblock/Sample levels.

N/thr can be predefined or switched in SPS/APS/PPS/PH/SH/Region/CTU/CU/Subblock/Sample levels.

The FIFO update can be (1) update from previously left set idx circularly (if all updated, started from set 0 again) as in the above example, (2) everytime update from set 0. Note the update can be in PH (as in example), or SPS/APS/PPS/PH/SH/Region/CTU/CU/Subblock/Sample levels, when receiving a new offset set.

For LRU update, the decoder maintains a count table which counts the "total offset set used count", which can be refreshed in SPS/APS/per GOP structure/PPS/PH/SH/Region/CTU/CU/Subblock/Sample levels, the newly received offset set replaced the least-recently-used offset set in the APS. If 2 stored offset sets have the same count, FIFO/LIFO can be used, as shown for component Y in the following Table 32 for example:

TABLE 32

| POC | Comp | Set | classifier description candPos (Y, U, V) | classifier description bandNum (Y, U, V) | number of offsets | sorted set idx | used count of 4 sets |
|---|---|---|---|---|---|---|---|
| 0 | Y | 0 | (Y4, U4, V4) | (16, 1, 2) | 32: (3, 3, 2, −1, . . .) | 0 | 1000 |
| | | 1 | (Y4, U0, V2) | (15, 4, 1) | 60: (−1, 0, 2, 3, . . .) | 1 | 1100 |
| | | 2 | (Y4, U1, V2) | (2, 1, 1) | 2: (6, 8) | 2 | 1110 |
| | | 3 | (Y4, U1, V1) | (4, 1, 1) | 4: (5, 5, 0, −3) | 3 | 1111 |
| 1 | Y | 0 | reuse idx 0 | reuse idx 0 | | | 2111 |
| | | 1 | reuse idx 0 | reuse idx 0 | | | 3111 |
| | | 2 | reuse idx 0 | reuse idx 0 | | | 4111 |
| | | 3 | reuse idx 1 | reuse idx 1 | | | 4211 |

TABLE 32-continued

| POC | Comp | Set | classifier description candPos (Y, U, V) | classifier description bandNum (Y, U, V) | number of offsets | sorted set idx | used count of 4 sets | |
|---|---|---|---|---|---|---|---|---|
| 2 | Y | 0 | (Y4, U1, V1) | (2, 1, 1) | 2: (5, 8) | replace 2 | 4211 | newly received, LRU replace set 2 |
| | | 1 | (Y4, U0, V0) | (2, 1, 1) | 2: (0, −1) | replace 3 | 4211 | newly received, LRU replace set 3 |
| | | 2 | reuse idx 2 | reuse idx 2 | | | 4221 | |
| | | 3 | reuse idx 2 | reuse idx 2 | | | 4231 | |
| 2 | Y | 0 | (Y2, U4, V4) | (2, 1, 1) | 2: (2, 0) | replace 3 | 4231 | newly received, LRU replace set 3 |
| | | 1 | (Y2, U4, V4) | (2, 1, 1) | 2: (1, −1) | replace 2 | 4131 | newly received, LRU replace set 2 |
| | | 2 | reuse idx 2 | reuse idx 2 | | | 4141 | |
| | | 3 | reuse idx 2 | reuse idx 2 | | | 4151 | |

Different components can have different update mechanisms.

As described above, different compnens (for exmaple, U/V) can share the same classifier (same candPos/edge info/coding info/offsets, can additionally have a weight w modifier).

Since offset sets used by different picture/slice may only have slight offset value difference, a "patch" concept can be used in the offset replacement mechanism. For example, when signaling a new offset set (OffsetNew), the offset values can be on top of an existed APS stored offset set (OffsetOld). The encoder only signals delta values to update the old offset set (DPCM: OffsetNew=OffsetOld+delta). Note in the following example, other choices than FIFO update (LRU, LIFO, or signaling an index indicating which set to be updated) can also be used. YUV components can have the same or use different updating mechanisms. Also note that though the classifier candPos/bandNum does not change in this example, one can indicate to overwrite the set classifier by signaling an additional flag (0: only update set offsets, 1: update both set classifier and set offsets), as shown in the following Table 33:

TABLE 33

| POC | Comp | Set | classifier description candPos (Y, U, V) | classifier description bandNum (Y, U, V) | target offsets | sorted set idx | enable APS DPCM | max APS setNum = 4 |
|---|---|---|---|---|---|---|---|---|
| 0 | Y | 0 | (Y4, U4, V4) | (8, 1, 2) | 16: (3, 3, 2, −1, . . .) | 0 | default 0 | signal 16 offsets: (3, 3, 2, −1, . . .) |
| | | 1 | (Y4, U0, V2) | (4, 2, 2) | 16: (−1, 0, 2, 3, . . .) | 1 | default 0 | signal 16 offsets: (−1, 0, 2, 3, . . .) |
| | | 2 | (Y4, U1, V2) | (2, 1, 1) | 2: (6, 8) | 2 | default 0 | signal 2 offsets: (6, 8) |
| | | 3 | (Y4, U1, V1) | (4, 1, 1) | 4: (5, 5, 0, −3) | 3 | default 0 | signal 4 offsets: (5, 5, 0, −3) |
| | U | 0 | (Y8, U3, V0) | (4, 2, 1) | 8: (12, 7, 5, −9, . . .) | 0 | default 0 | signal 8 offsets: (12, 7, 5, −9, . . .) |
| | | 1 | (Y4, U1, V0) | (8, 1, 1) | 8: (4, 1, 1, 3, . . .) | 1 | default 0 | signal 8 offsets: (4, 1, 1, 3, . . .) |
| | | 2 | (Y6, U6, V6) | (4, 1, 1) | 4: (1, 2, 0, 1) | 2 | default 0 | signal 4 offsets: (1, 2, 0, 1) |
| | V | 0 | (Y2, U0, V5) | (7, 1, 2) | 14: (−1, 9, 2, 0, . . .) | 0 | default 0 | signal 14 offsets: (−1, 9, 2, 0, . . .) |
| | | 1 | (Y2, U4, V4) | (6, 2, 2) | 24: (2, 2, 0, −1, . . .) | 1 | default 0 | signal 24 offsets: (2, 2, 0, −1, . . .) |
| 1 | Y | 0 | (Y4, U4, V4) | (8, 1, 2) | 16: (3, 2, 2, 0, . . .) | FIFO update 0 | 1 | signal 16 DPCM offsets: (0, −1, 0, 1, . . .) |
| | | 1 | (Y4, U0, V2) | (4, 2, 2) | 4: (0, 0, 3, 1) | FIFO update 1 | 1 | signal 16 DPCM offsets: (1, 0, 1, −2, . . .) |
| | | 2 | (Y4, U1, V2) | (2, 1, 1) | 2: (−7, 5) | FIFO update 2 | 0 | signal 2 offsets: (−7, 5), overwrite reuse updated set 1 |
| | | 3 | reuse idx 1 | reuse idx 1 | | | | |
| | U | 0 | (Y4, U4, V4) | (6, 2, 1) | 12: (4, 4, −3, 1, . . .) | 3 | default 0 | signal 12 offsets: (4, 4, −3, 1, . . .) |
| | | 1 | (Y4, U4, V4) | (4, 2, 1) | 8: (3, 0, 2, −1, . . .) | indicate update 2 | 0 | signal 8 offsets: (3, 0, 2, −1 . . .) |
| | | 2 | reuse idx 2 | reuse idx 2 | | | | reuse idx 2 offsets: (3, 0, 2, −1, . . .) |
| | V | 0 | reuse idx 0 | reuse idx 0 | | | | reuse idx 0 offsets: (−1, 9, 2, 0, . . .) |

The DPCM delta offset values can be signaled in FLC/TU/EGk (order=0,1, . . . ) codes. One flag can be signaled for each offset set indicating whether to enable DPCM signaling. The DPCM delta offset values, or the new added offset values (directly signaled without DPCM, when enable APS DPCM=0) (ccsao_offset_abs), can be dequantized/ mapped before applying to the target offsets (CcSaoOffsetVal). The offset quantization step can be predefined or signaled in SPS/APS/PPS/PH/SH/Region/CTU/CU/Sub-block/Sample levels. The following equations show an example:

(1) Directly signaling offset with quantization step = 2

$$CcSaoOffsetVal = \qquad (\text{Eq. } 60)$$

$$(1 - 2 * ccsao\_offset\_sign\_flag) * (ccsao\_offset\_abs << 1)$$

(2) *DPCM* signaling offset with quantization step = 2

$$CcSaoOffsetVal = CcSaoOffsetVal + \qquad (\text{Eq. } 61)$$

$$(1 - 2 * ccsao\_offset\_sign\_flag) * (ccsao\_offset\_abs << 1)$$

One constraint can be applied to reduce direct offset signaling overhead: the updated offset values must have the same sign as the old offset values. By such infered offset sign, the new updated offset does not need to transmitt the sign flag again (ccsao_offset_sign_flag is inferred to be the same as the old offset in (1)).

Let R(x, y) be the input luma or chroma sample value before CCSAO, R'(x, y) be the output luma or chroma sample value after CCSAO:

$$offset = ccsao\_offset\ [class\_index\ of\ R(x, y)] \qquad (\text{Eq. } 62)$$

$$R'(x, y) = Clip3(0, (1 << bit\_depth) - 1, R(x, y) + offset) \qquad (\text{Eq. } 63)$$

For each luma or chroma sample, 1. classify using the indicated classifier of the current picture/current offset set idx;

2. add the corresponding offset of the derived class index;

3. clip to bitdepth dynamic range.

When CCSAO is operated with other loop filters, the clip operation can be as follows.

(1) Clipping after adding. Following equations show examples when (a) CCSAO is operated with SAO and BIF, or (b) CCSAO replaces SAO but still operated with BIF.

(a)

$$I_{OUT} = clip1(I_C + \Delta I_{SAO} + \Delta I_{BIF} + \Delta I_{CCSAO})$$

(b)

$$I_{OUT} = clip1(I_C + \Delta I_{CCSAO} + \Delta I_{BIF})$$

(2) Clipping before adding, operated with BIF. Note the clip order can be switched.

(a)

$$I_{OUT} = clip1(I_C + \Delta I_{SAO})$$

$$I'_{OUT} = clip1(I_{OUT} + \Delta I_{BIF})$$

$$I''_{OUT} = clip1(I'_{OUT} + \Delta I_{CCSAO})$$

-continued (b)

$$I_{OUT} = clip1(I_C + \Delta I_{BIF})$$

$$I'_{OUT} = clip1(I'_{OUT} + \Delta I_{CCSAO})$$

(3) Clipping after partial adding.

(a)

$$I_{OUT} = clip1(I_C + \Delta I_{SAO} + \Delta I_{BIF})$$

$$I'_{OUT} = clip1(I_{OUT} + \Delta I_{CCSAO})$$

Different clipping combinations give different trade-offs between correction precision and hardware temporary buffer size (register or SRAM bitwidth).

Figure 23B:
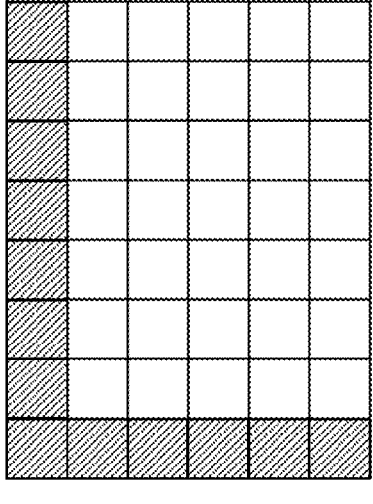
FIG. 23A and FIG. 23B illustrate the embodiments in accordance with some implementations of the present disclosure, which show if any of the collocated and neighboring luma samples used for classification is outside the current picture, CCSAO is not applied on the current chroma sample.
Figure 23A:
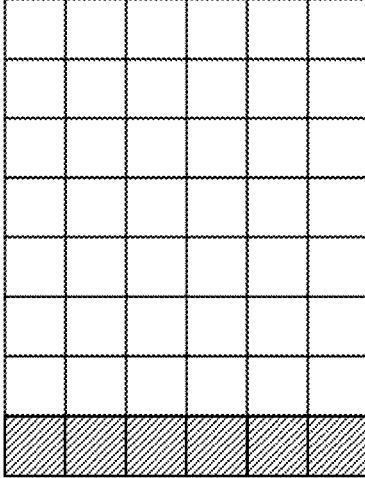

If any of the collocated and neighboring luma (chroma) samples used for classification is outside the current picture, CCSAO is not applied on the current chroma (luma) sample. For example, if FIG. 20A classifier is used, CCSAO is not applied on the left 1 column chroma components of the current picture. For example, if C1' is used, CCSAO is not applied on the left 1 column and the top 1 row chroma components of the current picture, as shown in FIG. 23A and FIG. 23B.

Figures 24A, 24B:
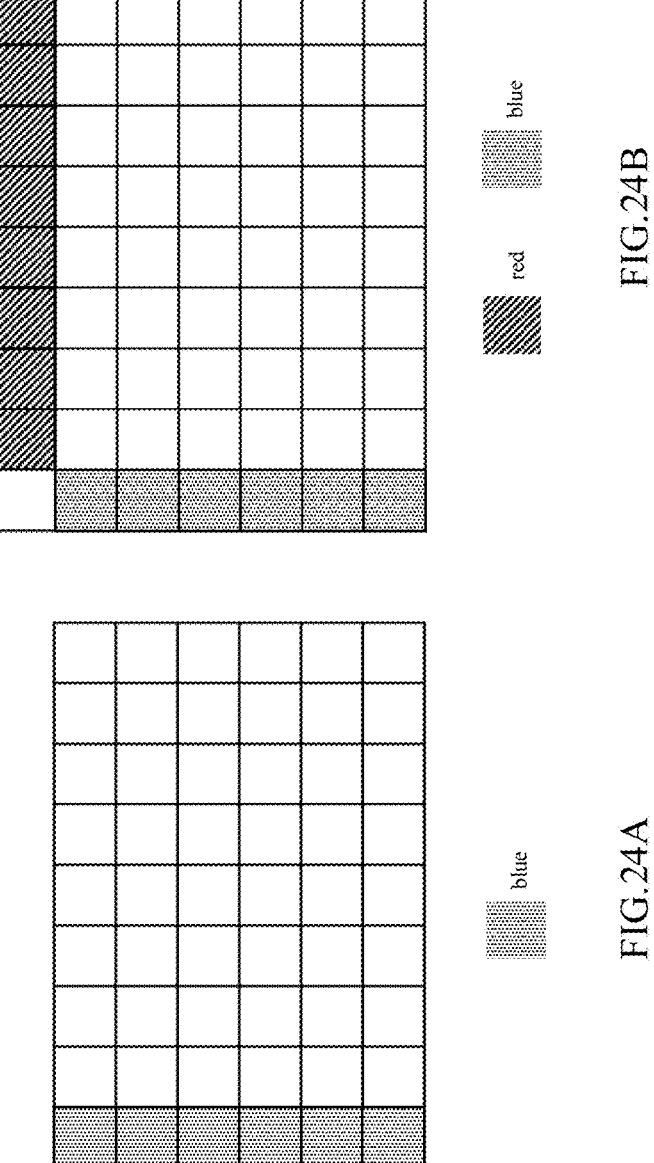
FIG. 24A and FIG. 24B illustrate the embodiments in accordance with some implementations of the present disclosure, which show if any of the collocated and neighboring luma samples used for classification is outside the current picture, the missed samples are used repetitive or mirror padding to create samples for classification.

A variation is, if any of the collocated and neighboring luma or chroma samples used for classification is outside the current picture, the missed samples are used repetitive or mirror padding to create samples for classification, and CCSAO can be applied on the current luma or chroma samples, as shown in FIG. 24A and FIG. 24B. Note the abovementioned disabled/repetitive/mirror picture boundary processing method can also be applied on subpicture/slice/tile/CTU/360 virtual boundary if any of the collocated and neighboring luma (chroma) samples used for classification is outside the current subpicture/slice/tile/patch/CTU/360 virtual boundary.

Using luma samples for CCSAO classification may increase luma line buffer and hence increase decoder hardware implementation cost. FIG. 25 shows an illustration in AVS. For luma and chroma samples above Virtual Boundary (VB), DBF/SAO/ALF are processed at the current CTU row. For luma and chroma samples below VB, DBF/SAO/ALF are processed at the next CTU row. In AVS decoder hardware design, luma line −4 to −1 pre DBF samples, line −5 pre SAO samples, and chroma line −3 to −1 pre DBF samples, line −4 pre SAO samples are stored as line buffers for next CTU row DBF/SAO/ALF processing. When processing the next CTU row, luma and chroma samples not in the line buffer are not available. However, for example, at chroma line −3 (b) position, the chroma sample is processed at the next CTU row, but CCSAO requires pre SAO luma samples line −7, −6, and −5 for classification. Pre SAO luma samples line −7, −6 are not in the line buffer so they are not available. And adding pre SAO luma samples line −7 and −6 to the line buffer will increase decoder hardware implementation cost. Note luma VB (line −4) and chroma VB (line −3) can be different. FIG. 26A shows an illustration in VVC. VB can be different in different standard. In VVC, luma VB is line −4 and chroma VB is line −2, so 9 candidate CCSAO may increase 1 luma line buffer.

Figure 27:
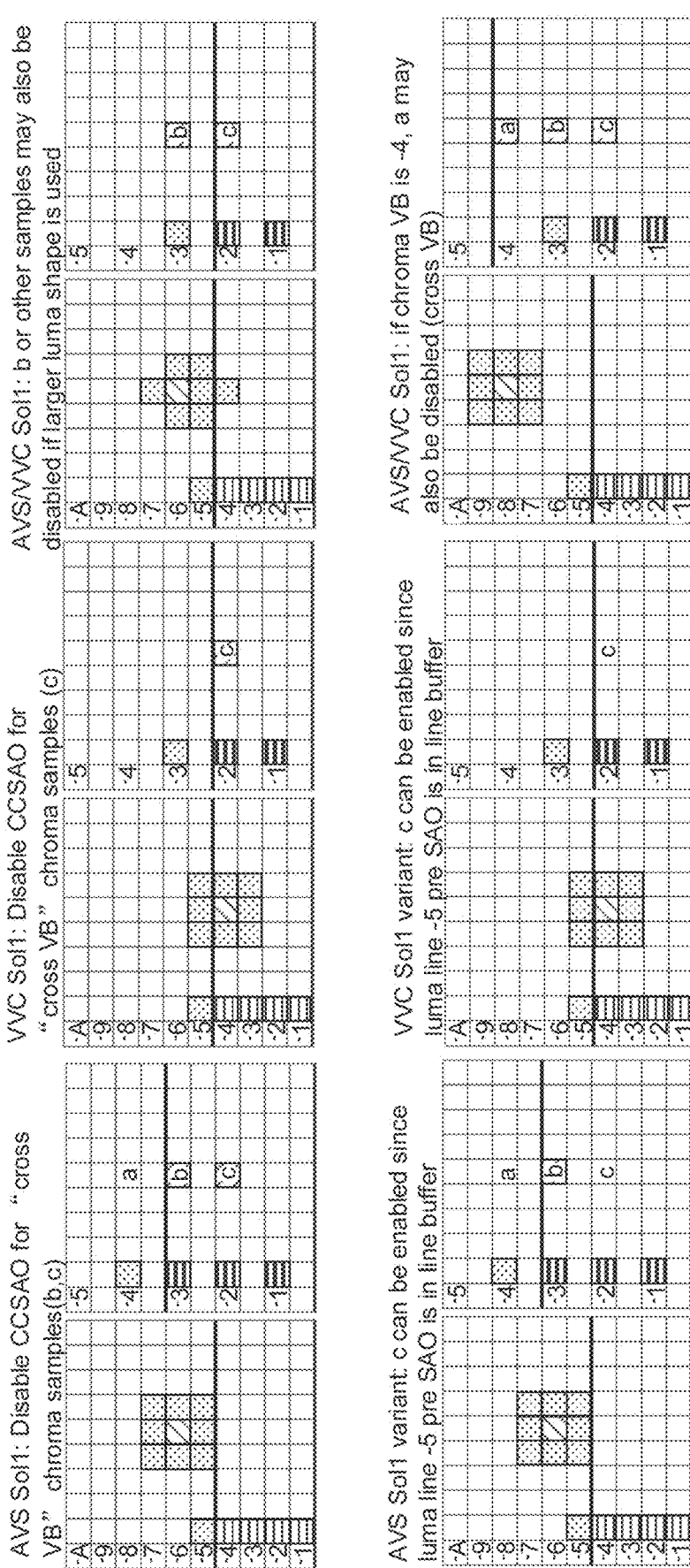
FIG. 27 illustrates an embodiment in accordance with some implementations of the present disclosure, which shows line buffer Sol 1: disable CCSAO for chroma sample which any of its luma candidates may across VB (outside the current chroma sample VB).
Figures 28A, 28B:
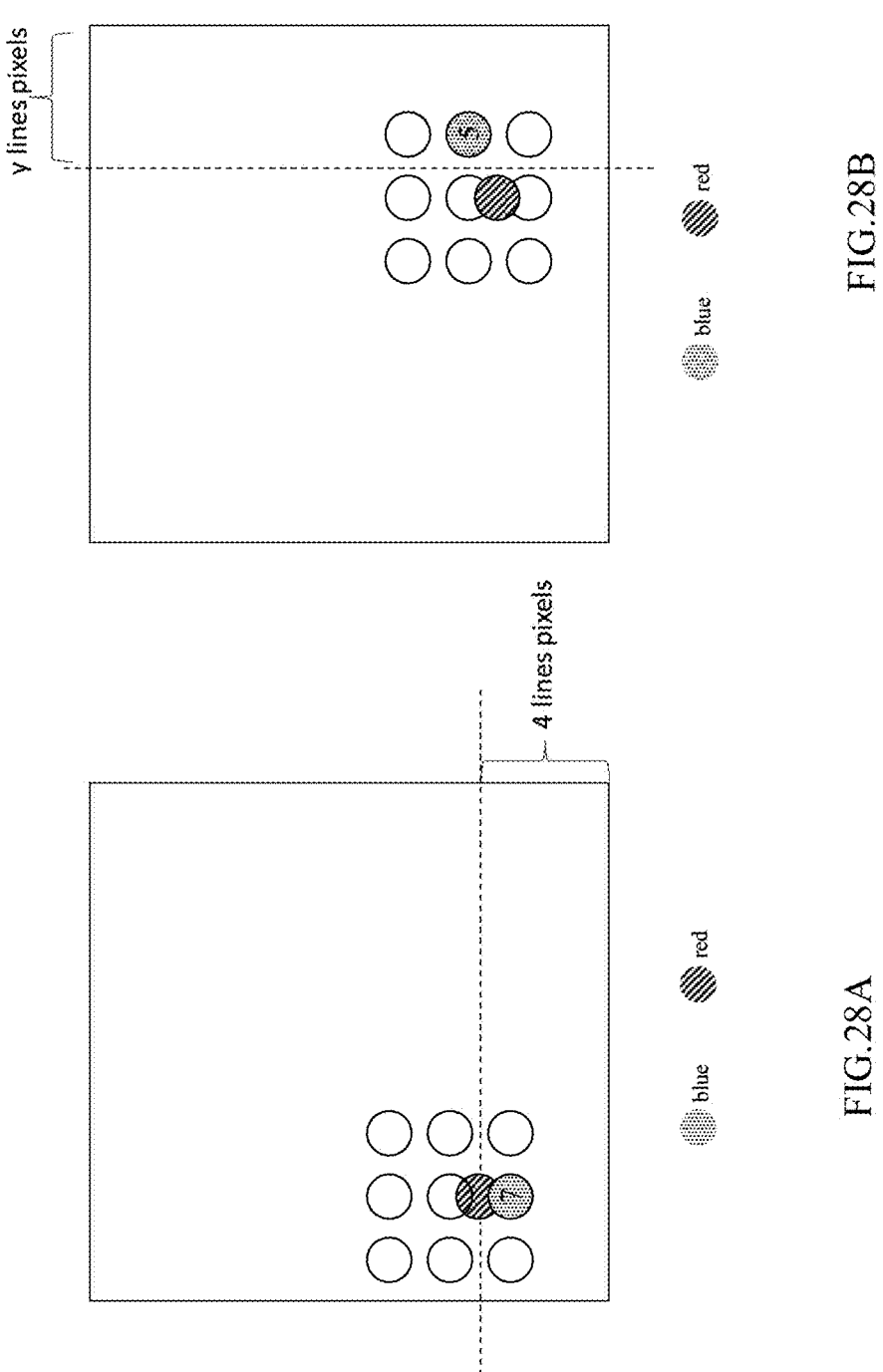
FIG. 28A and FIG. 28B illustrate the embodiments in accordance with some implementations of the present disclosure, which show virtual boundary example for C0 with 9 luma position candidates. For each CTU, CCSAO is not applied on the chroma samples which selected luma position is outside virtual boundary.

Solution 1 is to disable CCSAO for chroma sample which any of its luma candidates may across VB (outside the current chroma sample VB). FIG. 27, FIG. 28A and FIG. 28B show some examples both in AVS and VVC.

Figure 29:
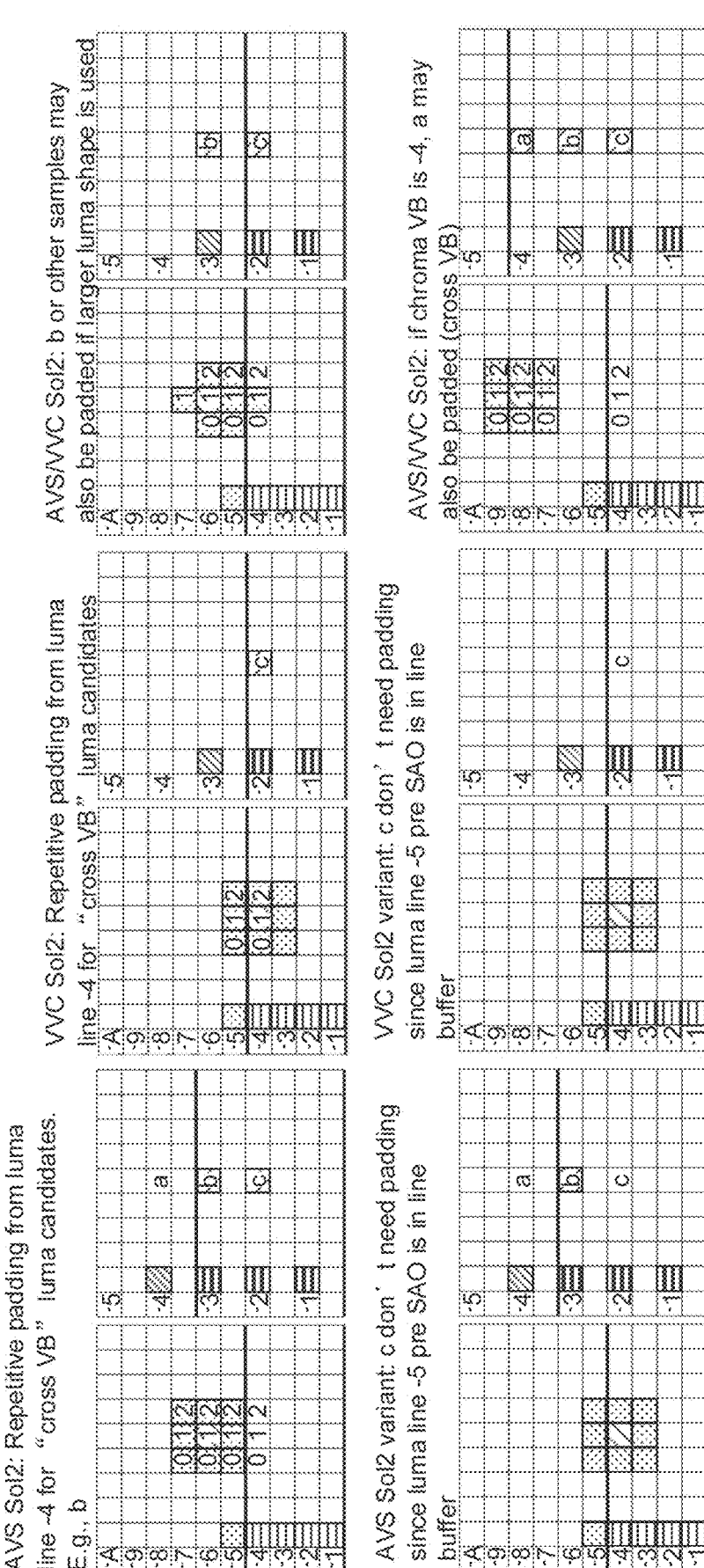
FIG. 29 illustrates an embodiment in accordance with some implementations of the present disclosure, which shows line buffer Sol 2: repetitive padding from luma line-4 for "cross VB" luma candidates (outside the current chroma sample VB).
Figures 32A, 32B:
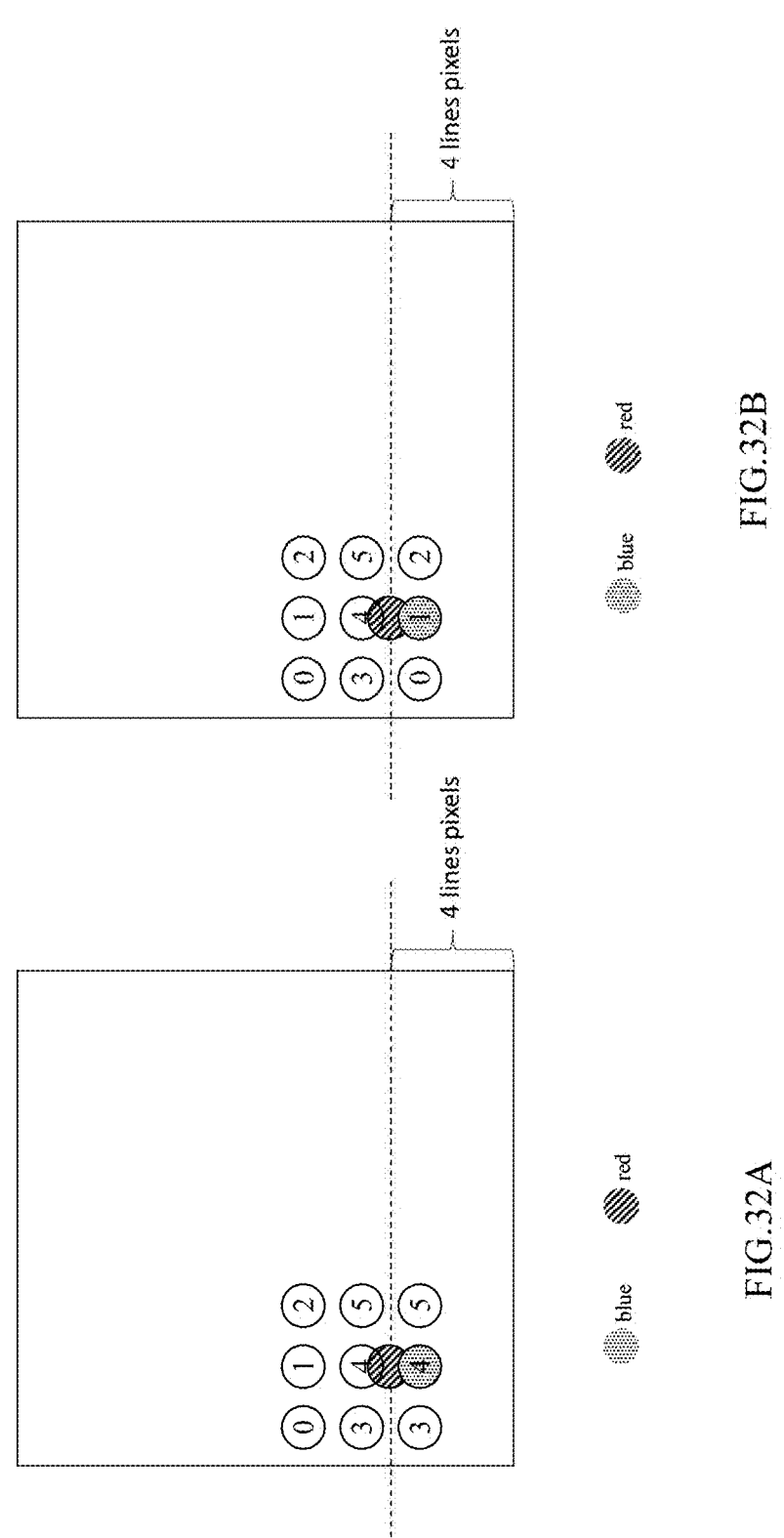
FIG. 32A and FIG. 32B illustrate embodiments in accordance with some implementations of the present disclosure, which show repetitive or mirror padding can be applied on the luma samples that outside the virtual boundary.

Solution 2 is using repetitive padding from luma line −4 for "cross VB" luma candidates (repetitive padding from luma nearest neighbor below VB for "cross VB" chroma candidates.). FIG. 29 and FIG. 32A show some examples both in AVS and VVC.

Figure 30:
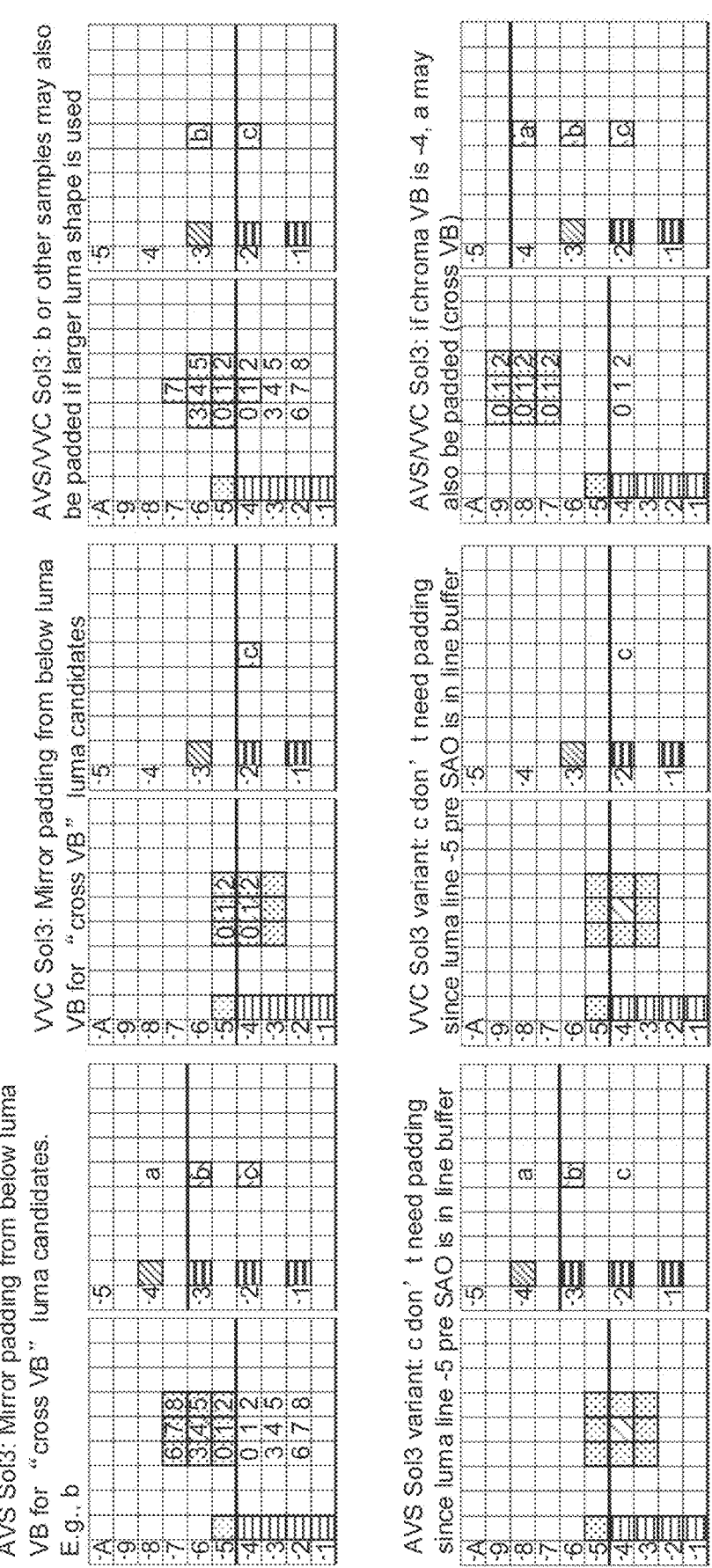
FIG. 30 illustrates an embodiment in accordance with some implementations of the present disclosure, which shows line buffer Sol 3: mirror padding from below luma VB for "cross VB" luma candidates (outside the current chroma sample VB).

Solution 3 is using mirror padding from below luma VB for "cross VB" luma candidates. FIG. 30 and FIG. 32B show some examples both in AVS and VVC.

Solution 4 is "double sided symmetric padding" (similar to VVC ALF VB padding method). FIG. 31 show some examples for different CCSAO shapes (9 and 8 luma candidates). Centered at CCSAO collocated luma sample, if one side is outside VB, double-sided symmetric padding for both sides. For example, in FIG. 31, (a) Y0, Y1, and Y2 are outside VB, so both Y0, Y1, Y2 and Y6, Y7, Y8 are padded using Y3, Y4, Y5.

FIG. 26B shows if collocated or neighboring chroma samples are used to classify the current luma samples, the selected chroma candidate may across VB and need additional chroma line buffer. The similar Solution 1~4 can be applied to handle the issue.

Solution 1 is to disable CCSAO for luma sample which any of its chroma candidates may across VB.

Solution 2 is using repetitive padding from chroma nearest neighbor below VB for "cross VB" chroma candidates.

Solution 3 is using mirror padding from below chroma VB for "cross VB" chroma candidates.

Solution 4 is "double sided symmetric padding" (similar to VVC ALF VB padding method). Centered at CCSAO collocated chroma sample, if one side is outside VB, double-sided symmetric padding for both sides.

The padding methods give more luma or chroma samples possibility to apply CCSAO so more coding gain can be achieved.

Note that at the bottom picture (or slice, tile, brick) boundary CTU row, the samples below VB are processed at the current CTU row, so the special handling (Solution 1, 2, 3) is not applied at the bottom picture (or slice, tile, brick) boundary CTU row.

Figure 33A:
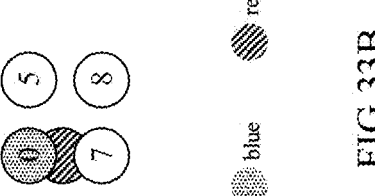
FIG. 33A and FIG. 33B illustrate embodiments in accordance with some implementations of the present disclosure, which show a restriction can be applied to reduce the CCSAO required line buffer, and to simplify boundary processing condition check.
Figure 33B:
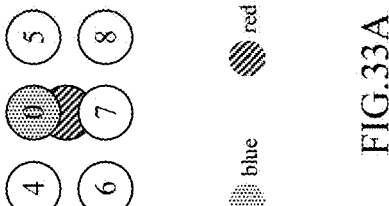

A restriction can be applied to reduce the CCSAO required line buffer, and to simplify boundary processing condition check. FIG. 26A and FIG. 26B show additional 1 luma line buffer (the whole line luma samples of line: −5) may be required if all 9 collocated neighboring luma samples are used for classification. FIG. 33B shows an example using only 6 luma candidates for classification, which reduces the line buffer and does not need any additional boundary check in FIG. 23A to FIG. 24B.

The CCSAO applied region unit can be CTB based. That is, the on/off control, CCSAO parameters (offsets, luma candidate positions, band_num, bitmask . . . etc. used for classification, offset set index) are the same in one CTB.

Figure 34:
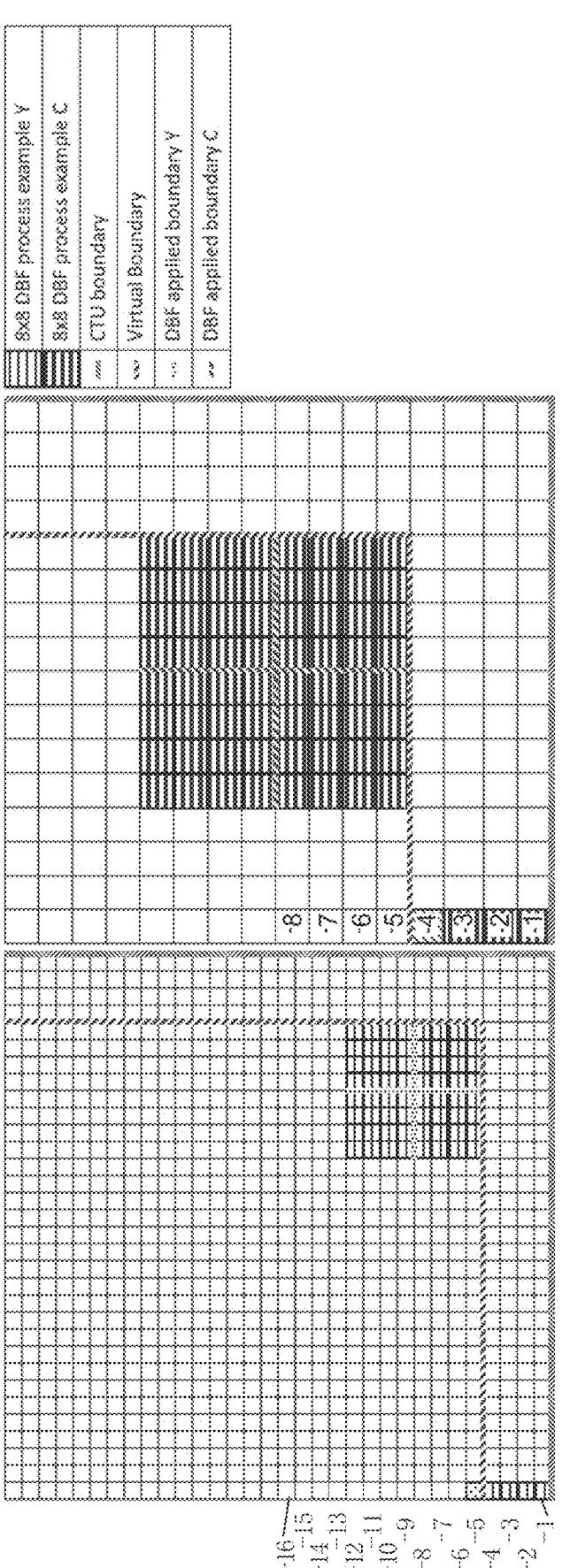
FIG. 34 illustrates an embodiment in accordance with some implementations of the present disclosure, which shows the CCSAO applied region can be "not aligned to CTB boundary", for example, not aligned to chroma CTB boundary but top-left shift (4, 4).

The applied region can be "not aligned to CTB boundary". For example, not aligned to chroma CTB boundary but top-left shift (4, 4) samples. The syntaxes (on/off control, CCSAO parameters) are still signaled for each CTB, but the truly applied region is not aligned to the CTB boundary. FIG. 34 shows an example. This not-align CTB boundary design benefits the deblocking process since the same deblocking parameters are used for each 8×8 deblocking process region.

The CCSAO applied region unit (mask size) can be variant (larger or smaller than CTB size). The mask size can be different for different components. The mask size can be switched in SPS/APS/PPS/PH/SH/Region/CTU/CU/Sub-block/Sample levels. For example, in PH, a series of mask on/off flags and offset set indices are signaled to indicate each CCSAO region information, as shown in the following Table 34:

TABLE 34

| POC | Component | CTB size | mask size |
|---|---|---|---|
| 0 | Cb | 64x64 | 128x128 |
| 0 | Cr | 64x64 | 32x32 |

TABLE 34-continued

| POC | Component | CTB size | mask size |
|---|---|---|---|
| 1 | Cb | 64x64 | 16x16 |
| 1 | Cr | 64x64 | 256x256 |

The CCSAO applied region frame partition can be fixed. For example, partition the frame into N regions.

Figures 35A, 35B, 35C:
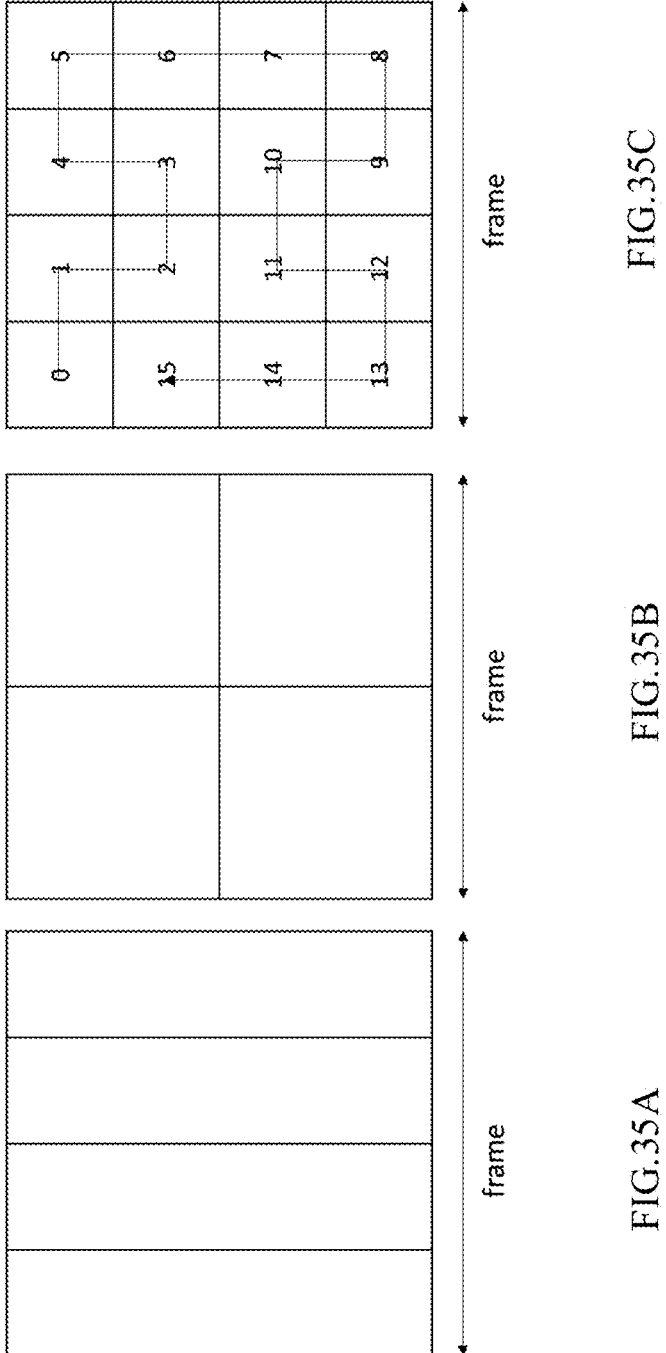
FIGS. 35A, 35B and 35C illustrate embodiments in accordance with some implementations of the present disclosure, which show the CCSAO applied region frame partition can be fixed, for example, partition the frame into N regions.

Each region can have its own region on/off control flag and CCSAO parameters. Also, if the region size is larger than CTB size, it can have both CTB on/off control flags and region on/off control flag. FIG. 35A and FIG. 35B show some examples. Similar to picture level CTB all on control flag (ph_cc_sao_cb_ctb_control_flag/ph_cc_sao_cr_ctb_control_flag), if the region on/off control flag is off, CTB on/off flags can be further signaled, otherwise CCSAO is applied for all CTBs in this region without further signaling CTB flags.

Different CCSAO applied region can share the same region on/off control and CCSAO parameters. For example, in FIG. 35C, region 0~2 shares the same parameters and region 3~15 shares the same parameters. FIG. 35C also shows the region on/off control flag and CCSAO parameters can be signaled in a Hilbert scan order.

Figures 37A, 37B, 37C:
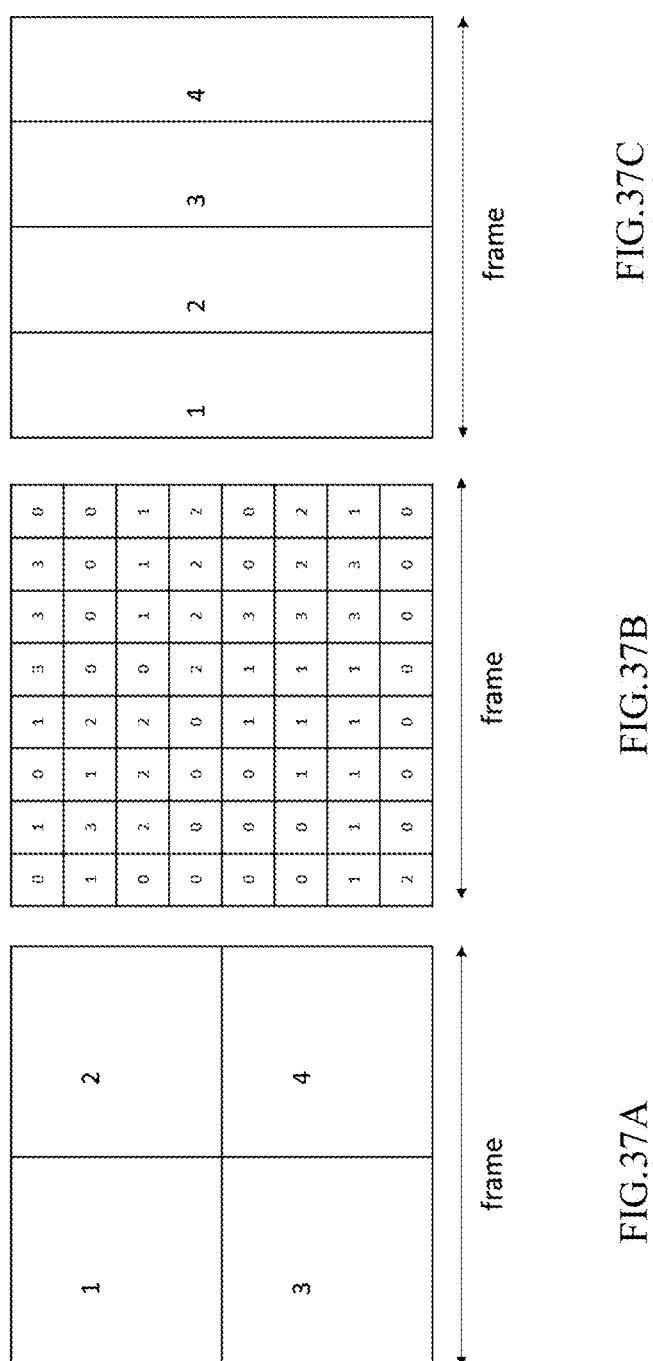
FIGS. 37A, 37B and 37C illustrate embodiments in accordance with some implementations of the present disclosure, which show if plural classifiers are used in one frame, how to apply the classifier set index can be switched in SPS/APS/PPS/PH/SH/Region/CTU/CU/Subblock levels. For example, four sets are used in a frame, switched in PH.

If plural classifiers are used in one frame, the method regarding how to apply the classifier set index can be switched in SPS/APS/PPS/PH/SH/Region/CTU/CU/Sub-block/Sample levels. For example, in FIG. 37A to FIG. 37C, four sets are used in a frame, switched in PH. FIG. 37A and FIG. 37C show default fixed region classifier, while FIG. 37B is signaled in mask/CTB level, as shown in the following Table 35:

TABLE 35

| POC | |
|---|---|
| 0 | Square partition 4 regions (same as frame QT split to max depth 1) |
| 1 | CTB level switch classifier |
| 2 | Vertical partition 4 regions |
| 3 | Frame QT split to max depth 2 |

For default region case, a region level flag can be signaled if CTBs in this region does not use default set index, but to use other classifier set in this frame. For example, the following Table 36 shows square partition 4 regions:

TABLE 36

| POC | Region | flag: | use default set index? |
|---|---|---|---|
| 0 | 1 | 1 | use default set: 1 |
| | 2 | 1 | use default set: 2 |
| | 3 | 1 | use default set: 3 |
| | 4 | 0 | CTB switch set 1~4 |

Figures 38A, 38B, 38C:
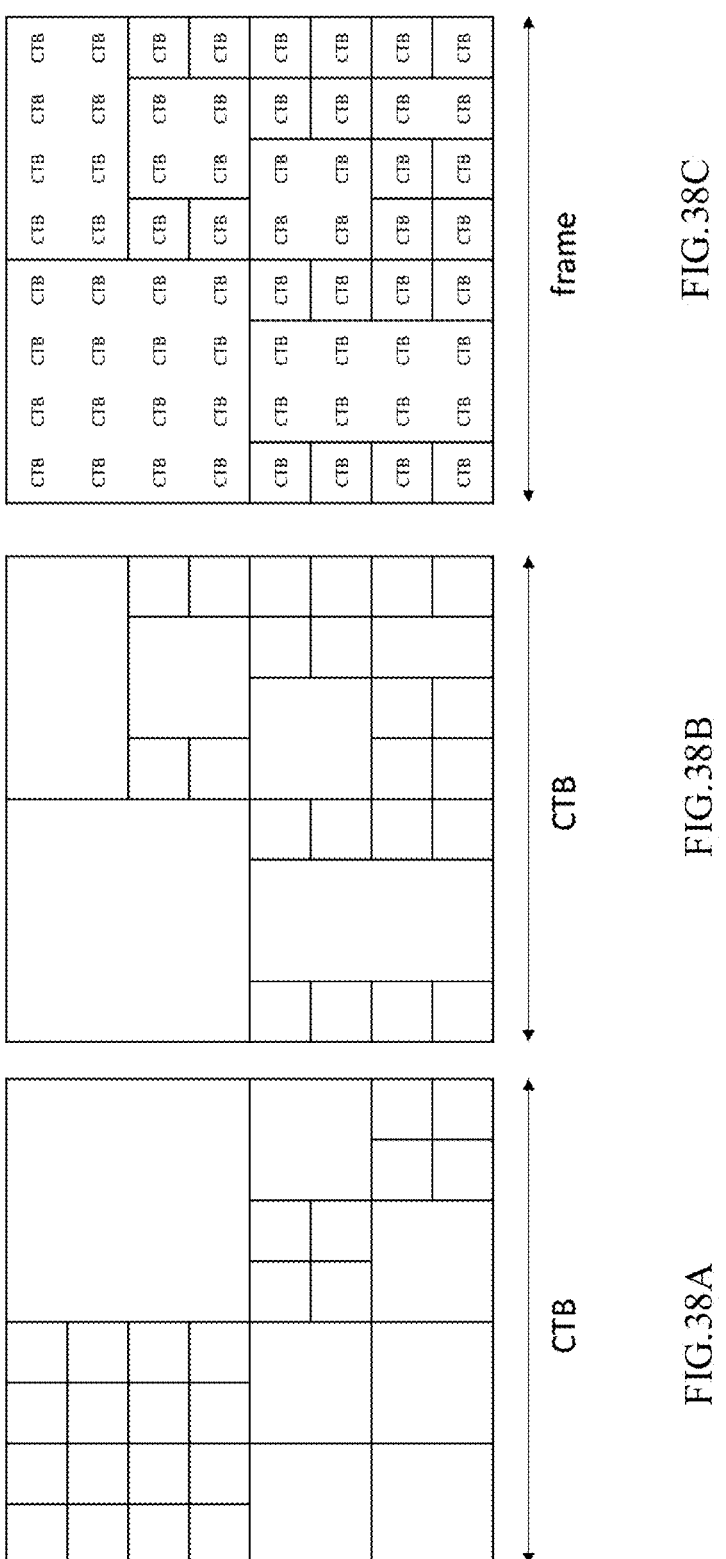
FIGS. 38A, 38B and 38C illustrate embodiments in accordance with some implementations of the present disclosure, which show the CCSAO applied region can be BT/QT/TT split from frame/slice/CTB level.

The CCSAO applied region unit can be quad-tree/binary-tree/ternary-tree split from picture/slice/CTB level. Similar to CTB split, a series of split flags are signaled to indicate the CCSAO applied region partition. FIG. 38A to FIG. 38C show some examples.

The CCSAO applied region can be a specific area according to coding information (sample position, sample coded modes, loop filter parameters . . . etc.) inside a block. For example, 1) applied only when samples that are skip mode coded, or 2) only N samples along CTU boundaries, or 3) only on 8×8 grid samples in the frame, or 4) only DBF-filtered samples, or 5) only top M and left N rows in a CU, or (6) only intra coded samples, or (7) only samples in cbf=0 blocks, or (8) only on blocks with block QP in [N, M], where (N, M) can be predefined or signaled in SPS/APS/PPS/PH/SH/Region/CTU/CU/Subblock/Sample levels. The cross-component coding information may also be taken into account, (9) applied on chroma samples which collocated luma samples are in cbf=0 blocks.

Whether to introduce coding information applied region restriction can be predefined or singling one control flag in SPS/APS/PPS/PH/SH/Region(per alternative set)/CTU/CU/

Subblock/Sample levels to indicate if a specified coding information is included/excluded in CCSAO application. Decoder skips CCSAO processing for those area according to the predefined condition or the control flags. For example, YUV use different predefined/flag controlled conditioned, and switched in region (set) level. The CCSAO application judgement can be in CU/TU/PU or sample levels, as shown in the following Table 37:

TABLE 37

| POC | Comp | Set | On cbf = 0 blocks? | on QP > 37 blocks? | on intra samples? | on inter samples? | on DBF-ed samples? | on BIF-ed samples? | block size < 8x8? |
|-----|------|-----|--------------------|--------------------|-------------------|-------------------|--------------------|--------------------|--------------------|
| 0 | Y | 0 | No (predefined) | Yes (predefined) | 1 | 0 | 0 | 1 | 0 |
| | | 1 | 1 | 0 | Yes (predefined) | 1 | 1 | 1 | 1 |
| | | | on cbf = 0 blocks? | | on chroma samples whose collocated luma samples are in cbf = 0 blocks? | | | on JCCR coded blocks? | block size > 32x32? |
| | U | 0 | No (predefined) | | 1 | | | 1 | 1 |
| | | | on cbf = 0 blocks? | | on chroma samples whose collocated luma CUs are bigger than current chroma CU? | | | on intra direction inherited from luma samples? | |
| | V | 0 | 0 | | 1 | | | | 1 |

Another example is reusing all or part of bilateral enabling constraint (predefined), as shown by the following code:

```
bool isInter = (currCU.predMode == MODE_INTER) ? true : false;
if ( ccSaoParams.ctuOn[ctuRsAddr]
| && ((TU::getCbf(currTU, COMPONENT_Y) || isInter == false) && (currTU.cu->qp > 17))
| && (128 > std::max(currTU.lumaSize( ).width, currTU.lumaSize( ).height))
| && ((isInter == false) || (32 > std::min(currTU.lumaSize( ).width, currTU.lumaSize( ).height))))
```

Excluding some specific area may benefit CCSAO statistics collection. The offset derivation may be more precise or suitable for those truly need to be corrected area. For example, blocks with cbf=0 usually means perfectly predicted which may not need to be further corrected. Excluding those blocks may benefit other area's offset derivation.

Different applied regions can use different classifiers. For example, in a CTU, skip mode coded samples use C1, samples at CU center use C2, samples that are skip mode coded and are at CU center samples use C3. FIG. 39 shows another example of applied region.

The predefined or flag control "coding information excluding area" mechanism can be used in DBF/Pre-SAO/SAO/BIF/CCSAO/ALF/CCALF/NNLF, or other loop filters.

The following table shows an example of CCSAO syntax. Note the binarization of each syntax element can be changed.

Note in AVS3, the term patch is similar with slice, and patch header is similar with slice header.

FLC: fixed length code

TU: truncated unary code

EGk: exponential-golomb code with order k, where k can be fixed

SVLC: signed EG0

UVLC: unsigned EG0

TABLE 38

| Level | Syntax element | Binarization | Meaning |
|-------|----------------|--------------|---------|
| SPS | cc_sao_enabled_flag | FLC | whether CCSAO is enabled in the sequence, can be infered off when chromaFormat == CHROMA_400 |

TABLE 38-continued

| Level | Syntax element | Binarization | Meaning |
|---|---|---|---|
| PH/SH | ph_cc_sao_y_flag<br>ph_cc_sao_cb_flag<br>ph_cc_sao_cr_flag | FLC | whether CCSAO is enabled in this picture/slice for Y/Cb/Cr, can be inferred off when chromaFormat == CHROMA_400 |
| PH/SH | ph_cc_sao_stored_offsets_set_idx | FLC | which previously decoded offsets set is used, Y/U/V offset set can be separate or shared |
| PH/SH | ph_cc_sao_y_ctb_control_flag<br>ph_cc_sao_cb_ctb_control_flag<br>ph_cc_sao_cr_ctb_control_flag | FLC | whether to enable Y/Cb/Cr on/off control at CTB level |
| PH/SH | ph_cc_sao_y_set_num_minus1<br>ph_cc_sao_cb_set_num_minus1<br>ph_cc_sao_cb_set_num_minus1 | UVLC | Number of alternative sets used in the picture/slice. |
| SPS/APS/<br>PPS/PH/<br>SH/CTU | ph_cc_sao_y_class_y_enabled_flag<br>ph_cc_sao_y_class_u_enabled_flag<br>ph_cc_sao_y_class_v_enabled_flag<br>ph_cc_sao_cb_class_y_enabled_flag<br>ph_cc_sao_cb_class_u_enabled_flag<br>ph_cc_sao_cb_class_v_enabled_flag<br>ph_cc_sao_cr_class_y_enabled_flag<br>ph_cc_sao_cr_class_u_enabled_flag<br>ph_cc_sao_cr_class_v_enabled_flag | FLC | Indicating whether current component can use other components for classification E.g., if ph_cc_sao_y_class_u_enabled_flag = 0 component Y can not use Cb sample for classification, and classification parameter such as bandNumU does not need be signaled. Otherwise if the flag is 1, Cb can be used to classify current Y. |
| SPS/APS/<br>PPS/PH/<br>SH/CTU | ph_cc_sao_y_band_num_y_minus1<br>ph_cc_sao_y_band_num_u_minus1<br>ph_cc_sao_y_band_num_v_minus1<br>ph_cc_sao_cb_band_num_y_minus1<br>ph_cc_sao_cb_band_num_u_minus1<br>ph_cc_sao_cb_band_num_v_minus1<br>ph_cc_sao_cr_band_num_y_minus1<br>ph_cc_sao_cr_band_num_u_minus1<br>ph_cc_sao_cr_band_num_v_minus1 | FLC | adaptively changed band numbers for classification. E.g. ph_cc_sao_cb_band_num_y_minus1 ph_cc_sao_cb_band_num_u_minus1 ph_cc_sao_cb_band_num_v_minus1 indicates for component Cb classification, bandNum of Y/U/V used for 3 component joint bandNum classification |
| SPS/APS/<br>PPS/PH/<br>SH/CTU | ph_cc_sao_y_cand_pos_y<br>ph_cc_sao_y_cand_pos_u<br>ph_cc_sao_y_cand_pos_v<br>ph_cc_sao_cb_cand_pos_y<br>ph_cc_sao_cb_cand_pos_u<br>ph_cc_sao_cb_cand_pos_v<br>ph_cc_sao_cr_cand_pos_y<br>ph_cc_sao_cr_cand_pos_u<br>ph_cc_sao_cr_cand_pos_v | FLC | Indicating classifier candidate position. e.g., ph_cc_sao_y_cand_pos_y ph_cc_sao_y_cand_pos_u ph_cc_sao_y_cand_pos_v indicates for component Y classification, positions of Y/U/V candidate are selected as 3 component joint bandNum classification |
| SPS/APS/<br>PPS/PH/<br>SH/CTU | cc_sao_y_offset_sign_flag<br>cc_sao_y_offset_abs<br>cc_sao_cb_offset_sign_flag<br>cc_sao_cb_offset_abs<br>cc_sao_cr_offset_sign_flag<br>cc_sao_cr_offset_abs | FLC<br>TU or EGk<br>FLC<br>TU or EGk | CCSAO Y, Cb and Cr offset values of each class. The sign flag can be conditioned on abs != 0. if (offset + abs != 0) decode offset_sign_flag |
| CTU | ctb_cc_sao_y_flag<br>ctb_cc_sao_cb_flag<br>ctb_cc_sao_cr_flag | CABAC, 1 or 2 (up & left) contexts | whether CCSAO is enabled for the current Y, Cb or Cr CTB |
| CTU | ctb_cc_sao_y_set_idx<br>ctb_cc_sao_cb_set_idx<br>ctb_cc_sao_cr_set_idx | TU or EGk | which CCSAO offset set is used for the current Y, Cb or Cr CTB (if CCSAO is enabled) |
| CTU | cc_sao_y_merge_left_flag<br>cc_sao_y_merge_up_flag<br>cc_sao_cb_merge_left_flag<br>cc_sao_cb_merge_up_flag<br>cc_sao_cr_merge_left_flag<br>cc_sao_cr_merge_up_flag | CABAC | whether CCSAO offset is merged from the left or up CTU |

If a higher-level flag is off, the lower level flags can be inferred from it and no need to be signaled. For example, if ph_cc_sao_cb_flag is false in this picture, ph_cc_sao_cb_band_num_minus1, ph_cc_sao_cb_luma_type, cc_sao_cb_offset_sign_flag, cc_sao_cb_offset_abs, ctb_cc_sao_cb_flag, cc_sao_cb_merge_left_flag, cc_sao_cb_merge_up_flag are not present and inferred to be false.

The SPS ccsao_enabled_flag cand can be conditioned on SPS SAO enabled flag.

| | |
|---|---|
| sps_sao_enabled_flag | u(1) |
| if( sps_sao_enabled_flag && ChromaArrayType != 0 ) | |
|     sps_ccsao_enabled_flag | u(1) |
| sps_alf_enabled_flag | u(1) |
| if( sps_alf_enabled_flag && ChromaArrayType != 0 ) | |
|     sps_ccalf_enabled_flag | u(1) | ph_cc_sao_cb_ctb_control_flag, ph_cc_sao_cr_ctb_control_flag indicate whether to enable Cb/Cr CTB on/off control granularity. If enabled, ctb_cc_sao_cb_flag and ctb_cc_sao_cr_flag can be further signaled. Otherwise, whether CCSAO is applied in the current picture depends on ph_cc_sao_cb_flag, ph_cc_sao_cr_flag, without further signaling ctb_cc_sao_cb_flag and ctb_cc_sao_cr_flag at CTB level.

For ph_cc_sao_cb_type and ph_cc_sao_cr_type, a flag can be further signaled to distinguish if the center collocated luma position is used (Y0 position in FIG. 17), to reduce bit overhead. Similarly, if cc_sao_cb_type and cc_sao_cr_type are signaled in CTB level, a flag can be further signaled with the same mechanism. For example, if the number of the C0 luma position candidates is 9:

| | |
|---|---|
| ctb_cc_sao_cb_flag | u(1) |
| if( ctb_cc_sao_cb_flag ) | |
|     cc_sao_cb_type0_flag | u(1), can be context coded |
| | |
|     if( !cc_sao_cb_type0_flag ) | |
|         cc_sao_cb_type_idc | u(3), can be context coded |

The following table shows an example in AVS that single (sct_num=1) or plural (set_num>1) classifiers are used in the frame. Note the syntax notation can be mapped to the notation used above.

| | |
|---|---|
| ccsao_parameter_picture_header_set( ) { | |
|     for (compIdx=0;compIdx<2;compIdx++) { | |
|         picture_ccsao_enable_flag[compIdx] | u(1) |
|         if (PictureCcSaoEnableFlag[compIdx]) { | |
|             picture_ccsao_lcu_control_flag[compIdx] | u(1) |
|             if (PictureCcSaoLcuControlFlag[compIdx]) { | |
|                 picture_ccsao_set_num_minus1[compIdx] | u(2) |
|             } | |
|             for (setIdx=0; setIdx<PictureCcSaoSetNum[compIdx]; setIdx++) { | |
|             picture_ccsao_type[compIdx][setIdx] | u(4) |
|             picture_ccsao_band_num_minus1[compIdx][setIdx] | u(4) |
|             } | |
|         } | |
|     } | |
| } | |

| | |
|---|---|
| ccsao_parameter_set( ) { | |
|     for (compIdx=0;compIdx<2;compIdx++) { | |
|         if (PictureCcSaoEnableFlag[ compIdx]) { | |
|             if (PictureCcSaoLcuControlFlag[compIdx]) { | |
|                 for (LcuIndex=0; LcuIndex<PictureWidthInLcu*PictureHeightInLcu) { | |
|                 ccsao_lcu_enable_flag[compIdx][LcuIndex] | ae(v) |
|                 if (CcSaoLcuEnableFlag[compIdx][LcuIndex] && PictureCcSaoSetNum[comp] > 1) { | |
|                 ccsao_lcu_set_idx[compIdx][LcuIndex] | ae(v) |
|                 } | |
|                 } | |
|             } | |
|             for (setIdx=0; setIdx<PictureCcSaoSetNum[comp]; setIdx++) { | |
|                 for (i=0; i<PictureCcSaoBandNum[compIdx][setIdx]; i++){ | |
|                 ccsao_offset_abs[compIdx][setIdx][i] | ae(v) |
|                 if (CcSaoOffsetAbs[compIdx][setIdx][i]) { | |
|                     ccsao_offset_sign[compIdx][setIdx][i] | u(1) |
|                 } | |
|                 } | |
|             } | |
|         } | |
|         } | |
|     } | |
| } | |

Figure 36C:
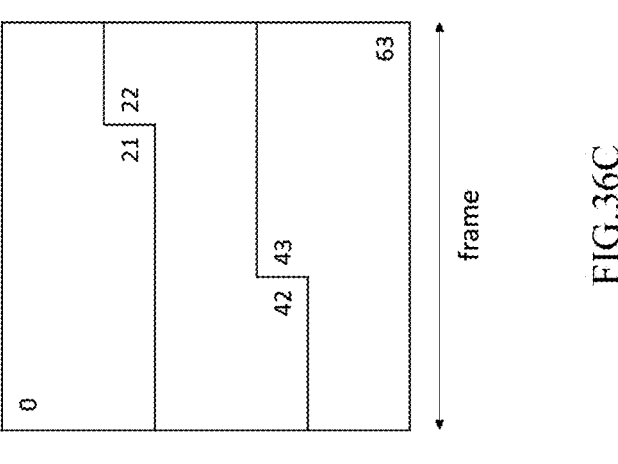
FIGS. 36A, 36B and 36C illustrate embodiments in accordance with some implementations of the present disclosure, which show the CCSAO applied region partition can be dynamic and switched in picture level.
Figure 36B:
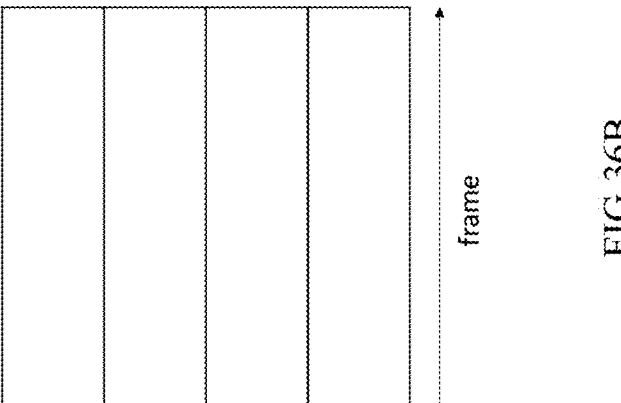
Figure 36A:
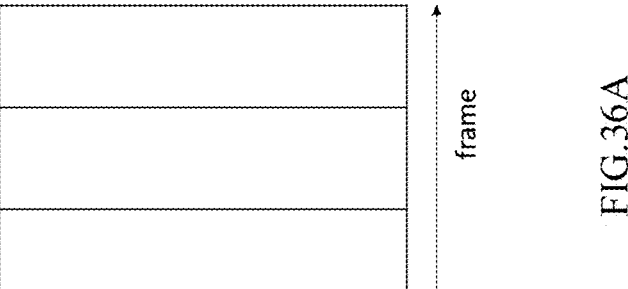

If combined with FIG. 36A, each region has its own set, the syntax example can include region on/off control flag (picture_ccsao_lcu_control_flag[compIdx][setIdx]).

```
ccsao_parameter_picture_header_set( ) {
        for (compIdx=0;compIdx<2;compIdx++) {
                picture_ccsao_enable_flag[compIdx]                               u(1)
                if (PictureCcSaoEnableFlag[compIdx]) {
                        picture_ccsao_set_num_minus1[compIdx]                    u(2)
                        for (setIdx=0; setIdx<PictureCcSaoSetNum[compIdx]; setIdx++) {
                        picture_ccsao_lcu_control_flag[compIdx][setIdx]          u(1)
                        picture_ccsao_type[compIdx][setIdx]                      u(4)
                        picture_ccsao_band_num_minus1[compIdx][setIdx]          u(4)
                        }
                }
        }
}
```

For high level syntax, similar to SAO, pps_ccsao_info_in_ph_flag and gci_no_sao_constraint_flag can be added.

pps_ccsao_info_in_ph_flag equal to 1 specifies that ccsao filter information could be present in the PH syntax structure and not present in slice headers referring to the PPS that do not contain a PH syntax structure. pps_ccsao_info_in_ph_ flag equal to 0 specifies that ccsao filter information is not present in the PH syntax structure and could be present in slice headers referring to the PPS. When not present, the value of pps_ccsao_info_in_ph_flag is inferred to be equal to 0.

gci_no_ccsao_constraint_flag equal to 1 specifies that sps_ccsao_enabled_flag for all pictures in O1sInScope shall be equal to 0. gci_no_ccsao_constraint_flag equal to 0 does not impose such a constraint.

Figure 40:
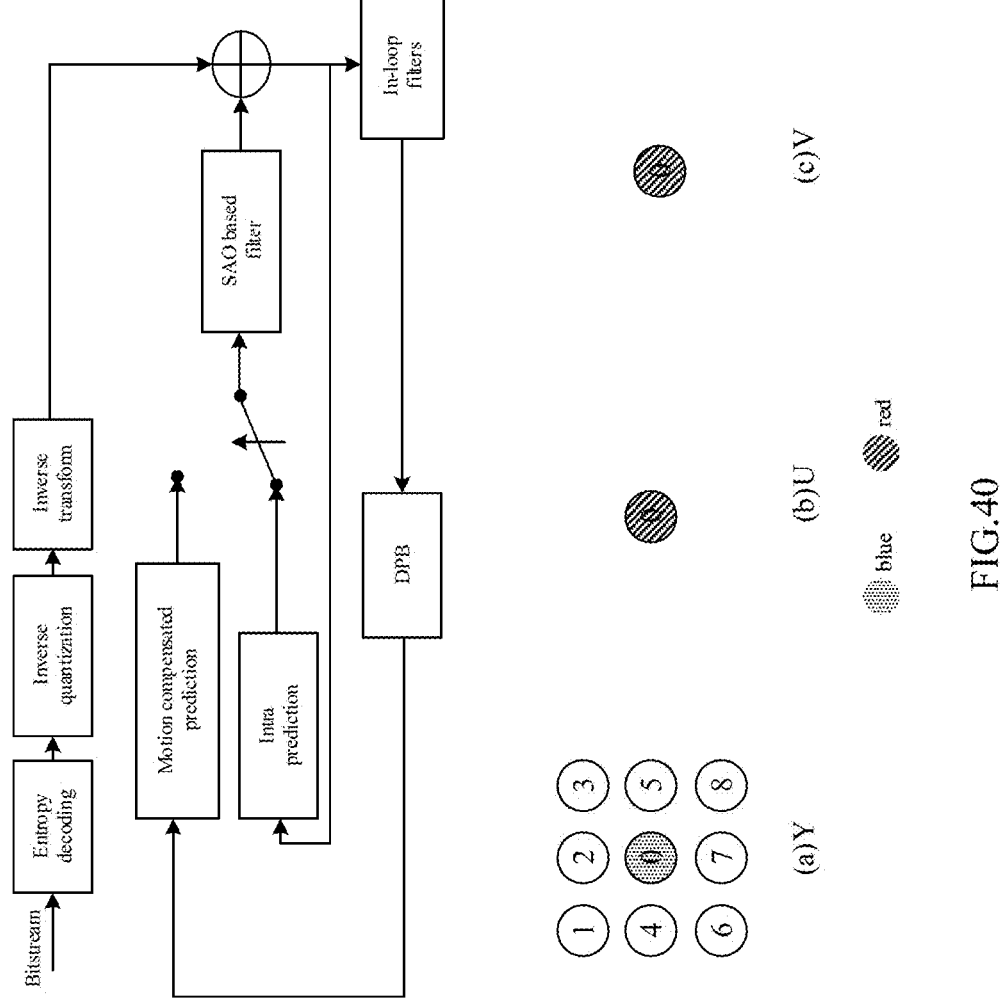
FIG. 40 illustrates an embodiment in accordance with some implementations of the present disclosure, which shows the SAO classification methods can serve as a post prediction filter. For post prediction SAO filter, each component can use the current and neighboring samples for classification. Y: using current and neighboring samples. U/V: using current sample.

The SAO classification methods included in this disclosure (including cross-component sample/coding info classification) can serve as a post prediction filter, wherein the prediction can be intra, inter, or other prediction tools such as Intra Block Copy. FIG. 40 shows an illustration. For each Y, U, and V component, a corresponding classifier is chosen, and for each component prediction sample, it is firstly classified and a corresponding offset is added. For example, each component can use the current and neighboring samples for classification. Y uses the current Y and neighboring Y samples; U/V uses the current U/V samples; for classification. FIG. 40 also shows an example, as shown by the following Table 39:

TABLE 39

| POC | Component | Classifier | C0 band_num | Total classes | offset derived from current component |
|---|---|---|---|---|---|
| 0 | Y | combine C0 and C1 | 16 | 16*17 | h_Y[i] |
| 0 | U | C0 using U0 position | 8 | 8 | h_U[i] |
| 0 | V | C0 using V0 position | 32 | 32 | h_V[i] |

The refined prediction samples (Ypred', Upred', Vpred') are updated by adding the corresponding class offset and are used for intra, inter, or other prediction thereafter:

$$Ypred' = \text{clip3}(0, (1 << \text{bit\_depth}) - 1, Ypred + \text{h\_Y[i]}) \quad \text{(Eq. 64)}$$

$$Upred' = \text{clip3}(0, (1 << \text{bit\_depth}) - 1, Upred + \text{h\_U[i]}) \quad \text{(Eq. 65)}$$

$$Vpred' = \text{clip3}(0, (1 << \text{bit\_depth}) - 1, Vpred + \text{h\_V[i]}) \quad \text{(Eq. 66)}$$

For chroma U and V components, besides the current chroma component, the cross-component (Y) can be used for further offset classification. The additional cross-component offset (h'_U, h'_V) can be added on the current component offset (h_U, h_V). The following Table 40 shows an example:

TABLE 40

| POC | Component | Classifier | C0 band_num | Total classes | offset derived from cross-component |
|---|---|---|---|---|---|
| 0 | U | C0 using Y4 position | 16 | 16 | h'_U[i] |
| 0 | V | C0 using Y1 position | 7 | 7 | h'_V[i] |

The refined prediction samples (Upred", Vpred") are updated by adding the corresponding class offset and are used for intra, inter, or other prediction thereafter. The following equations show an example:

$$Upred'' = \text{clip3}(0, (1 << \text{bit\_depth}) - 1, Upred' + \text{h'\_U[i]}) \quad \text{(Eq. 67)}$$

$$Vpred'' = \text{clip3}(0, (1 << \text{bit\_depth}) - 1, Vpred' + \text{h'\_V[i]}) \quad \text{(Eq. 68)}$$

The intra and inter prediction can use different SAO filter offsets.

The SAO/CCSAO classification methods included in this disclosure (including cross-component sample/coding info classification) can serve as a filter applied on reconstructed samples of a TU. As in FIG. 15C, CCSAO can serve as a post reconstruction filter, i.e., using reconstructed sample (after prediction/residual sample addition, before deblocking) as input for classification, compensating luma/chroma samples before entering neighboring intra/inter prediction. The CCSAO post reconstruction filter may reduce distortion of the current TU samples, and may give a better prediction for neighboring intra/inter blocks. A better compression efficiency may be expected by a more precise prediction.

To efficiently decide the best CCSAO parameters in one picture, one hierarchical rate-distortion (RD) optimization algorithm is designed, including 1) a progressive scheme for searching the best single classifier; 2) a training process for refining the offset values for one classifier; 3) a robust algorithm to effectively allocate suitable classifiers for different local regions. A typical CCSAO classifier in ECM–2.0 is as follows:

$$\text{band}_Y = (Y_{col} \cdot N_Y) \gg BD \qquad \text{(Eq. 69)}$$

$$\text{band}_U = (U_{col} \cdot N_U) \gg BD$$

$$\text{band}_V = (V_{col} \cdot N_V) \gg BD$$

$$i = \text{band}_Y \cdot (N_U \cdot N_V) + \text{band}_U \cdot N_V + \text{band}_V$$

$$C'_{rec} = \text{Clip1}(C_{rec} + \sigma_{CCSAO}[i])$$

where $\{Y_{col}, U_{col}, V_{col}\}$ are the three collocated samples that are used to classify the current sample; $\{N_Y, N_U, N_V\}$ are the numbers of bands that are applied to Y, U and V components, respectively; BD is the coding bitdepth; $C_{rec}$ and $C_{rec}'$ are the reconstructed samples before and after the CCSAO is applied; $\sigma_{CCSAO}[i]$ is the value of the CCSAO offset that is applied to the i-th category; Clip1(·) is the clipping function that clips the input to the range of the bitdepth, i.e., [0, $2^{BD}-1$]; >> represents the right-shift operation. In the proposed CCSAO, the collocated luma sample can be chosen from 9 candidate positions while the collocated chroma sample is fixed. The blocks of the present disclosure can be any type of coding blocks, such as a coding tree block (CTB) for example.

FIG. 41 illustrates an exemplary flowchart of a method for Cross-Component Sample Adaptive Offset (CCSAO) process according to one or more aspects of the present disclosure. At block 4110, the method comprises determining a first rate-distortion (RD) cost for a block using a first classifier, wherein the first classifier having a first category number in a first value range, and wherein the first RD cost is the least among RD costs associated with classifiers having a category number in the first value range. At block 4120, the method comprises determining a second RD cost for the block using a second classifier, wherein the second classifier having a second category number in a second value range, and wherein the second RD cost is the least among RD costs associated with classifiers having a category number in the second value range. At block 4130, the method comprises applying the first classifier as a classifier for the CCSAO process in response to determining the first RD cost is less than the second RD cost.

Specifically, for searching the best classifier which consists of N categories ($N_Y \cdot N_U \cdot N_V$), the multi-stage early termination method of FIG. 41 is applied. For example, for a CCSAO process which consists of totally 256 classifiers, the method first determines the best classifier (for example, the first classifier containing categories (4·2·2)) whose first category number (i.e., N=16) is in the first value range (for example, (1 to 16)). It should be understood that the first RD cost for the block using the first classifier is the least compared with other classifiers having the category number between 1 and 16. For example, the RD cost for the first classifier is less than that for a classifier containing categories (4·4·1) or (4·2·1), etc. Next, the method determines the best classifier (for example, the second classifier containing categories (4·4·2)) whose category number (i.e., N=32) is in the second value range (for example, (17 to 32)). Again, the second RD cost for the second classifier is the least compared with other classifiers having the category number between 17 and 32. The method thus compares the first RD cost and the second RD cost. If the first RD cost is less than the second RD cost, then the first classifier is determined as the classifier that is to be applied to the block.

In some embodiments, the method further comprises determining an initial RD cost for the block; and determines that the first RD cost is less than the initial RD cost. The initial RD cost represents the RD cost for the block when no CCSAO filter is to be applied.

In some embodiments, the method further comprises repeating the operation of determining the RD cost for the block using an additional classifier having a category number in the next value range in response to determining the RD cost is decreasing until a threshold value range is reached; and applying the last used classifier as the classifier for the CCSAO process. For example, if the first RD cost is more than the second RD cost, the method may continue to find the best classifier in the next value ranges (as in the example above, the method may continue to find the best classifier(s) having the category number between 33 and 48, between 49 and 64, etc.) as long as the newly found best classifier has the least RD cost. This iterative process may stop when the threshold value range is reached. For example, the method may specify that the searching stops when the value range of (113 to 128) is reached. In some embodiments, the iterative process may stop when the repetitions count to a certain value. For example, the process may stop when the operation of determining the RD cost for the block using an additional classifier having a category number in the next value range has been repeated for 5 times. When the process stops, the method applies the last used classifier, which has the least RD cost, as the classifier for the CCSAO process. In this way, when classifiers with more categories no longer improve the RD cost, these classifiers are skipped. Also, multiple breakpoints can be set for N categories early termination based on different configurations. For example, for coding configuration of AI, the breakpoint is 4 categories ($N_Y \cdot N_U \cdot N_V < 4$, 8, 12 . . . ); for coding configuration of RA/LB, the breakpoint is 16 categories ($N_Y \cdot N_U \cdot N_V < 16$, 32, 48, 64 . . . ).

In some embodiments, the value ranges are adjacent ranges. For example, the adjacent ranges are (1 to 16), (17 to 32), etc. However, the value ranges can also be overlapping intervals, such as (1 to 16), (9 to 24), etc.

In some embodiments, the classifiers use EO (Edge Offset) or BO (Band Offset) or a combination thereof for classification. In some embodiments, a classifier is skipped in response to determining that the classifier comprises a BO classifier in which the number of bands for Y component is less than the number of bands for U component or the number of bands for V component. For example, a classifier containing categories (2·4·1) can be skipped because the number of bands for Y component (i.e., 2) is less than the number of bands for U component (i.e., 4).

The progressive scheme of FIG. 41 not only regulates the overall bit costs but also considerably reduces encoding time. The processes repeat for 9 $Y_{col}$ positions to determine the best single classifier.

FIG. 42 illustrates an exemplary flowchart of a method for Cross-Component Sample Adaptive Offset (CCSAO) process according to one or more aspects of the present disclosure. At block 4210, the method comprises applying a classifier for the blocks in a frame. At block 4220, the method comprises deriving a first set of offset values for the categories of the classifier. At block 4230, the method comprises estimating, for each of the blocks, a first RD cost associated with the first set of offset values and a second RD cost associated with a second set of offset values, wherein the second set of offset values are smaller than the first set of offset values in terms of absolute values. At block 4240, the method comprises assigning the first set of offset values as the offset values for a block in response to determining that the first RD cost is less than the second RD cost for the block.

Specifically, for a given classifier, the reconstructed samples in the frame are first classified according to Eq. 70, Eq. 71 and Eq. 72. The SAO fast distortion estimation is used to derive the first set of offset values for the categories of the given classifier. In some embodiments, the method further comprises determining an initial RD cost for the block without using any CCSAO filter. The first set of offset values are assigned for the block based on determining that a first RD cost associated with the first set of offset values is less than the initial RD cost. Otherwise, the method may disable the block based on determining that the initial RD cost is less than the first RD cost. The method of FIG. 42 further estimates a second RD cost associated with smaller absolute offset values. Because smaller absolute offset values have higher coding efficiency, so preferably the method of FIG. 42 will iteratively find smaller absolute offset values. For example, in some embodiments, the operation of estimating is performed iteratively until the smaller absolute offset value equals 0. In this process, if the RD cost for the block no longer improves (i.e., the RD cost for the block does not decrease with smaller absolute offset values), then the last used offset values are assigned as the offset values for the block, and the remaining blocks can be retrained to obtain the refined offset values. In some embodiments, the operation of estimating is repeated until a threshold count is reached.

$$E = \sum\nolimits_{k \in C} (s(k) - x(k)) \qquad \text{(Eq. 70)}$$

$$\Delta D = Nh^2 - 2hE \qquad \text{(Eq. 71)}$$

$$\Delta J = \Delta D + \lambda R \qquad \text{(Eq. 72)}$$

For one category, k, s(k), x(k), are the sample positions, original samples, and samples before CCSAO, E is the sum of differences between s(k) and x(k), N is the sample count, $\Delta D$ is the estimated delta distortion by applying offset h, $\Delta J$ is RD cost, $\lambda$ is the lagrange multiplier, R is the bit cost.

The original samples can be true original samples (raw image samples without pre-processing) or Motion Compensated Temporal Filter (MCTF, one classical encoding algorithm pre-processes the original samples before encoding) original samples.

$\lambda$ can be the same as that of SAO/ALF, or weighted by a factor (according to configuration/resolution).

The encoder optimized CCSAO by trade-off total RD cost for all categories.

The statistic data E and N for each category are stored for each block for further determination of plural region classifiers.

Figure 43:
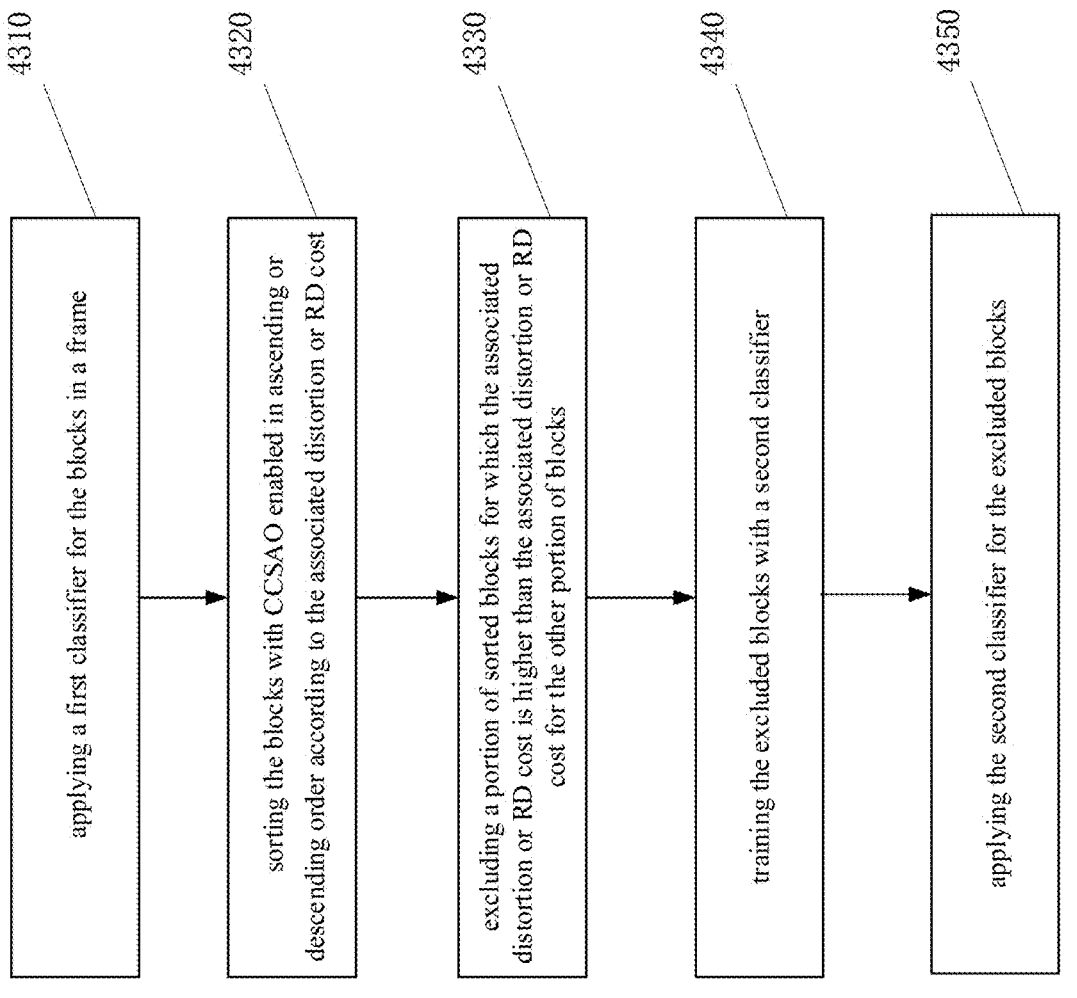
FIG. 43 illustrates another exemplary flowchart of a method for Cross-Component Sample Adaptive Offset (CCSAO) process according to one or more aspects of the present disclosure.

FIG. 43 illustrates an exemplary flowchart of a method for Cross-Component Sample Adaptive Offset (CCSAO) process according to one or more aspects of the present disclosure. At block 4310, the method comprises applying a first classifier for the blocks in a frame. At block 4320, the method comprises sorting the blocks with CCSAO enabled in ascending or descending order according to the associated distortion or RD cost. At block 4330, the method comprises excluding a portion of sorted blocks for which the associated distortion or RD cost is higher than the associated distortion or RD cost for the other portion of blocks. At block 4340, the method comprises training the excluded blocks with a second classifier. At block 4350, the method comprises applying the second classifier for the excluded blocks.

Specifically, to investigate whether a second classifier benefits the whole frame quality, the blocks with CCSAO enabled are first sorted in ascending or descending order according to the distortion (or according to RD cost, including bit cost). Next, a portion of sorted blocks (i.e., a predefined/dependent ratio, e.g., (setNum−1)/setNum−1, of the blocks) are excluded. In some embodiments, excluding a portion of sorted blocks includes excluding half of the sorted blocks. For example, half of the blocks with smaller distortion are kept the same classifier, while the other half blocks are trained with a new second classifier. In some embodiments, the excluded blocks may be trained with different classifiers. For example, during the block on-off offset refinement, each block may select its best classifier, therefore a good classifier may propagate to more blocks. With the spirits of shuffle and diffusion, the strategy gives both randomness and robustness for parameter decision. If the current number of classifiers does not further improve the RD cost, more plural classifiers are skipped.

It should be noted that the flowcharts as illustrated herein provide examples of sequences of various operations. Although shown in a particular sequence or order, unless otherwise specified, the order of the operations can be modified. Thus, the illustrated embodiments should be understood as an example, and the operations can be performed in a different order, and some operations can be performed in parallel or in sequence. Additionally, one or more operations can be omitted in various embodiments; thus, not all operations are required in every embodiment.

Figure 44:
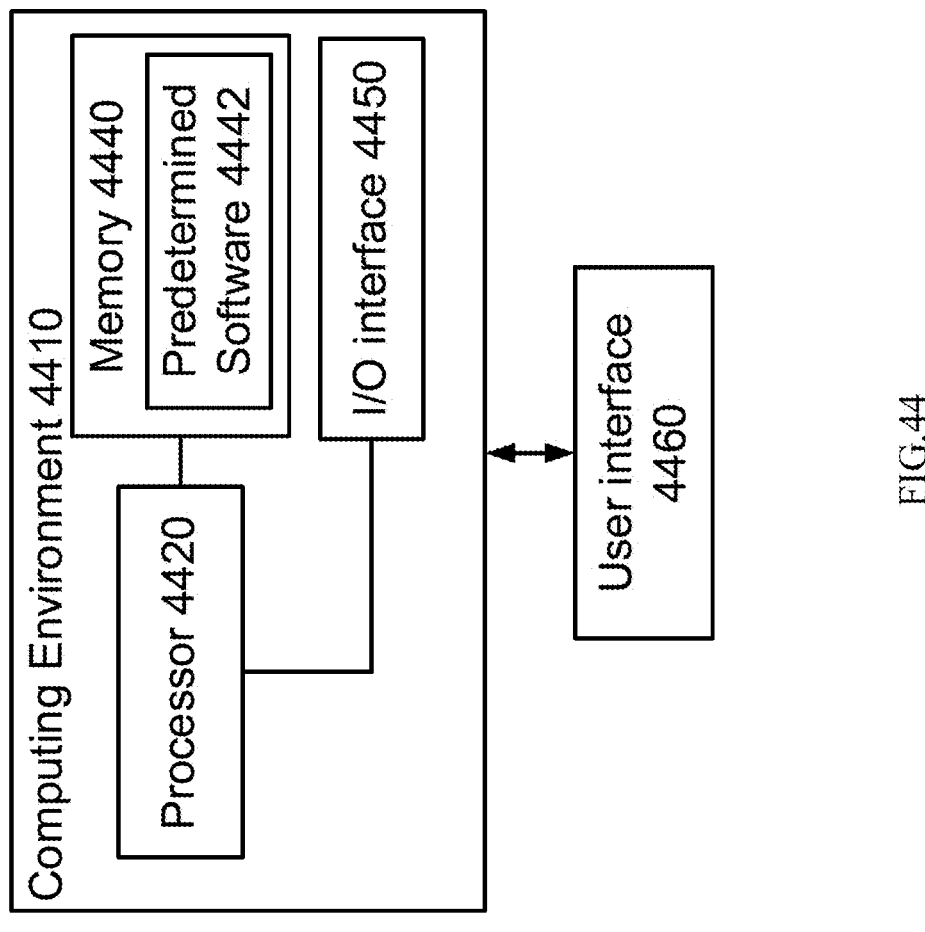
FIG. 44 illustrates a diagram illustrating a computing environment coupled with a user interface according to one or more aspects of the present disclosure.

FIG. 44 shows a computing environment 4410 coupled with a user interface 4460. The computing environment 4410 can be part of a data processing server. The computing environment 4410 includes processor 4420, memory 4440, and I/O interface 4450.

The processor 4420 typically controls overall operations of the computing environment 4410, such as the operations associated with the display, data acquisition, data communications, and image processing. The processor 4420 may include one or more processors to execute instructions to perform all or some of the steps in the above-described methods. Moreover, the processor 4420 may include one or more modules that facilitate the interaction between the processor 4420 and other components. The processor may be a Central Processing Unit (CPU), a microprocessor, a single chip machine, a GPU, or the like.

The memory 4440 is configured to store various types of data to support the operation of the computing environment 4410. Memory 4440 may include predetermine software 4442. Examples of such data comprise instructions for any applications or methods operated on the computing environment 4410, video datasets, image data, etc. The memory 4440 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 4450 provides an interface between the processor 4420 and peripheral interface modules, such as a keyboard, a click wheel, buttons, and the like. The buttons may include but are not limited to, a home button, a start scan button, and a stop scan button. The I/O interface 4450 can be coupled with an encoder and decoder.

In some embodiments, there is also provided a non-transitory computer-readable storage medium comprising a plurality of programs, such as comprised in the memory 4440, executable by the processor 4420 in the computing environment 4410, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described methods.

In some embodiments, the computing environment 4410 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The present disclosure describes a hardware implementation for an apparatus according to one or more aspects of the present disclosure. The apparatus for encoding video data or decoding video data may include a memory and at least one processor. The processor may be coupled to the memory and configured to perform the above mentioned processes described above with reference to FIG. 4 through FIG. 43. The processor may be a general-purpose processor, or may also be implemented as a combination of computing devices, e.g., a combination of a DSP and a microprocessor, multiple microprocessors, one or more microprocessors in conjunction with a DSP core, or any other such configuration. The memory may store the input data, output data, data generated by processor, and/or instructions executed by processor.

The various operations, methods, and systems described in connection with the disclosure herein may be implemented in hardware, software executed by a processor, firmware, or any combination thereof. According one or more aspects of the present disclosure, a computer program product for encoding video data or decoding video data may include processor executable computer code for performing the above mentioned processes described above with reference to FIG. 4 through FIG. 43. According to one or more aspects of the present disclosure, a computer readable medium may store computer code for encoding video data or decoding video data, the computer code when executed by a processor may cause the processor to perform the above mentioned processes described above with reference to FIG. 4 through FIG. 43. Computer-readable media includes both non-transitory computer storage media and communication media including any medium that facilitates transfer of a computer program from one place to another. Any connection may be properly termed as a computer-readable medium. Other embodiments and implementations are within the scope of the disclosure.

The preceding description is provided to enable any person skilled in the art to make or use various embodiments according to one or more aspects of the present disclosure. Various modifications to these embodiments will be readily apparent to those skilled in the art, and the generic principles defined herein may be applied to other embodiments without departing from the scope of the various embodiments. Thus, the claims are not intended to be limited to the embodiments shown herein but is to be accorded the widest scope consistent with the following claims and the principles and novel features disclosed herein.

What is claimed is:

1. A method for Cross-Component Sample Adaptive Offset (CCSAO) process, comprising:
    determining a first rate-distortion (RD) cost for a block using a first classifier, wherein the first classifier has a first category number in a first value range, and wherein the first RD cost is the least among RD costs associated with classifiers having a category number in the first value range;
    determining a second RD cost for the block using a second classifier, wherein the second classifier has a second category number in a second value range, and wherein the second RD cost is the least among RD costs associated with classifiers having a category number in the second value range; and
    applying the first classifier as a classifier for the CCSAO process in response to determining the first RD cost is less than the second RD cost, wherein the first classifier classifies samples of a first component based at least in part on samples of a second component; and
    repeating the determining an RD cost for the block using an additional classifier having a category number in a next value range in response to determining the RD cost is decreasing until a threshold value range is reached and applying a last used classifier as the classifier for the CCSAO process.

2. The method of claim 1, further comprising:
    determining an initial RD cost for the block; and
    determining that the first RD cost is less than the initial RD cost.

3. The method of claim 1, wherein the first value range and the second value range are adjacent ranges or overlapping ranges.

4. The method of claim 1, wherein the first classifier and the second classifier use EO (Edge Offset) or BO (Band Offset) or a combination thereof for classification.

5. The method of claim 1, wherein a classifier is skipped in response to determining that the classifier comprises a BO classifier in which the number of bands for Y component is less than the number of bands for U component or the number of bands for V component.

6. An apparatus for Cross-Component Sample Adaptive Offset (CCSAO) process, comprising:
    a memory; and
    at least one processor coupled to the memory and configured to perform a method comprising:
        determining a first rate-distortion (RD) cost for a block using a first classifier, wherein the first classifier has a first category number in a first value range, and wherein the first RD cost is the least among RD costs associated with classifiers having a category number in the first value range;
        determining a second RD cost for the block using a second classifier, wherein the second classifier has a second category number in a second value range, and wherein the second RD cost is the least among RD costs associated with classifiers having a category number in the second value range; and

63

64 applying the first classifier as a classifier for the CCSAO process in response to determining the first RD cost is less than the second RD cost, wherein the first classifier classifies samples of a first component based at least in part on samples of a second component; and repeating the determining an RD cost for the block using an additional classifier having a category number in a next value range in response to determining the RD cost is decreasing until a threshold value range is reached and applying a last used classifier as the classifier for the CCSAO process.

7. The apparatus of claim 6, wherein the method further comprises:

determining an initial RD cost for the block; and determining that the first RD cost is less than the initial RD cost.

8. The apparatus of claim 6, wherein the first value range and the second value range are adjacent ranges or overlapping ranges.

9. The apparatus of claim 6, wherein the first classifier and second classifier use EO (Edge Offset) or BO (Band Offset) or a combination thereof for classification.

10. The apparatus of claim 6, wherein a classifier is skipped in response to determining that the classifier comprises a BO classifier in which the number of bands for Y component is less than the number of bands for U component or the number of bands for V component.

11. A non-transitory computer readable storage medium storing a bitstream to be decoded by a method comprising:

determining a first rate-distortion (RD) cost for a block using a first classifier, wherein the first classifier has a first category number in a first value range, and wherein the first RD cost is the least among RD costs associated with classifiers having a category number in the first value range;

determining a second RD cost for the block using a second classifier, wherein the second classifier has a second category number in a second value range, and wherein the second RD cost is the least among RD costs associated with classifiers having a category number in the second value range; and applying the first classifier as a classifier for a CCSAO process in response to determining the first RD cost is less than the second RD cost, wherein the first classifier classifies samples of a first component based at least in part on samples of a second component; and repeating the determining an RD cost for the block using an additional classifier having a category number in a next value range in response to determining the RD cost is decreasing until a threshold value range is reached and applying a last used classifier as the classifier for the CCSAO process.

12. The non-transitory computer readable storage medium of claim 11, wherein the method further comprises:

determining an initial RD cost for the block; and determining that the first RD cost is less than the initial RD cost.

13. The non-transitory computer readable storage medium of claim 11, wherein the first value range and the second value range are adjacent ranges or overlapping ranges.

14. The non-transitory computer readable storage medium of claim 11, wherein the first classifier and the second classifier use EO (Edge Offset) or BO (Band Offset) or a combination thereof for classification.

15. The non-transitory computer readable storage medium of claim 11, wherein a classifier is skipped in response to determining that the classifier comprises a BO classifier in which the number of bands for Y component is less than the number of bands for U component or the number of bands for V component.

* * * * *